(12) United States Patent
Kim et al.

(10) Patent No.: US 12,166,554 B2
(45) Date of Patent: *Dec. 10, 2024

(54) METHOD AND DEVICE FOR TRANSMITTING AND RECEIVING WIRELESS SIGNALS IN WIRELESS COMMUNICATION SYSTEM

(71) Applicant: LG Electronics Inc., Seoul (KR)

(72) Inventors: Seonwook Kim, Seoul (KR); Suckchel Yang, Seoul (KR); Joonkui Ahn, Seoul (KR); Seokmin Shin, Seoul (KR); Sechang Myung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/351,852

(22) Filed: Jul. 13, 2023

(65) Prior Publication Data

US 2023/0370140 A1    Nov. 16, 2023

Related U.S. Application Data

(63) Continuation of application No. 17/940,739, filed on Sep. 8, 2022, now Pat. No. 11,764,848, which is a continuation of application No. PCT/KR2021/004643, filed on Apr. 13, 2021.

(60) Provisional application No. 63/015,668, filed on Apr. 26, 2020, provisional application No. 63/009,420, filed on Apr. 13, 2020.

(30) Foreign Application Priority Data

| May 13, 2020 | (KR) | ......................... 10-2020-0057064 |
| Aug. 6, 2020 | (KR) | ......................... 10-2020-0098340 |
| Jan. 15, 2021 | (KR) | ......................... 10-2021-0005650 |

(51) Int. Cl.
*H04B 7/06* (2006.01)
*H04L 5/00* (2006.01)
*H04W 72/23* (2023.01)

(52) U.S. Cl.
CPC ......... *H04B 7/0626* (2013.01); *H04L 5/0051* (2013.01); *H04L 5/0053* (2013.01); *H04W 72/23* (2023.01)

(58) Field of Classification Search
CPC .. H04L 5/0051; H04L 5/0053; H04W 72/042; H04B 7/0626
See application file for complete search history.

(56) References Cited

U.S. PATENT DOCUMENTS

| 2021/0160780 | A1* | 5/2021 | Liu | ........................ H04W 72/23 |
| 2021/0385831 | A1* | 12/2021 | Nogami | ................ H04W 72/23 |
| 2022/0295553 | A1* | 9/2022 | Lin | ........................ H04W 16/14 |

* cited by examiner

*Primary Examiner* — Chi Ho A Lee
(74) *Attorney, Agent, or Firm* — Fish & Richardson P.C.

(57) ABSTRACT

The present disclosure relates to a method and a device therefor, the method comprising the steps of: obtaining, on the basis of not receiving information on a channel occupancy duration from a base station, channel state information based on a plurality of CSI-reference signals (CSI-RSs) which are all overlapped with, on a time domain, at least one from among a physical downlink shared channel (PDSCH) and an aperiodic CSI-RS; and transmitting the channel state information to the base station, wherein durations corresponding to the PDSCH and the aperiodic CSI-RS are consecutive time durations on the time domain.

9 Claims, 24 Drawing Sheets

Carrier aggregation between L-band and U-band

Standalone U-band(s)

METHOD AND DEVICE FOR TRANSMITTING AND RECEIVING WIRELESS SIGNALS IN WIRELESS COMMUNICATION SYSTEM

CROSS-REFERENCE TO RELATED APPLICATIONS

This application is a continuation of U.S. application Ser. No. 17/940,739, filed on Sep. 8, 2022, which is a continuation of International Application No. PCT/KR2021/004643, filed on Apr. 13, 2021, which claims the benefit of Korean Application No. 10-2021-0005650, filed on Jan. 15, 2021, Korean Application No. 10-2020-0098340, filed on Aug. 6, 2020, Korean Application No. 10-2020-0057064, filed on May 13, 2020, U.S. Provisional Application No. 63/015,668, filed on Apr. 26, 2020, and U.S. Provisional Application No. 63/009,420, filed on Apr. 13, 2020. The disclosures of the prior applications are incorporated by reference in their entirety.

TECHNICAL FIELD

The present disclosure relates to a wireless communication system, and more particularly, to a method and apparatus for transmitting and receiving a wireless signal.

BACKGROUND

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

Provided are a method and apparatus for efficiently performing a wireless signal transmission and reception process.

It will be appreciated by persons skilled in the art that the objects that could be achieved with the present disclosure are not limited to what has been particularly described hereinabove and the above and other objects that the present disclosure could achieve will be more clearly understood from the following detailed description.

According to a first aspect of the present disclosure, there is provided a method of transmitting channel state information (CSI) by a user equipment (UE) in a wireless communication system supporting unlicensed bands. The method may include: based on a failure to receive information on a channel occupancy duration from a base station (BS), obtaining the CSI based on a plurality of channel state information reference signals (CSI-RSs) fully overlapping with at least one of a physical downlink shared channel (PDSCH) and an aperiodic CSI-RS in a time domain; and transmitting the CSI to the BS. A duration corresponding to the PDSCH and the aperiodic CSI-RS may be a continuous time duration in the time domain.

According to a second aspect of the present disclosure, there is provided a UE configured to operate in a wireless communication system supporting unlicensed bands. The UE may include: at least one radio frequency (RF) unit; at least one processor; and at least one computer memory operably connected to the at least one processor and configured to, when executed, cause the at least one processor to perform operations. The operations may include: based on a failure to receive information on a channel occupancy duration from a BS, obtaining CSI based on a plurality of CSI-RSs fully overlapping with at least one of a PDSCH and an aperiodic CSI-RS in a time domain; and transmitting the CSI to the BS. A duration corresponding to the PDSCH and the aperiodic CSI-RS may be a continuous time duration in the time domain.

According to a third aspect of the present disclosure, there is provided an apparatus for a UE. The apparatus may include: at least one processor; and at least one computer memory operably connected to the at least one processor and configured to, when executed, cause the at least one processor to perform operations. The operations may include: based on a failure to receive information on a channel occupancy duration from a BS, obtaining CSI based on a plurality of CSI-RSs fully overlapping with at least one of a PDSCH and an aperiodic CSI-RS in a time domain; and transmitting the CSI to the BS. A duration corresponding to the PDSCH and the aperiodic CSI-RS may be a continuous time duration in the time domain.

According to a fourth aspect of the present disclosure, there is provided a computer-readable storage medium. The computer-readable storage medium may include at least one computer program configured to, when executed, cause at least one processor to perform operations. The operations may include: based on a failure to receive information on a channel occupancy duration from a BS, obtaining CSI based on a plurality of CSI-RSs fully overlapping with at least one of a PDSCH and an aperiodic CSI-RS in a time domain; and transmitting the CSI to the BS. A duration corresponding to the PDSCH and the aperiodic CSI-RS may be a continuous time duration in the time domain.

According to an embodiment, the failure to receive the information on the channel occupancy duration may include receiving group common downlink control information (DCI) in which a slot format indicator field and a channel occupancy duration field are not configured or skipping monitoring of the group common DCI.

According to an embodiment, the UE may further receive information instructing to configure the plurality of CSI-RSs based on the at least one of the PDSCH and the aperiodic CSI-RS through higher layer signaling.

According to an embodiment, the CSI may be obtained based on an average value of the plurality of CSI-RSs.

According to an embodiment, the continuous time duration corresponding to the PDSCH and the aperiodic CSI-RS in the time domain may be determined as one transmission burst.

According to an embodiment, each of the plurality of CSI-RSs may be a periodic CSI-RS or a semi-persistent CSI-RS.

According to the present disclosure, a wireless signal may be efficiently transmitted and received in a wireless communication system.

According to the present disclosure, even when a user equipment does not receive information on a channel occupancy duration from a base station (BS), the UE may determine the same downlink (DL) transmission burst based on a physical downlink shared channel (PDSCH) and/or an aperiodic channel state information reference signal (CSI-RS), which are received by the UE. In addition, the UE may obtain channel state information (CSI) based on a plurality of CSI-RSs belonging to the same DL transmission burst.

According to the present disclosure, even when a UE does not receive information on a channel occupancy duration from a BS, the UE may measure a channel state accurately.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure, illustrate embodiments of the present disclosure and together with the description serve to explain the principle of the present disclosure.

DETAILED DESCRIPTION

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

As more and more communication devices require larger communication capacities, the need for enhanced mobile broadband communication relative to the legacy radio access technologies (RATs) has emerged. Massive machine type communication (MTC) providing various services to inter-connected multiple devices and things at any time in any place is one of significant issues to be addressed for next-generation communication. A communication system design in which services sensitive to reliability and latency are considered is under discussion as well. As such, the introduction of the next-generation radio access technology (RAT) for enhanced mobile broadband communication (eMBB), massive MTC (mMTC), and ultra-reliable and low latency communication (URLLC) is being discussed. For convenience, this technology is called NR or New RAT in the present disclosure.

While the following description is given in the context of a 3GPP communication system (e.g., NR) for clarity, the technical spirit of the present disclosure is not limited to the 3GPP communication system.

In a wireless access system, a user equipment (UE) receives information from a base station (BS) on DL and transmits information to the BS on UL. The information transmitted and received between the UE and the BS includes general data and various types of control information. There are many physical channels according to the types/usages of information transmitted and received between the BS and the UE.

Figure 1:
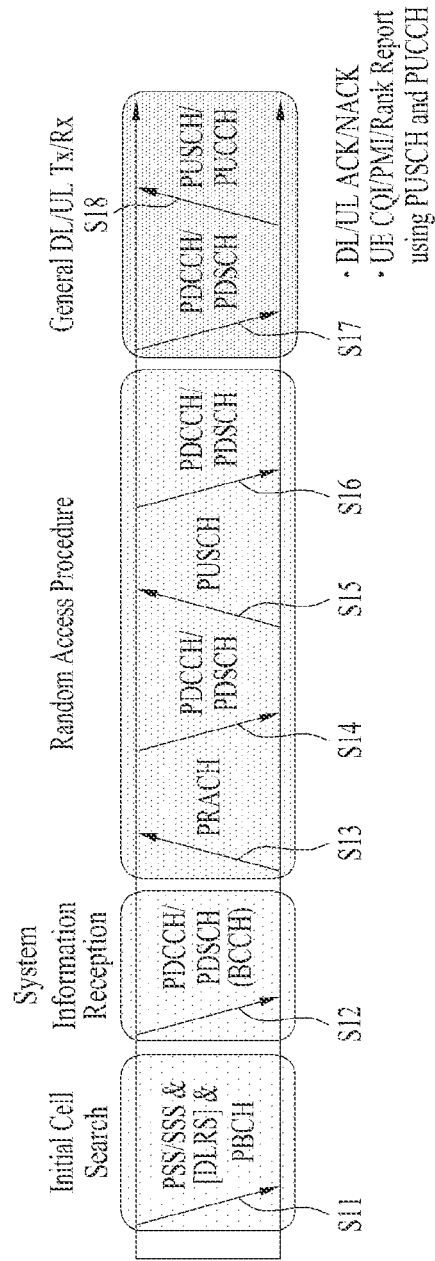
FIG. 1 illustrates physical channels and a general signal transmission method using the physical channels in a 3rd generation partnership project (3GPP) system as an exemplary wireless communication system.

FIG. 1 illustrates physical channels and a general signal transmission method using the physical channels in a 3GPP system.

When a UE is powered on or enters a new cell, the UE performs initial cell search (S101). The initial cell search involves acquisition of synchronization to a BS. For this purpose, the UE receives a synchronization signal block (SSB) from the BS. The SSB includes a primary synchronization signal (PSS), a secondary synchronization signal (SSS), and a physical broadcast channel (PBCH). The UE synchronizes its timing to the BS and acquires information such as a cell identifier (ID) based on the PSS/SSS. Further, the UE may acquire information broadcast in the cell by receiving the PBCH from the BS. During the initial cell search, the UE may also monitor a DL channel state by receiving a downlink reference signal (DL RS).

Subsequently, to complete connection to the BS, the UE may perform a random access procedure with the BS (S103 to S106). Specifically, the UE may transmit a preamble on a physical random access channel (PRACH) (S103) and may receive a PDCCH and a random access response (RAR) for the preamble on a PDSCH corresponding to the PDCCH (S104). The UE may then transmit a physical uplink shared channel (PUSCH) by using scheduling information in the RAR (S105), and perform a contention resolution procedure including reception of a PDCCH and a PDSCH signal corresponding to the PDCCH (S106).

After the above procedure, the UE may receive a PDCCH and/or a PDSCH from the BS (S107) and transmit a physical uplink shared channel (PUSCH) and/or a physical uplink control channel (PUCCH) to the BS (S108), in a general UL/DL signal transmission procedure. Control information that the UE transmits to the BS is generically called uplink control information (UCI). The UCI includes a hybrid automatic repeat and request acknowledgement/negative acknowledgement (HARQ-ACK/NACK), a scheduling request (SR), channel state information (CSI), and so on. The CSI includes a channel quality indicator (CQI), a precoding matrix index (PMI), a rank indication (RI), and so on. In general, UCI is transmitted on a PUCCH. However, if control information and data should be transmitted simultaneously, the control information and the data may be transmitted on a PUSCH. In addition, the UE may transmit the UCI aperiodically on the PUSCH, upon receipt of a request/command from a network.

Figure 2:
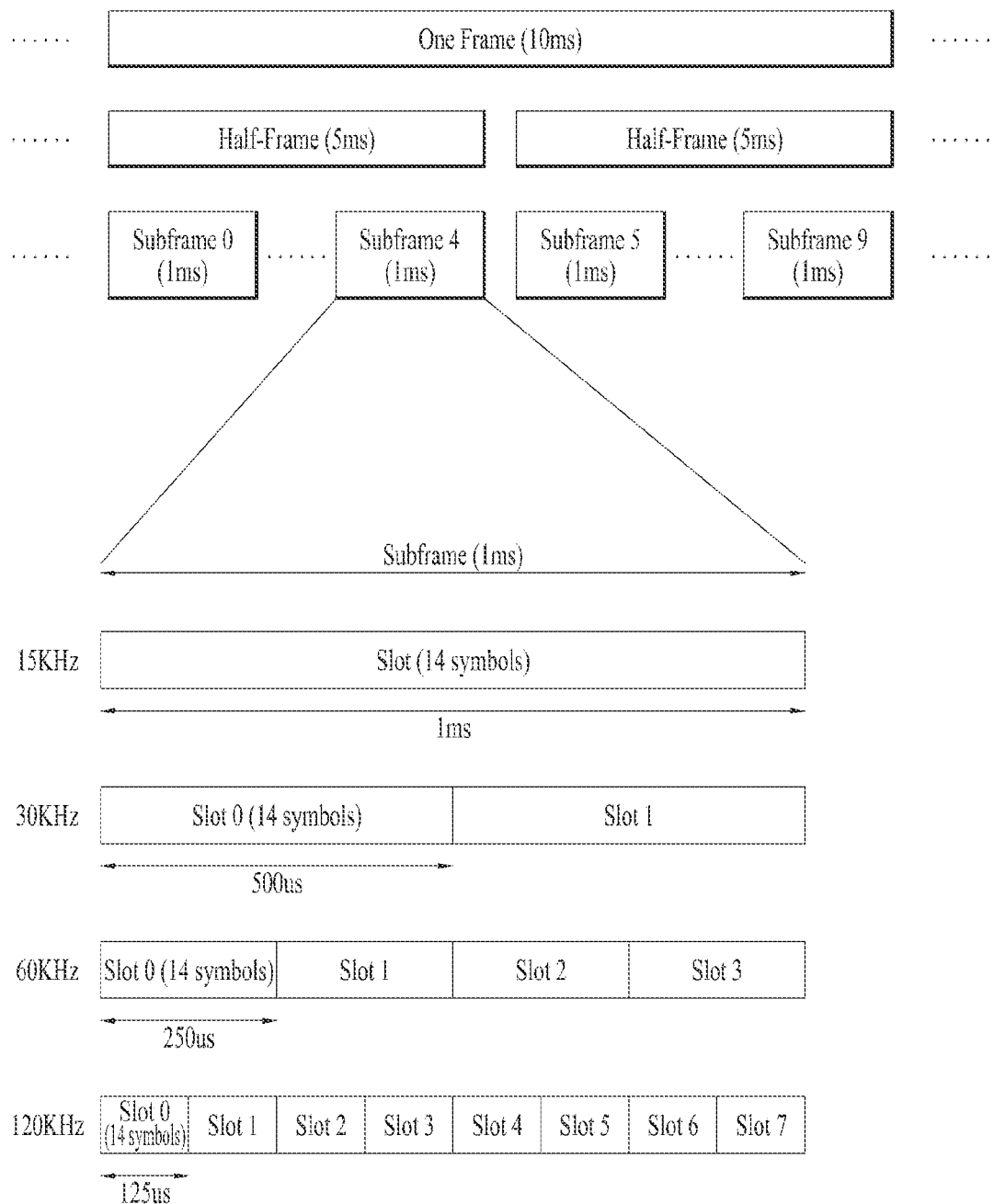
FIG. 2 illustrates a radio frame structure.

FIG. 2 illustrates a radio frame structure.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: number of symbols in a slot
*$N^{frame, u}_{slot}$: number of slots in a frame
*$N^{subframe, u}_{slot}$: number of slots in a subframe Table 2 illustrates that the number of symbols per slot, the number of slots per frame, and the number of slots per subframe vary according to SCSs in an extended CP case.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

The frame structure is merely an example, and the number of subframes, the number of slots, and the number of symbols in a frame may be changed in various manners.

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells. A symbol may include an OFDM symbol (or a CP-OFDM symbol) and an SC-FDMA symbol (or a discrete Fourier transform-spread-OFDM (DFT-s-OFDM) symbol).

NR may support various numerologies (or subcarrier spacings (SCSs)) to provide various 5G services. For example, NR may support a wide area in conventional cellular bands in an SCS of 15 kHz and support a dense urban area and a wide carrier bandwidth with lower latency in an SCS of 30/60 kHz. In an SCS of 60 kHz or above, NR may support a bandwidth higher than 24.25 GHz to overcome phase noise.

NR frequency bands may be divided into two frequency ranges: frequency range 1 (FR1) and frequency range 2 (FR2). FR1 and FR2 may be configured as shown in Table 3 below. FR 2 may mean a millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

Figure 3:
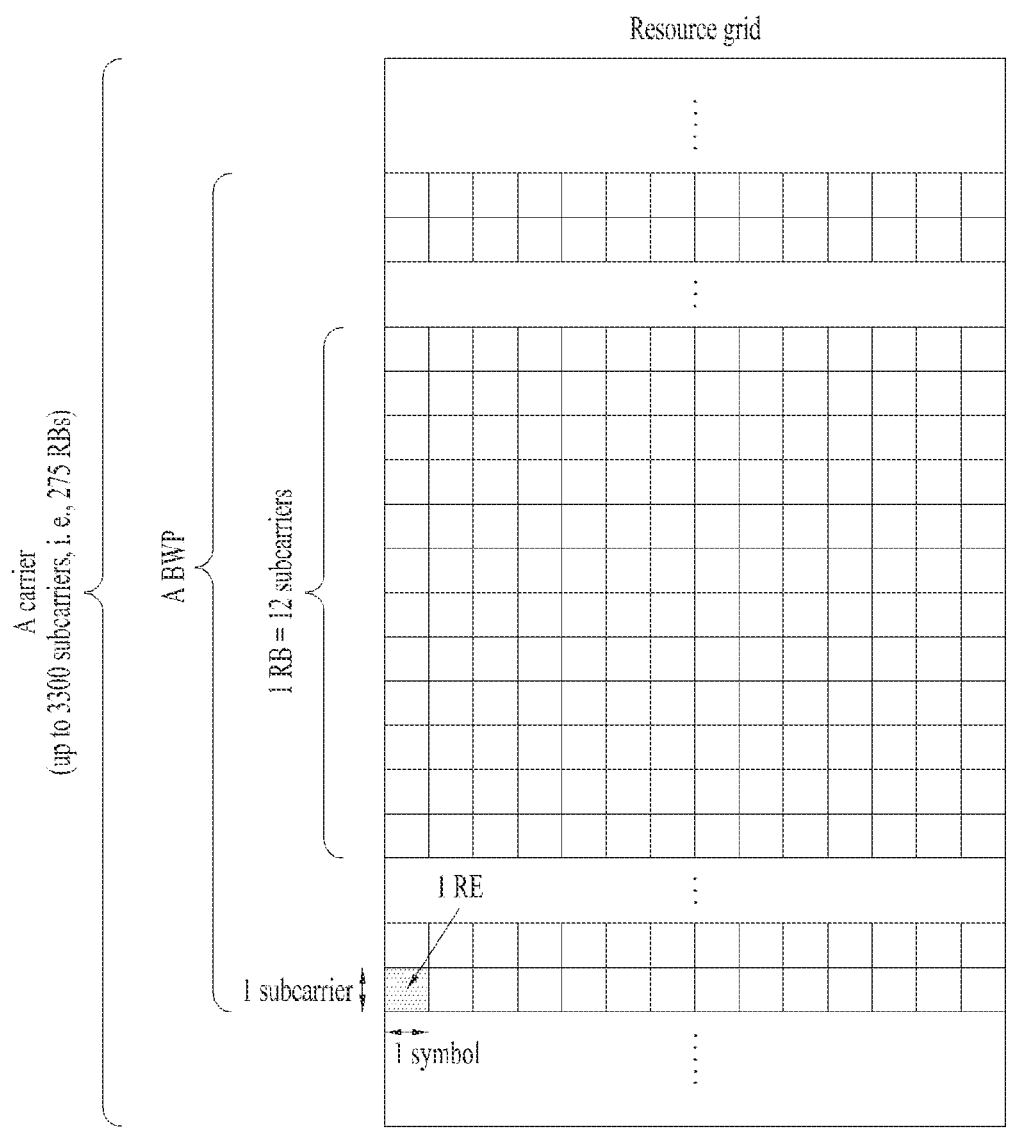
FIG. 3 illustrates a resource grid of a slot.

FIG. 3 illustrates a resource grid during the duration of one slot. A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Figure 4:
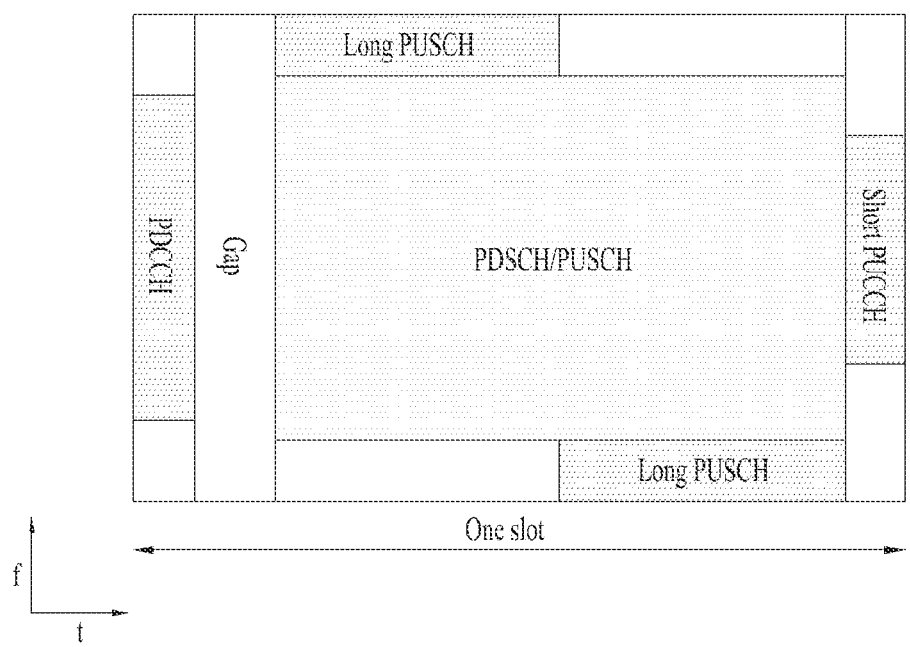
FIG. 4 illustrates mapping of physical channels in a slot.

FIG. 4 illustrates a structure of a slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel (e.g., PDCCH), and the last M symbols (hereinafter, UL control region) in the slot may be used to transmit a UL control channel (e.g., PUCCH). N and M are integers greater than or equal to 0. A resource region (hereinafter, a data region) that is between the DL control region and the UL control region may be used for DL data (e.g., PDSCH) transmission or UL data (e.g., PUSCH) transmission. The GP provides a time gap for the BS and UE to transition from the transmission mode to the reception mode or from the reception mode to the transmission mode. Some symbols at the time of DL-to-UL switching in a subframe may be configured as the GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling (CS), and so on.

Various DCI formats are provided according to information in the DCI. Table 4 exemplarily shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |

TABLE 4-continued

| DCI format | Usage |
|---|---|
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a transport block (TB)-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH.

DCI format 2_0 may be used to provide dynamic slot format information (e.g., dynamic SFI) to the UE, and DCI format 2_1 may be used to provide downlink pre-emption information to the UE. UEs defined as one group may be provided with DCI format 2_0 and/or DCI format 2_1 over a group common PDCCH, which is a PDCCH defined for a group of UEs. A slot format indicates the usage of each symbol in a slot. Specifically, the slot format indicates one of Downlink (D), Uplink (U), and Flexible (F) for each symbol. Slot format related information may be transmitted in one or more of the following signals:

- Static or semi-static slot format indication (SFI) through higher layer signaling (e.g., TDD-UL-DL-ConfigurationCommon and/or TDD-UL-DL-ConfigDedicated)
- Measurement related scheduling signal (e.g., measurement related signal configured by UE-specific RRC signaling)
- Dynamic SFI (e.g., signal transmitted in DCI format 2_0)
- UE-specific data transmission scheduling signal (e.g., UE-specific DCI)

The static or semi-static SFI may be provided by cell-specific RRC signaling (e.g., TDD-UL-DL-Configuration-Common) or UE-specific RRC signaling (e.g., TDD-UL-DL-ConfigDedicated). The measurement related signal may be provided by UE-specific RRC signaling, and the corresponding signal may indicate a periodic/semi-persistent CSI-RS, a periodic CSI report, a periodic/semi-persistent SRS, etc. The UE-specific data transmission related signal may include UE-specific DCI triggering a PUCCH along with an A/N for a PDSCH, a PUSCH, or a PDSCH, and DCI triggering an aperiodic measurement related signal such as an aperiodic CSI-RS, an aperiodic SRS, etc.

Figure 5A:
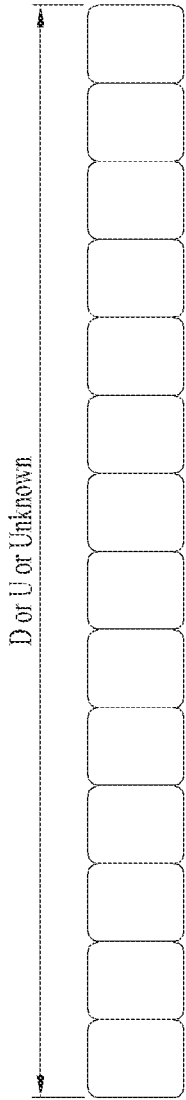
FIGS. 5A to 5C illustrate various slot formats.
Figure 5B:
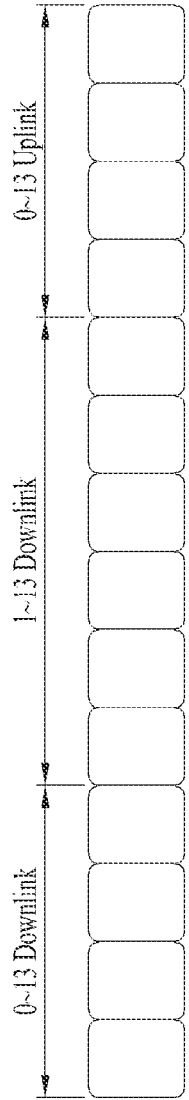
Figure 5C:
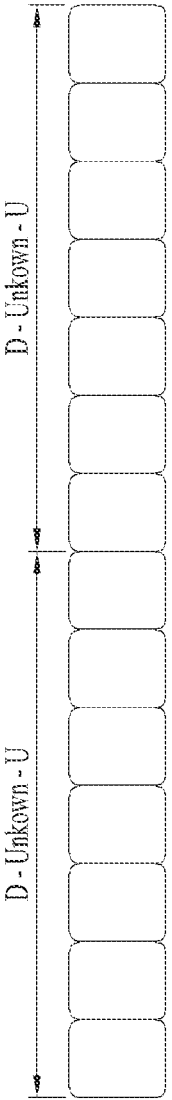

Slot formats include formats for zero, one, and two switching points. FIGS. 5A to 5C illustrate various slot formats. Specifically, FIG. 5A illustrates a slot format for zero switching points, FIG. 5B illustrates a slot format for one switching point, and FIG. 5C illustrates a slot format for two switching points.

The slot format for zero switching points includes 14 DL symbols, 14 flexible symbols, or 14 UL symbols. The slot format for one switching point is configured to start with zero or more DL symbols and end with zero or more UL symbols and include one or more flexible symbols and DL/UL symbols in between. The slot format for two switching points is configured to include first 7 symbols starting with 0 or more DL symbols and ending with one or more UL symbols at the 7th symbol and second 7 symbols starting with one or more DL symbols and ending with zero or more UL symbols. Each of the first 7 symbols and the second 7 symbols may include zero or more flexible symbols.

A maximum of 256 slot formats may be defined, and the configurations of the slot formats in specifications such as TS 38.211. The UE may be configured with a UE-specific SFI table based on the maximum 256 slot formats through higher layer signaling and receives a specific index value of the UE-specific SFI table in DCI format 2_0 (or a GC-PDCCH).

For signals carrying the above-described slot format related information, the UE may determine a slot format based on the following priority:

Slot format information through cell-specific higher layer signaling (e.g., TDD-UL-DL-Configuration Common)>slot format information through UE-specific higher layer signaling (e.g., TDD-UL-DL-ConfigDedicated)>slot format information on a GC-PDCCH (e.g., DCI format 2_0)>UE-specific data transmission scheduling information>measurement related scheduling information.

When the UE receives slot format related information in a plurality of signals, the UE may consider indication information in the signals according to the following priority only to identify the usage of a symbol indicated as flexible by a high priority signal. Therefore, when a specific symbol in a slot is indicated to the UE as DL/UL by cell-specific RRC signaling or UE-specific RRC signaling, the UE may not expect DCI format 2_0 (or a group-specific PDCCH including DCI format 2_0) to indicate the specific symbol as UL/DL or flexible. When a specific symbol in a slot is indicated as flexible by DCI format 2_0 (or a group-specific PDCCH including DCI format 2_0), the UE may transmit and receive a related signal in the specific symbol only when separately receiving scheduling information (e.g., UE-specific scheduling DCI). If the UE receives no scheduling information separately, the UE may not transmit/receive a signal in the specific symbol.

The size of DCI format 2_0 may be set to a maximum of X bits (e.g., 128 bits) by higher layer signaling.

The DCI includes a cyclic redundancy check (CRC). The CRC is masked with various identifiers (IDs) (e.g., a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

Table 5 exemplarily shows usages and transport channels of the PDCCH according to RNTIs. The transport channels are related to data carried by a PDSCH/PUSCH scheduled by the PDCCH.

TABLE 5

| RNTI | Usage | Transport Channel |
|---|---|---|
| P-RNTI | Paging and System Information change notification | PCH(Paging Channel) |
| SI-RNTI | Broadcast of System Information | DL-SCH |
| RA-RNTI | Random Access Response | DL-SCH |
| C-RNTI | Dynamically scheduled unicast transmission | UL SCH, DL-SCH |
| SFI(Slot Format Indication)-RNTI | Slot Format Indication on the given cell | N/A |

The modulation scheme for the PDCCH is fixed (e.g., Quadrature Phase Shift Keying (QPSK)), and one PDCCH is composed of 1, 2, 4, 8, or 16 control channel elements (CCEs) according to an aggregation level (AL). One CCE is composed of six resource element groups (REGs). One REG is defined as one OFDMA symbol and one (P)RB. The PDCCH is transmitted through a control resource set (CORESET). The CORESET corresponds to a set of physical resources/parameters used to carry PDCCH/DCI within a BWP. For PDCCH reception, the UE may monitor (e.g., blind-decode) a set of PDCCH candidates in the CORESET. The PDCCH candidates represent CCE(s) monitored by the UE for PDCCH reception/detection. PDCCH monitoring may be performed in one or more CORESETs in an active DL BWP in each activated cell in which PDCCH monitoring is configured. A set of PDCCH candidates monitored by the UE is defined as a PDCCH search space (SS) set. The SS set may be a common search space (CSS) set or a UE-specific search space (USS) set.

Figure 6A:
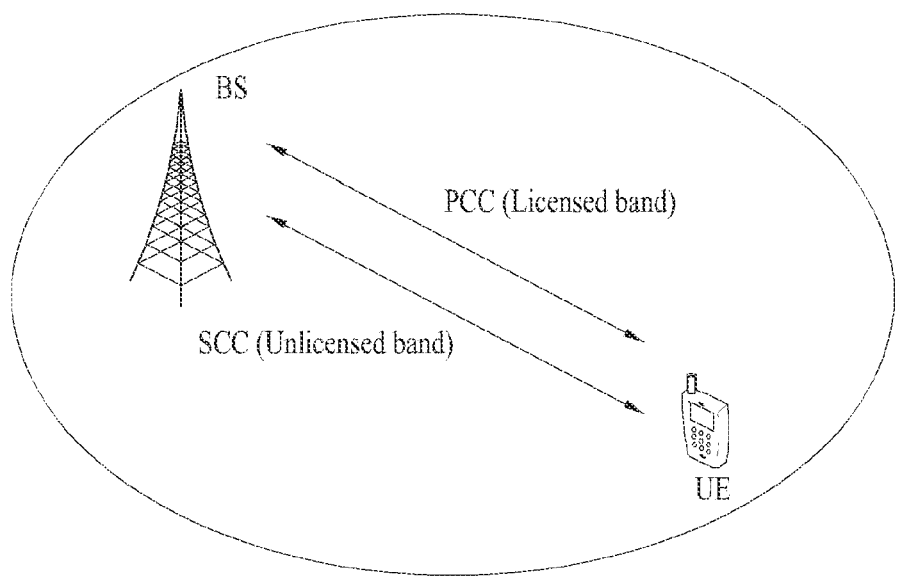
FIGS. 6A and 6B illustrate an exemplary wireless communication system supporting an unlicensed band.
Figure 6B:
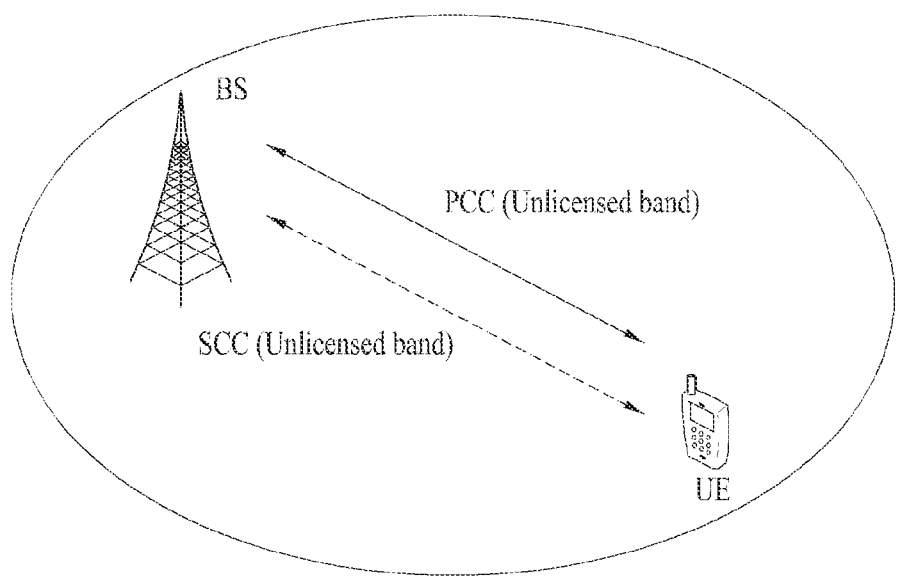

FIGS. 6A and 6B illustrate an exemplary wireless communication system supporting an unlicensed band applicable to the present disclosure. In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When carrier aggregation is supported, one UE may use a plurality of aggregated cells/carriers to exchange a signal with the BS. When one UE is configured with a plurality of CCs, one CC may be set to a primary CC (PCC), and the remaining CCs may be set to secondary CCs (SCCs). Specific control information/channels (e.g., CSS PDCCH, PUCCH) may be transmitted and received only on the PCC. Data may be transmitted and received on the PCC/SCC. FIG. 6A shows a case in which the UE and BS exchange signals on both the LCC and UCC (non-standalone (NSA) mode). In this case, the LCC and UCC may be set to the PCC and SCC, respectively. When the UE is configured with a plurality of LCCs, one specific LCC may be set to the PCC, and the remaining LCCs may be set to the SCC. FIG. 6A corresponds to the LAA of the 3GPP LTE system. FIG. 6B shows a case in which the UE and BS exchange signals on one or more UCCs with no LCC (standalone (SA) mode). In this case, one of the UCCs may be set to the PCC, and the remaining UCCs may be set to the SCC. Both the NSA mode and SA mode may be supported in unlicensed bands of the 3GPP NR system.

The signal transmission/reception operation in an unlicensed band described in the present disclosure may be performed based on the above-described deployment scenario (unless otherwise stated). Also, the definitions below may be applied to terms used herein.

Channel: May be composed of consecutive RBs in which a channel access procedure is performed in a shared spectrum, and may refer to a carrier or a part of a carrier.

Channel Access Procedure (CAP): Represents a procedure for evaluating channel availability based on sensing in order to determine, before signal transmission, whether other communication node(s) use a channel. A basic unit for sensing is a sensing slot of duration $T_{sl}=9$ us. If a BS or a UE senses a channel for the sensing slot duration, and the power detected for at least 4 us within the sensing slot duration is less than an energy detection threshold $X_{Thresh}$, the sensing slot duration $T_{sl}$ is considered an idle state. Otherwise, the sensing slot duration $T_{sl}=9$ us is considered a busy state. The CAP may be referred to as Listen-Before-Talk (LBT).

Channel occupancy: Means the corresponding transmission(s) by the BS/UE on the channel(s) after the CAP is performed.

Channel Occupancy Time (COT): Refers to the total time for which the BS/UE and any BS/UE(s) sharing the channel occupancy may perform transmission(s) on the channel after the BS/UE performs the CAP. In determining the COT, when the transmission gap is 25 us or less, the gap period is also counted in the COT. The COT may be shared for transmission between the BS and the corresponding UE(s).

DL transmission burst: Defined as a set of transmissions from the BS, with no gap exceeding 16 us. Transmissions from the BS, separated by a gap exceeding 16 us, are considered DL transmission bursts separate from each other. In the DL transmission burst, the BS may perform the transmission(s) after the gap without sensing channel availability.

UL transmission burst: Defined as a set of transmissions from the UE, with no gap exceeding 16 us. Transmissions from the UE, separated by a gap exceeding 16 us, are considered UL transmission bursts separate from each other. In the UL transmission burst, the UE may perform transmission(s) after the gap without sensing channel availability.

Figure 7:
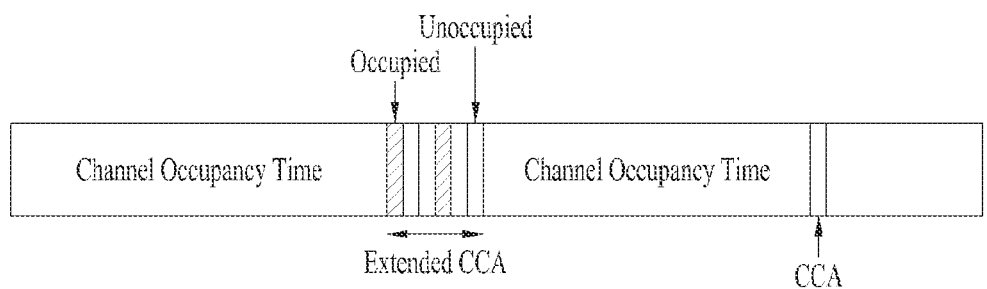
FIG. 7 illustrates an exemplary method of occupying resources in an unlicensed band.

FIG. 7 illustrates an exemplary method of occupying resources in an unlicensed band. A communication node (e.g., a BS, a UE) within the unlicensed band must determine whether the channel is used by other communication node(s) before signal transmission. To this end, the communication node in the unlicensed band may perform the CAP to access the channel(s) on which the transmission(s) is performed. The CAP may be performed based on sensing. For example, the communication node may first perform carrier sensing (CS) before signal transmission to check whether other communication node(s) are transmitting a signal. A case where it is determined that the other communication node(s) does not transmit a signal is defined as confirming clear channel assessment (CCA). When there is a CCA threshold (e.g., $X_{Thresh}$) that is pre-defined or set by a higher layer (e.g., RRC), the communication node determines the channel state as busy if energy higher than the CCA threshold is detected on the channel. Otherwise, the channel state may be determined as idle. When it is determined that the channel state is idle, the communication node may start transmitting a signal in the unlicensed band. In the LTE/NR system, the eNB/gNB or UE needs to perform LBT to transmit a signal in an unlicensed band. In addition, when the eNB/gNB or UE in the LTE/NR system performs signal transmission, other communication nodes such as a Wi-Fi node, etc. need to perform LBT to avoid causing interference to the eNB/gNB or UE. The above-described series of processes may be referred to as LBT or a CAP.

In the description below, when it is said that the BS transmits a signal by succeeding in the CAP, it may mean that the BS transmits the signal in a corresponding unlicensed band (or unlicensed cell) determined to be idle by the CAP. On the other hand, when it is said that the BS fails the CAP at a specific time point, it may mean that the BS is incapable of transmitting a signal because a corresponding unlicensed band (or unlicensed cell) is determined to be busy (e.g., occupied by another communication node) at the specific time point.

Table 6 exemplarily shows the types of CAP.

TABLE 6

| | Type | Explanation |
|---|---|---|
| DL/ UL | Type 1 CAP | CAP with random back-off time duration spanned by the sensing slots that are sensed to be idle before a downlink transmission(s) is random |
| | Type 2 CAP | CAP without random back-off time duration spanned by sensing slots that are sensed to be idle before a downlink transmission(s) is deterministic |

Figure 8:
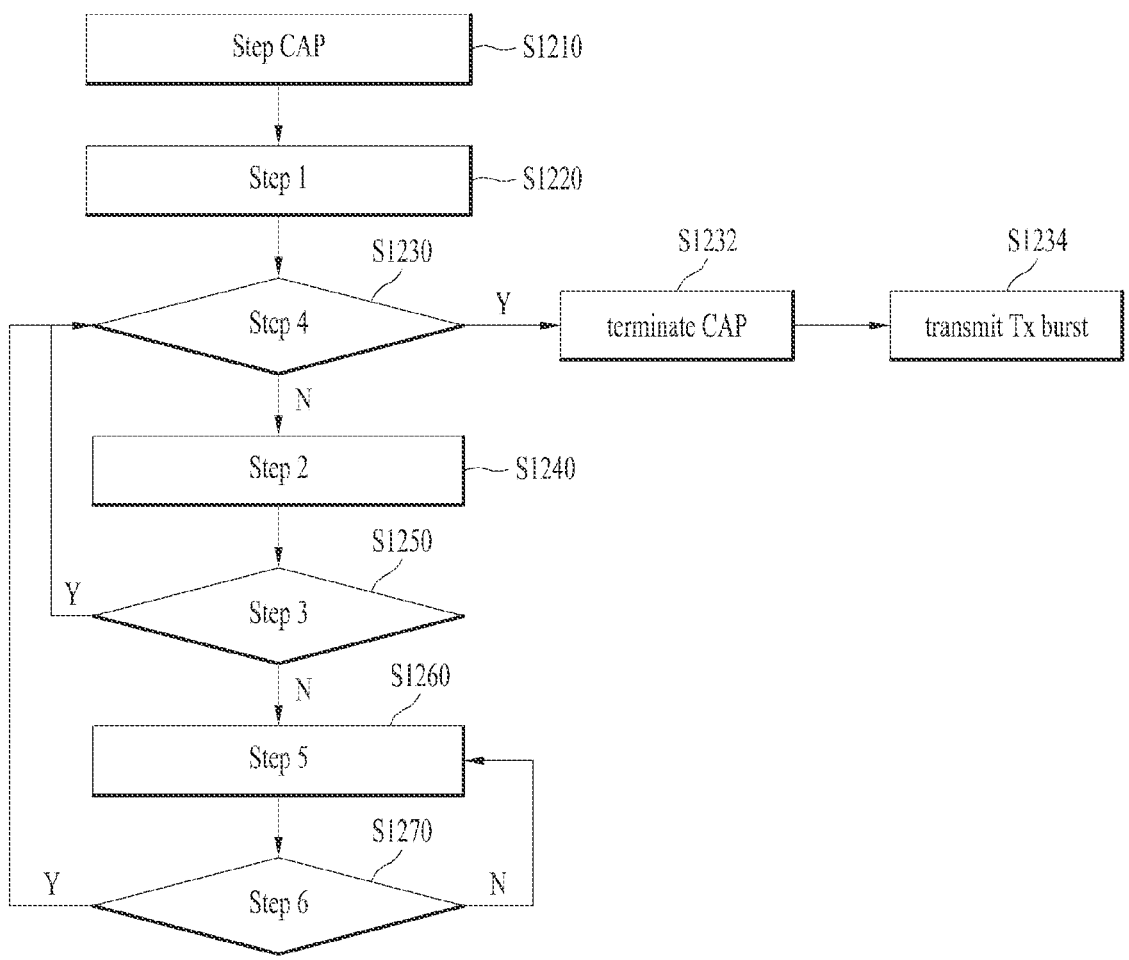
FIG. 8 illustrates a channel access procedure (CAP).

FIG. 8 is a flowchart of a CAP operation for transmitting a downlink signal through an unlicensed band of a BS. Referring to FIG. 8, the BS first senses whether a channel is in an idle state for a sensing slot duration of a defer duration $T_d$, and may then perform transmission when the counter N reaches 0 (S1234). Here, the counter N is adjusted by sensing the channel for additional sensing slot duration(s) according to the procedure below:

Step 1) (S1220) Set N=$N_{init}$. Here, $N_{init}$ is a random value uniformly distributed between 0 and $CW_p$. Then, go to step 4.

Step 2) (S1240) If N>0 and the BS chooses to decrement the counter, set N=N−1.

Step 3) (S1250) Sense a channel for an additional sensing slot duration. Then, if the additional sensing slot duration is idle (Y), go to step 4. If not (N), go to step 5.

Step 4) (S1230) If N=0 (Y), terminate the CAP (S1232). Otherwise (N), go to step 2.

Step 5) (S1260) Sense a channel until a busy sensing slot is detected within the additional defer duration $T_d$ or all sensing slots within the additional delay period $T_d$ are detected as idle.

Step 6) (S1270) If the channel is sensed as idle for all sensing slot durations of the additional defer duration $T_d$ (Y), go to step 4. If not (N), go to step 5.

Table 7 exemplarily shows that $m_p$, the minimum contention window (CW), the maximum CW, the maximum channel occupancy time (MCOT) and the allowed CW size applied to the CAP vary according to the channel access priority class.

TABLE 7

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

The defer duration $T_d$ is composed of a duration of $m_p$ consecutive sensing slot $T_{sl}$ (9 us)+duration $T_f$ (16 us). $T_f$ includes the sensing slot duration $T_{sl}$ at the start of the 16 us duration.

Specific Embodiments

For a UE, only a single carrier may be configured, or a plurality of carriers may be aggregated/configured in an unlicensed band. In this case, a maximum of four BWPs may be configured for each carrier, and only one BWP may be activated. When a frequency band unit forming a basis of CAP in the unlicensed band is defined as a CAP-BW, each carrier/BWP may correspond to one CAP-BW or may a plurality of CAP-BWs. The size of one CAP-BW may be a fixed value or may be set differently according to the configuration of the network (or BS). For example, the size of one CAP-BW may be fixed to 20 MHz or may be variably set within a carrier based on higher layer (e.g., RRC) signaling and/or DCI. When the CAP-BW configuration information is not configured, the CAP-BW size/deployment may follow a predefined value according to the frequency region of the carrier. The CAP-BW may be composed of consecutive RBs (hereinafter, an RB set). In the present disclosure, the CAP-BW and the RB set may have the same meaning.

Figure 9:
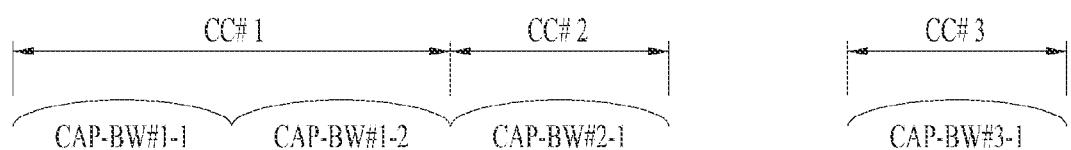
FIG. 9 illustrates a CAP-bandwidth (CAP-BW).

FIG. 9 illustrates a case where CAP-BWs are configured in carriers. Referring to FIG. 9, three component carriers (CCs) are configured. CC#1 may correspond to two CAP-BWs, and each of CCs #2 and #3 may correspond to one CAP-BW. CC#1/#2 may be defined as intra-band carrier aggregation (CA), and CC#1/#2 and CC#3 may be defined as inter-band CA.

In this case, the BS may perform CAP for each CAP-BW and may transmit a DL burst in a (CAP successful) CAP-BW and skip transmitting a DL burst in other (CAP failed) CAP-BWs according to the results of the CAP. In addition, in a CAP-BW occupied for a predetermined time through the CAP, a portion of the occupancy time may be shared with the UL burst. Also, informing the UE of the frequency domain occupancy information about the BS may be advantageous in at least the following aspects.

The UE may perform power saving by skipping PDCCH monitoring in a CAP-BW (e.g., CAP-BW OFF state) known not to be occupied by the BS. Here, skipping PDCCH monitoring may include skipping monitoring of a DCI format (e.g., DCI format 0_X, DCI format 1_X) for data scheduling. However, PDCCH monitoring for receiving a group common DCI format (e.g., DCI format 2_0) in the CAP-BW OFF duration may be exceptionally performed.

The UE may save power by skipping CSI/RRM (Radio Resource Management)/RLM (Radio Link Monitoring) measurement in a CAP-BW that is known not to be occupied by the BS. For example, when the CSI-RS is configured to be transmitted in a CAP-BW OFF slot, the UE may skip channel measurement based on the CSI-RS in the CAP-BW OFF slot. Alternatively, the CSI-RS in the CAP-BW OFF slot may be excluded from the channel measurement procedure.

For a CAP for UL burst transmission shared with a DL burst occupied by the BS, UL transmission may be allowed if the channel is idle only for a certain time without random backoff, or may be allowed even without checking whether the channel is idle/busy.

In the existing NR system, the DL/UL direction may be dynamically signaled through DCI. Specifically, SFI fields for a plurality of cells may be included in the DCI, and the SFI field position of a cell in the DCI bitstream may be determined based on an offset set for the cell. For example, suppose an SFI field corresponding to cell #1 is represented in 3 bits and an SFI field corresponding to cell #2 is represented in 5 bits. In this case, in the DCI for SFI indication having the total size of 100 bits, a section corresponding to cell #1 may be 3 bits from N1 (e.g., N1=14) bits, and a section corresponding to cell #2 may be 5 bits from N2 (e.g., N2=50) bits. N1 and N2 are set for each cell. The SFI field includes an SFI-index. SFI-index corresponds to one SlotFormatCombination, and SlotFormatCombination indicates the slot format for K (=>1) consecutive slots. The slot format indicates DL/UL/flexible for each symbol in the slot. K may also be set differently for each SFI-index. In the existing NR, the DCI for SFI indication may correspond to DCI format 2_0 as a group common PDCCH, and may be scrambled with SFI-RNTI. The UE may perform communication in the slot based on the slot format. For example, in the slot, PDCCH monitoring/reception, PDSCH reception, and/or CSI-RS reception/measurement may be performed in a DL symbol, and PUCCH transmission, PUSCH transmission, and/or SRS transmission may be performed in a UL symbol.

Table 8 exemplarily shows slot formats. Here, D denotes a DL symbol, U denotes a UL symbol, and F denotes a flexible symbol.

TABLE 8

| For- | Symbol number in a slot | | | | | | | | | | | | | |
|---|---|---|---|---|---|---|---|---|---|---|---|---|---|---|
| mat | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| ... | ... | ... | ... | ... | ... | ... | ... | ... | ... | ... | ... | ... | ... | ... |
| 255 | D | D | F | F | F | U | U | U | D | D | D | D | D | D |

Hereinafter, in the present disclosure, a method of notifying DL/UL direction and/or frequency domain occupancy information is proposed. Specifically, in the present disclosure, a method of notifying DL/UL direction information and/or frequency domain occupancy information about a BS for each CAP-BW (or each BWP/carrier, each CAP-BW/BWP/carrier group) is proposed. The proposal of the present disclosure may be limitedly applied to carriers operating in an unlicensed band (or a shared spectrum band).

In the present disclosure, the DL/UL direction and/or frequency domain occupancy information may be signaled through physical layer control information (e.g., DCI). For simplicity, in the present disclosure, the DCI is referred to as channel occupancy-DCI (CO-DCI). The CO-DCI may be configured based on the existing DCI format 2_0. As an example, the CO-DCI may be defined in DCI format 2_0. In this case, in order to indicate CO-DCI information (e.g., DL/UL direction and/or frequency domain occupancy information), a new field may be added to DCI format 2_0 or some fields of DCI format 2_0 may be reinterpreted. In addition, a new group common DCI format may be defined for CO-DCI. Alternatively, the CO-DCI may be configured based on an existing UE-specific DCI format. For example, the CO-DCI may be defined in an existing UE-specific DCI format. In this case, in order to indicate CO-DCI information, a new field may be added to the existing UE-specific DCI format or some fields of the existing UE-specific DCI format may be reinterpreted. In addition, a new UE-specific DCI format may be defined for the CO-DCI.

1) Receiver (Entity A (e.g., UE)):

[Method #1] Configuring an SFI Field for Each CAP-BW in the CO-DCI

Figure 10:
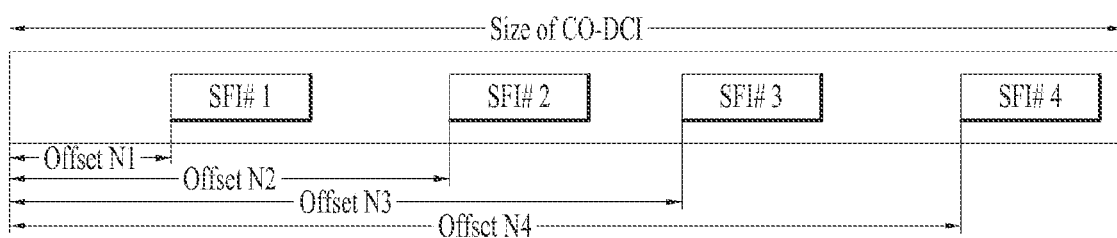
FIGS. 10 to 20 illustrate proposed methods in the description.

For example, in the CA situation of FIG. 9, N1 may be set for CAP-BW#1-1, N2 may be set for CAP-BW#1-2, N3 may be set for CAP-BW#2-1, and N4 may be set for CAP-BW#3-1, as shown in FIG. 10. Thereby, the SFI may be indicated for each CAP-BW in the CO-DCI.

[Method #1-1] Configuring an SFI Field for Each CAP-BW in the CO-DCI, Wherein Specific CAP-BWs May Share the Same Offset Value In FIG. 10, the entirety or part of N1/N2/N3/N4 may be set to the same value. For example, CAP-BW#1-1/#1-2 belong to the same carrier. Accordingly, on the assumption that the BS indicates the same D/U direction for CAP-BW#1-1/#1-2, DCI overhead may be reduced by indicating the D/U direction of CAP-BW#1-1/#1-2 through the same field in the CO-DCI. That is, the D/U direction (e.g., SFI field) may be configured for each carrier. However, since the ON/OFF (or available/unavailable) state of CAP-BW#1-1/#1-2 may also be shared, the ON/OFF state may not be indicated for each of the CAP-BWs. Such signaling configuration may implicitly indicate that the BS attempts to perform transmission only when the CAP is successful for both CAP-BW#1-1 and CAP-BW#1-2, which belong to CC#1, and otherwise, it does not transmit the DL burst. In addition, setting the offsets corresponding to CAP-BW#1-1/#1-2 belonging to the same carrier to the same value may mean that RBs corresponding to a guard band present between CAP-BW#1-1/#1-2 are available (e.g., mapped/transmitted) (for, for example, PDCCH, PDSCH and/or CSI-RS transmission) (or may be interpreted as meaning that the guard band is not configured).

Alternatively, a transmission mode related to a transmission method for each CAP-BW of the BS may be separately configured. For example, it may be separately signaled whether the mode is a mode (hereinafter, mode1) in which transmission is performed (in all CAP-BWs) only when the CAP is successful for all CAP-BWs belonging to the carrier/active BWP, or a mode (hereinafter, mode2) in which transmission is attempted for some CAP-BWs when the CAP is successful for the some CAP-BWs among the CAP-BWs belonging to the carrier/active BWP. When mode1 is configured, the UE may assume that the SFI field is shared (i.e., the same offset value is set or an offset value is set for each cell) for all the CAP-BWs belonging to the carrier/active BWP. When mode2 is configured, the UE may assume that the SFI field is configured for each CAP-BW belonging to the carrier/active BWP (i.e., a separate offset value is set, or an offset value is set for each CAP-BW).

In [Method #1] and [Method #1-1], through a specific state of the SFI field, it may be indicated that the CAP-BW(s) is OFF (that is, the BS does not attempt transmission due to CAP failure). As an example, when the SFI field is configured in 3 bits and is set to '000', it may indicate that the CAP-BW(s) corresponding to the SFI field is in an OFF state. As another example, when SlotFormatCombination is not linked to a specific state (e.g., SFI-index) of the SFI field, the state may be utilized to indicate the OFF state of the CAP-BW(s). The SFI field size may be determined by the set maximum number of SFI-indexes. When the SFI field size is 3 bits, SlotFormatCombination may not be configured for some of the 8 SFI-indexes. In this case, when the value of an SFI-index for which SlotFormatCombination is not configured is signaled, the UE may recognize that the corresponding CAP-BW(s) is in an OFF state.

When the CAP-BW(s) is in the OFF state, the UL slot/symbol information about the CAP-BW in the ON state belonging to the same carrier/BWP or the same band as the CAP-BW(s) may be passed on to the CAP-BW(s) in the OFF state. As an example, CAP-BW#1-1 may be signaled in the OFF state, but CAP-BW#1-2 may be signaled in the ON state (when separate SFI fields are configured for CAP-BW#1-1 and CAP-BW#1-2). In this case, for example, if all symbols of slot #k/k+1 are signaled as UL for CAP-BW#1-2 through CO-DCI, the UE may recognize that CAP-BW#1-1 is also UL for slot #k/k+1. This is because it may be considered impossible to perform reception in an adjacent band while performing transmission in the adjacent band, on the assumption that a BS operating in the unlicensed band generally operates through one radio frequency (RF) module. Accordingly, the UE may recognize that, during slot #k/k+1, PDCCH monitoring is not performed in either CAP-BW#1-1 or CAP-BW#1-2 and configured UL transmission (e.g., periodic/semi-persistent PUCCH/SRS, configured grant PUSCH, etc.) is allowed.

The DL burst or the channel occupancy of the BS may be divided into two time durations (for all cells configured in the unlicensed band or a part thereof). One is a duration (duration 1) within the first k slots, and the other is a duration (duration 2) after the first k slots. Here, k may be predefined as an integer greater than or equal to 1 or may be set by separate RRC signaling. The reason for dividing the DL burst or the channel occupancy of the BS into two durations is that the BS does not know a CAP-BW in which the BS will actually succeed in CAP, and thus the CAP-BW state information is uncertain in duration 1. Accordingly, even if CAP-BW ON is indicated, duration 1 may be treated similarly to a case where the CAP-BW is OFF. For example, the UE may perform PDCCH monitoring in the same manner as in the duration in which the CAP-BW is OFF (e.g., the same as PDCCH monitoring before CO-DCI is discovered), and may not perform CSI measurement. On the other hand, in duration 2, it may be clearly determined whether the CAP-BW is ON or OFF according to the CAP-BW state information. Accordingly, in duration 2, the UE may perform an operation according to CAP-BW ON/OFF. For example, when the CAP-BW is ON, the UE may perform PDCCH monitoring based on a scheme (e.g., search space set/DCI format) defined for the CAP-BW ON duration and also perform CSI measurement. For example, DCCH monitoring in the CAP-BW ON duration may include DCI format 0_X/1_X/2_0 monitoring. On the other hand, when the CAP-BW is OFF, the UE may perform PDCCH monitoring based on a scheme (e.g., search space set/DCI format) defined for the CAP-BW OFF duration and may not perform (e.g., may omit/skip) CSI measurement. For example, in the CAP-BW OFF duration, the PDCCH monitoring may include DCI format 2_0 monitoring, but may not include DCI format 0_X/1_X monitoring.

Accordingly, through the specific state of the SFI field, it may be indicated that the corresponding CAP-BW(s) (in the slot in which the CO-DCI is detected) belongs to the first slot of transmission (e.g., DL burst) or to the first k slot(s) in the time duration occupied by the BS. As an example, when the SFI field is configured in 3 bits and is set to '111', it may indicate that the CAP-BW(s) corresponding to the SFI field (in the slot in which the CO-DCI is detected) belongs to the first slot (or the first k slots) of the DL burst. As another example, when SlotFormatCombination is not linked to a specific state (e.g., SFI-index) of the SFI field, the state may be utilized. The SFI field size may be determined by the set maximum number of SFI-indexes. When the SFI field size is 3 bits, SlotFormatCombination may not be configured for some of the 8 SFI-indexes. In this case, when the value of SFI-index for which SlotFormatCombination is not configured is signaled, the UE may recognize that the CAP-BW(s) belongs to the first slot (or the first k slots) of the DL burst (in the slot in which the CO-DCI is detected). Then, the UE may assume DL (for all cells configured in the unlicensed band or a part thereof) during the first slot (or the first k slots) of the DL burst. That is, in the slot(s) in which the CAP-BW(s) is recognized as belonging to the first slot (or the first k slots) of the DL burst, all symbols may be assumed to be DL. Accordingly, the UE may perform PDCCH monitoring on the assumption that all symbols in the slot(s) are DL in the CAP-BW(s). In this method, in order to update the slot format of the CAP-BW(s), the BS may transmit DCI format 2_0 again within the same DL burst. For example, upon receiving SFI=111, the UE may recognize only that the CAP-BW(s) is the start of the DL burst, and identify the slot format (e.g., D/U/F) in the DL burst/COT based on the updated SFI information, while monitoring the PDCCH as in the case where the CAP-BW(s) is outside the DL burst.

In addition, the DL burst or the channel occupancy of the BS may be divided into two time durations (for all cells configured in the unlicensed band or a part thereof), and a search space set (or PDCCH) may be independently configured for each of the durations. For example, duration 1 may be defined as a duration within the first k slots in the DL burst or the channel occupancy of the BS (for all cells configured in the unlicensed band or a part thereof), and duration 2 may be defined as a duration after the first k slots in the DL burst or the channel occupancy of the BS (for all cells configured in the unlicensed band or a part thereof). Here, k may be predefined as an integer greater than or equal to 1 or may be set by separate RRC signaling. Specifically, when it is signaled/recognized that the CAP-BW(s) belongs to the first slot (or the first k slots) of the DL burst (in the slot in which the CO-DCI is detected), the UE may monitor a PDCCH belonging to a specific first search space set configured to be monitored for the corresponding duration (e.g., duration 1) (for all cells configured in the unlicensed band or a part thereof), or may monitor a specific first PDCCH configured to be monitored for the corresponding duration (e.g., duration 1). On the other hand, when it is signaled/recognized that the CAP-BW(s) is in the ON state (in the slot in which the CO-DCI is detected), but does not belong to the first slot (or the first k slots) of the DL burst, the UE may monitor a PDCCH belonging to a specific second search space set configured to be monitored for the corresponding duration (e.g., duration 2) (for all cells configured in the unlicensed band or a part thereof), or may monitor a specific second PDCCH configured to be monitored for the corresponding duration (e.g., duration 2). Here, the specific first and second search space sets may be different from each other. For example, the specific first and second search space sets may have different PDCCH monitoring periodicities. Also, the specific first and second PDCCHs may be different from each other. For example, DCI formats transmitted on the specific first and second PDCCHs may be different from each other. For example, the DCI format transmitted on the specific first PDCCH may include a group common DCI format (e.g., DCI format 2_0). Also, the DCI format transmitted on the specific second PDCCH may include a DCI format for data scheduling (e.g., DCI format 0_X/1_X) and a group common DCI format (e.g., DCI format 2_0).

Figure 11:
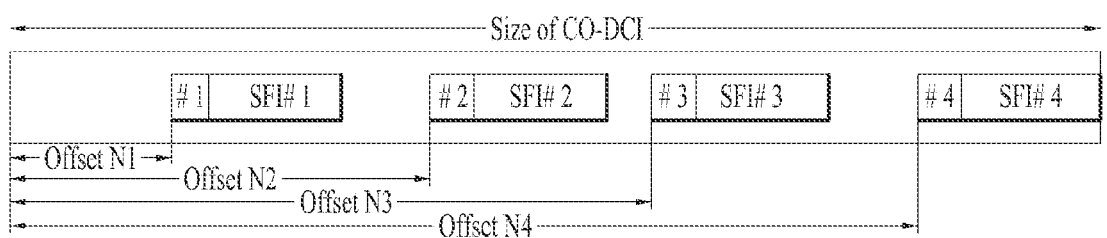

[Method #2] Configuring an SFI Field for Each CAP-BW in the CO-DCI and Configuring a Bitmap for Indicating the ON/OFF State of Each CAP-BW Through a Separate Field In the CA situation as shown in FIG. 9, N1 may be set for CAP-BW#1-1, N2 may be set for CAP-BW#1-2, N3 may be set for CAP-BW#2-1, and N4 may be set for CAP-BW#3-1, as shown in FIG. 11. Thereby, the ON/OFF state and SFI may be indicated for each CAP-BW in the CO-DCI. While the SFI field and the field indicating ON/OFF are illustrated in FIG. 11 as being consecutively positioned, a bit indicating the ON/OFF state may be added after the SFI field, or a bitmap or bit-field indicating ON/OFF may be configured through a separate offset value for each CAP-BW.

[Method #2-1] Configuring an SFI Field for Each CAP-BW in the CO-DCI and Configuring a Bitmap for Indicating the ON/OFF State of Each CAP-BW Through a Separate Field, Wherein Specific CAP-BWs May Share a SFI Field and/or a Bit-Field Value Indicating the ON/OFF State In FIG. 11, the entirety or part of N1/N2/N3/N4 may be set to the same value. For example, CAP-BW#1-1/#1-2 belong to the same carrier. Accordingly, on the assumption that the BS indicates the same D/U direction for CAP-BW#1-1/#1-2, DCI overhead may be reduced by indicating the D/U direction of CAP-BW#1-1/#1-2 through the same field in the CO-DCI. That is, the D/U direction (e.g., SFI field) may be configured for each carrier. However, since the ON/OFF state of CAP-BW#1-1/#1-2 is also shared, the ON/OFF state may not be indicated for each of the CAP-BWs. Such signaling configuration may implicitly indicate that the BS attempts to perform transmission only when the CAP is successful for both CAP-BW#1-1 and CAP-BW#1-2, which belong to CC#1, and otherwise, it does not transmit the DL burst. In addition, setting the offsets corresponding to CAP-BW#1-1/#1-2 belonging to the same carrier to the same value may mean that RBs corresponding to a guard band present between CAP-BW#1-1/#1-2 are available (e.g., mapped/transmitted) (for, for example, PDCCH, PDSCH and/or CSI-RS transmission) (or may be interpreted as meaning that the guard band is not configured).

Alternatively, a transmission mode related to a transmission method for each CAP-BW of the BS may be separately configured. For example, it may be separately signaled whether the mode is a mode (hereinafter, mode1) in which transmission is performed (in all CAP-BWs) only when CAP is successful for all CAP-BWs belonging to the carrier/active BWP, or a mode (hereinafter, mode2) in which transmission is attempted for some CAP-BWs when CAP is successful for the some CAP-BWs among the CAP-BWs belonging to the carrier/active BWP. When mode1 is configured, the UE may assume that the SFI field and the bitmap field are shared (e.g., only 1 bit is configured for the bitmap field corresponding to the cell, and only one SFI field is configured) for all the CAP-BWs belonging to the carrier/active BWP. When mode2 is configured, the UE may assume that a bit field in the bitmap is configured for each CAP-BW belonging to the carrier/active BWP (that is, a bitmap field and an offset value for the SFI field are configured for each CAP-BW).

Figure 12:
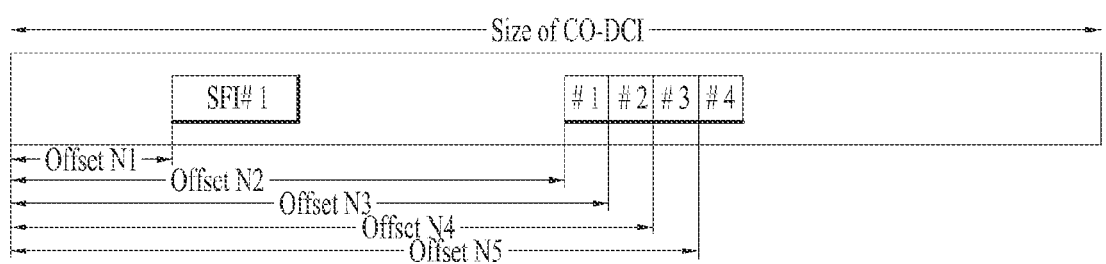

As another example, as shown in FIG. 12, an offset value of N1 may be set in common for the SFI fields for CAP-BW#1-1/1-2/2-1/3-1. In addition, in the bitmap indicating the ON/OFF state, offset values of N2/N3/N4/N5 may be set for each CAP-BW, or all or some of N2/N3/N4/N5 may be set to the same value. If N2 and N3 are set to the same value, the ON/OFF state for CAP-BW#1-1/#1-2 may also be shared, and thus the ON/OFF state may not be indicated for each of the CAP-BWs. Such signaling configuration may implicitly indicate that the BS attempts to perform transmission only when the CAP is successful for both CAP-BW#1-1 and CAP-BW#1-2, which belong to CC#1, and otherwise, it does not transmit the DL burst. In addition, setting the offsets corresponding to CAP-BW#1-1/#1-2 belonging to the same carrier to the same value may mean that RBs corresponding to a guard band present between CAP-BW#1-1/#1-2 are available (e.g., mapped/transmitted) (for, for example, PDCCH, PDSCH and/or CSI-RS transmission) (or may be interpreted as meaning that the guard band is not configured).

Figure 13:
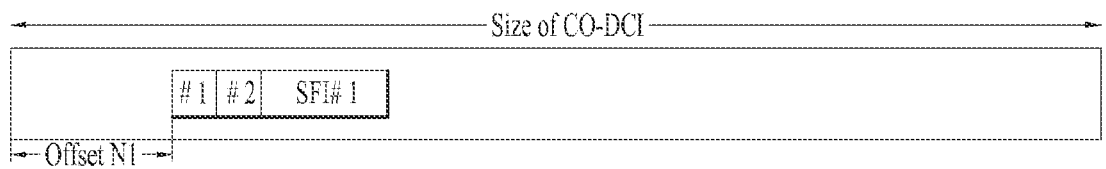

As another example, as shown in FIG. 13, for each CC (or BWP), a common offset N1 (with respect to the SFI field position) may be set, and a bitmap indicating the ON/OFF state may be signaled through a k-bit bitmap after the offset value (or before the offset value, after the end of the field size configured after N1, after the field size configured after N1). Here, k may be equal to the number of CAP-BWs corresponding to the CC (or BWP), and may be less than or equal to the number of CAP-BWs corresponding to the CC (or BWP). When k is less than the CAP-BWs, the value of k may be signaled separately. In addition, when k is less than the CAP-BWs, the relationship between each bit of the k-bit bitmap and the corresponding CAP-BW(s) may be preconfigured by the BS. When k=1, the ON/OFF state for CAP-BW#1-1/#1-2 may also be shared, and thus the ON/OFF state may not be indicated for each CAP-BW. Such signaling configuration may implicitly indicate that the BS attempts to perform transmission only when the CAP is successful for both CAP-BW#1-1 and CAP-BW#1-2, which belong to CC#1, and otherwise, it does not transmit the DL burst. In addition, setting the bit values corresponding to the ON/OFF states of CAP-BW#1-1-/#1-2 belonging to the same carrier to the same position may mean that RBs corresponding to a guard band present between CAP-BW#1-1/#1-2 are available (e.g., mapped/transmitted) (for, for example, PDCCH, PDSCH and/or CSI-RS transmission) (or may be interpreted as meaning that the guard band is not configured).

Alternatively, a transmission mode related to a transmission method for each CAP-BW of the BS may be separately configured. For example, it may be separately signaled whether the mode is a mode (hereinafter, mode1) in which transmission is performed (in all CAP-BWs) only when CAP is successful for all CAP-BWs belonging to the carrier/active BWP, or a mode (hereinafter, mode2) in which transmission is attempted for some CAP-BWs when CAP is successful for the some CAP-BWs among the CAP-BWs belonging to the carrier/active BWP. When mode1 is configured, the UE may assume that the bitmap field indicating the ON/OFF state is shared for all CAP-BWs belonging to the carrier/active BWP (that is, only 1 bit is configured for the bitmap field corresponding to the cell). Alternatively, if a bit field in the bitmap is configured for each CAP-BW belonging to the carrier/active BWP when mode1 is configured, the UE may assume that only '1' or '0' is signaled in the bitmap. When mode2 is configured, the UE may assume that a bit field in the bitmap is configured for each CAP-BW belonging to the carrier/active BWP (that is, an offset value for the bitmap field is set for each CAP-BW).

In [Method #2] and [Method #2-1], the UE may recognize that the corresponding CAP-BW is OFF if 1-bit information corresponding to each CAP-BW(s) is '0' (or '1'), and that the corresponding CAP-BW is ON if the information is '1' (or '0'). When the CAP-BW(s) is in the OFF state, the UL slot/symbol information about the CAP-BW in the ON state belonging to the same carrier/BWP or the same band as the CAP-BW(s) may be passed on to the CAP-BW(s) in the OFF state. As an example, CAP-BW#1-1 may be signaled in the OFF state, but CAP-BW#1-2 may be signaled in the ON state (when ON/OFF information about CAP-BW#1-1 and ON/OFF information about CAP-BW#1-2 are signaled through separate bit-fields and the SFI field is signaled in common). In this case, for example, if all symbols of slot #k/k+1 are signaled as UL for CAP-BW#1-2 through CO-DCI, the UE may recognize that CAP-BW#1-1 is also UL for slot #k/k+1. This is because it may be considered impossible to perform reception in an adjacent band while performing transmission in the adjacent band, on the assumption that a BS operating in the unlicensed band generally operates through one RF module. Accordingly, the UE may recognize that, during slot #k/k+1, PDCCH monitoring is not performed in either CAP-BW#1-1 or CAP-BW#1-2, and that configured UL transmission (e.g., periodic/semi-persistent PUCCH/SRS, configured grant PUSCH, etc.) is allowed.

Alternatively, even if the CAP-BW(s) is signaled in the OFF state, the UE may recognize that the UL information on the SFI signaling corresponding to the CAP-BW is valid. As an example, when CAP-BW#1-1 is signaled in the OFF state, and all symbols of slot #k/k+1 are signaled as DL and all symbols of slot #k+2/k+3 are signaled as UL for CAT-BW#1-1, the UE may recognize slot #k+2/k+3 as UL, ignoring SFI signaling in slot #k/k+1. In this case, the UE may recognize that PDCCH monitoring is not performed in CAP-BW#1-1 during slot #k/k+1/k+2/k+3, and that configured UL transmission (e.g., periodic/semi-persistent PUCCH/SRS, configured grant PUSCH, etc.) is allowed during slot #k+2/k+3.

Alternatively, through a specific state of the SFI field and/or the bitmap field, it may be indicated that the CAP-BW(s) (in the slot in which the CO-DCI is detected) belongs to the first slot of transmission (e.g., DL burst) or belongs to the first k slot(s) in a time duration occupied by the BS. Here, the value of k may be predefined as an integer greater than or equal to 1 or may be set by separate RRC signaling. As a method, when all bits in the bitmap that correspond to all CAP-BW(s) corresponding to a cell in which the CO-DCI is transmitted signal OFF, it may be indicated that the CAP-BW(s) (in the slot in which the CO-DCI is detected) belongs to the first slot (or the first k slots) of the DL burst. It is contradictory that all CAP-BW(s) corresponding to the cell are OFF when the CO-DCI is transmitted from the cell. Accordingly, this transmission may be used for the above-described signaling. That is, through the CO-DCI transmission, it may be indirectly indicated that the CAP-BW is ON. In addition, through the CAP-BW ON/OFF information, it may be indicated that the CAP-BW belongs to the first slot (or the first k slots) of the DL burst. For example, when the CO-DCI is transmitted on CC#1, if all the ON/OFF information in the bitmap corresponding to CAP-BW#1-1 and CAP-BW#1-2 is OFF, it may be indicated that CAP-BW#1-1 and CAP-BW#1-2 (in the slot in which the CO-DCI is detected) belong to the first slot (or the first k slots) of the DL burst.

In addition, the CO-DCI may be transmitted on CC#A, and all the ON/OFF information corresponding to CC#A/B may be included in the CO-DCI (i.e., cross-carrier indication). At this time, since the CAP-BW ON/OFF information for CC#B is transmitted on the other CC (e.g., CC#A), it may be ambiguous whether there is actual transmission by the BS on CC#B. Therefore, if all the CAP-BW(s) for CC#A are OFF, the UE may assume that the DL burst has started even on CC#B (even if transmission is actually performed only on CC#A). On the other hand, if some or all of the CAP-BW(s) for CC#A are later updated to ON, information on CC#B may be recognized as a real OFF only when all the CAP-BW ON/OFF information for CC#B is OFF. For example, CO-DCI may be transmitted on CC#1, and all ON/OFF information corresponding to CC#1/2/3 may be included in the CO-DCI. In this case, the UE receiving CO-DCI in which all ON/OFF information on the bitmap corresponding to CAP-BW#1-1/CAP-BW #1-2/CAP-BW#2-1/CAP-BW#3-1 is OFF may recognize that CC#2 and CC#3 as well as CC#1 (in the slot in which the CO-DCI is detected) belong to the first slot (or the first k slots) of the DL burst. Also, CO-DCI may be transmitted on CC#2, and all ON/OFF information corresponding to CC#1/2/3 may be included in the CO-DCI. In this case, the UE receiving, on CC#2, the CO-DCI including bitmap information corresponding to CAP-BW#1-1=OFF, CAP-BW #1-2=OFF, CAP-BW#2-1=ON, and CAP-BW#3-1=OFF may recognize that any of CAP-BW #1-1 and CAP-BW#1-2 belonging to CC#1 does not belong to the first slot (or the first k slots) of the DL burst because CC#2 does not belong to the first slot (or the first k slots) of the DL burst (in the slot in which the CO-DCI is detected). Accordingly, the UE may recognize that actual DL reception is not available in CAP-BW#1-1 and CAP-BW#1-2.

As an example, when the SFI field is configured in 3 bits and is set to '111', it may indicate that the CAP-BW corresponding to the SFI field (in the slot in which the CO-DCI is detected) belongs to the first slot (or the first k slots) of the DL burst. As another example, when SlotFormatCombination is not linked to a specific state (e.g., SFI-index) of the SFI field, the state may be utilized. The SFI field size may be determined by the set maximum number of SFI-indexes. When the SFI field size is 3 bits, SlotFormatCombination may not be configured for some of the 8 SFI-indexes. In this case, when the value of SFI-index for which SlotFormatCombination is not configured is signaled, the UE may recognize that the CAP-BW(s) belongs to the first slot (or the first k slots) of the DL burst (in the slot in which the CO-DCI is detected). Then, the UE may assume DL (for all cells configured in the unlicensed band or a part thereof) during the first slot (or the first k slots) of the DL burst. That is, in the slot(s) in which the CAP-BW(s) is recognized as belonging to the first slot (or the first k slots) of the DL burst, all symbols may be assumed to be DL. Accordingly, the UE may perform PDCCH monitoring on the assumption that all symbols in the slot(s) are DL in the CAP-BW(s). In this method, in order to update the slot format of the CAP-BW(s), the BS may transmit DCI format 2_0 again within the same DL burst. For example, upon receiving SFI=111, the UE may recognize only that the CAP-BW(s) is the start of the DL burst, and identify the slot format (e.g., D/U/F) in the DL burst/COT based on the updated SFI information, while monitoring the PDCCH as in the case where the CAP-BW(s) is outside the DL burst.

In addition, the DL burst or the channel occupancy of the BS may be divided into two time durations (for all cells configured in the unlicensed band or a part thereof), and a search space set (or PDCCH) to be monitored may be independently configured for each of the durations. For example, duration 1 may be defined as a duration within the first k slots in the DL burst or the channel occupancy of the BS (for all cells configured in the unlicensed band or a part thereof), and duration 2 may be defined as a duration after the first k slots in the DL burst or the channel occupancy of the BS (for all cells configured in the unlicensed band or a part thereof). Here, k may be predefined as an integer greater than or equal to 1 or may be set by separate RRC signaling. Specifically, when it is signaled/recognized that the CAP-BW(s) belongs to the first slot (or the first k slots) of the DL burst (in the slot in which the CO-DCI is detected), the UE may monitor a PDCCH belonging to a specific first search space set configured to be monitored for the corresponding duration (e.g., duration 1) (for all cells configured in the unlicensed band or a part thereof), or may monitor a specific first PDCCH configured to be monitored for the corresponding duration (e.g., duration 1). Alternatively, since it is uncertain whether CSI-RS is transmitted in the CAP-BW for the corresponding duration (e.g., duration 1), the UE may not need to perform CSI measurement (or RRM/RLM measurement) through the CSI-RS that is configured to be transmitted for the corresponding duration (e.g., duration 1). On the other hand, when it is signaled/recognized that the CAP-BW(s) is in the ON state (in the slot in which the CO-DCI is detected), but does not belong to the first slot (or the first k slots) of the DL burst, the UE may monitor a PDCCH belonging to a specific second search space set configured to be monitored for the corresponding duration (e.g., duration 2) (for all cells configured in the unlicensed band or a part thereof), or may monitor a specific second PDCCH configured to be monitored for the corresponding duration (e.g., duration 2). Alternatively, CSI measurement (or RRM/RLM measurement) through a CSI-RS that is configured to be transmitted for the corresponding duration (e.g., duration 2) may be performed by the UE. Here, the specific first and second search space sets may be different from each other. For example, the specific first and second search space sets may have different PDCCH monitoring periodicities. Also, the specific first and second PDCCHs may be different from each other. DCI formats transmitted on the specific first and second PDCCHs may be different from each other.

[Method #3] Method for Configuring Time Domain DL/UL Direction

The maximum channel occupancy time (MCOT) may be determined according to a priority class corresponding to the CAP performed by the BS (see Table 7), and the BS may set a time less than or equal to the MCOT as a COT duration thereof. In this case, the BS may inform the UE of the COT than or equal to the MCOT as a COT duration. Accordingly, the UE may perform PDCCH monitoring configured outside the COT duration. For example, outside the COT duration, it is not known when the BS will transmit the PDCCH. Accordingly, monitoring may be performed very frequently, but may be performed at a much slower tempo in the COT duration. Such monitoring may be beneficial in terms of power consumption of the UE. In addition, the UE may distinguish between UL in the COT duration or UL outside the COT duration. In the case of UL in the COT duration, it may be determined whether the channel is idle/busy only for a predetermined time period. When the channel is idle, UL transmission may be allowed without random backoff. Alternatively, UL transmission may be allowed after a predetermined time without determining whether the channel is idle/busy. On the other hand, in the case of UL outside the COT duration, UL transmission may be allowed only when a random backoff-based CAP is performed.

[Method #3-1] Explicitly Signaling COT Duration in CO-DCI

In the CO-DCI, the COT start slot index, and/or the COT last slot index, and/or the COT duration from a specific slot may be signaled through a separate field. The field may be configured for each CAP-BW, for each carrier/active BWP, or for a group of CAP-BWs, a group of carriers/active BWPs, or an unlicensed band in common.

There may be a difference between a duration in which SFI information is applied and the COT duration. For example, while the period for monitoring the CO-DCI is set to 4 slots, the COT information in the CO-DCI may indicate that the COT duration is 1 slot. In this case, the SFI information should include information about at least 4 slots, and how the UE should interpret the SFI information indicated for the remaining 3 slots may be a challenge.

For example, when the SFI information of the SFI field corresponds to k slots and the time at which CO-DCI is received is slot #n, DL/UL information corresponding to slot #n to slot #n+k−1 may be signaled through the SFI information. In this case, the last slot index indicated by the field indicating the COT duration may be after slot #n+k−1. In this case, the SFI information may be applied for the DL/UL information corresponding to slot #n to slot #n+k−1, but an assumption may be required for DL/UL information after slot #n+k−1. Hereinafter, a method assumed by the UE is discussed.

Opt 1) By applying the wrap-around scheme, a rule may be set such that SFI information corresponding to slot #n+k corresponds to slot #n, and SFI information corresponding to slot #n+k+1 corresponds to slot #n+1.

Opt 2) A rule may be set such that SFI in slot #n+k−1 (or corresponding to the last symbol of slot #n+k−1) is repeated after slot #n+k−1.

Opt 3) A rule may be set such that specific SFI (e.g., all DL or all UL) is repeated after slot #n+k−1.

Opt 4) A rule may be set such that the UE does not expect the aforementioned case. Alternatively, the UE may expect to receive DL/UL information in the corresponding duration through reception of additional CO-DCI, and may apply one of Opt1 to Opt3 if it fails to receive the information.

[Method #3-2] Implicitly Signaling the COT Duration Through a Combination of Specific SFIs in the CO-DCI SFI information for slot #k may be duplicated/transmitted in slot #n and slot #m. Here, when SFI information corresponding to slot #k signaled in slot #n is A, and SFI information corresponding to slot #k signaled in slot #m is B, slot #k may be defined as the last slot of the COT occupied by the BS. As an example, A may be all DL and B may be all UL.

SFI information after the last slot index of the COT recognized through [Method #3-1] and/or [Method #3-2] may be present. As an example, the SFI information for CAP-BW#1-1 of CO-DCI received in slot #n may span up to slot #n+k, but the last slot index of the COT indicated by the CO-DCI may be slot #n+k−2. In this regard, a method for processing the SFI information for slot #n+k−1 and slot #n+k is proposed.

Opt A) SFI information for slot #n+k−1 and slot #n+k may be ignored. For example, even when the UE receives the SFI information for slot #n+k−1 and slot #n+k, it may be operated as if it did not receive the SFI information for slot #n+k−1 and slot #n+k.

Opt B) Only UL information in the SFI information for slots #n+k−1 and #n+k may be considered valid. In this case, the UE may not perform PDCCH monitoring for the corresponding UL duration, and may recognize the duration as a UL duration outside the COT duration.

Opt C) The UE may not expect such a case to occur.

Figure 14:
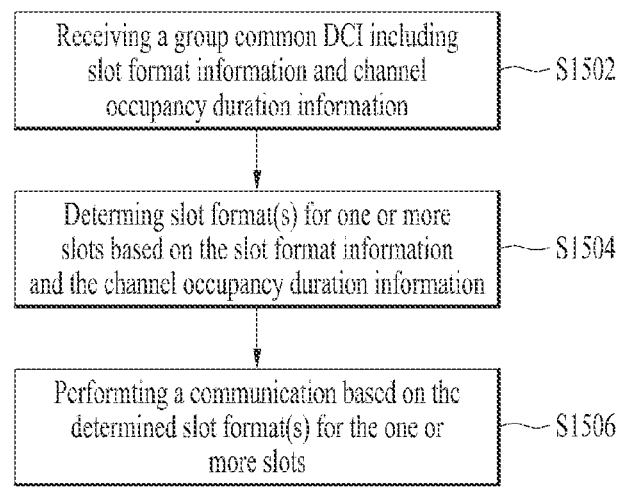

FIG. 14 illustrates a communication procedure according to an example of the present disclosure. Referring to FIG. 14, the UE may receive group common DCI including slot format information and channel occupancy duration information (S1502). Here, the slot format information may correspond to N slot formats. Each of the slot formats may correspond to a symbol configuration of a corresponding slot within N consecutive slots, wherein N may be an integer greater than or equal to 1. The channel occupancy duration information corresponds to a channel occupancy duration. The channel occupancy duration may include M consecutive slots, wherein M may be an integer greater than or equal to 1. The group common DCI may include CO-DCI (e.g., DCI format 2_0), and the CRC may be scrambled with a group common RNTI (e.g., SFI RNTI). Thereafter, the UE may determine a slot format for one or more slots based on the slot format information and the channel occupancy period information (S1504), and may perform communication based on the determined slot format for the one or more slots (S1506). For details, refer to Methods #3/#3-1/#3-2.

For example, based on N being less than M, communication may be performed on an assumption that the N slot formats sequentially correspond to slots subsequent to an N-th slot in the channel occupancy duration (Method #3-1, Opt1). Also, based on N being less than M, communication may be performed on an assumption that the last slot format of the N slot formats repeatedly corresponds to the slots subsequent to the N-th slot in the channel occupancy duration (Method #3-1, Opt2). As another example, based on N being greater than M, communication may be performed only in the channel occupancy duration based on the slot format information, while slot formats after an M-th slot format among the N slot formats are ignored (Method #3-2, OptA). Also, based on N being greater than M, communication may be performed on an assumption that only UL symbols are valid in the slot formats after the M-th slot format among the N slot formats (Method #3-2, OptB).

[Method #4]

When CO-DCI is transmitted, carrier/active BWPs and/or CAP-BWs may be grouped. In this case, it may be regulated that the CO-DCI includes both SFI information and ON/OFF information on the carrier/active BWPs and/or CAP-BWs belonging to the configured group, and the CO-DCI is transmitted on all carriers/active BWPs and/or CAP-BWs belonging to the configured group.

[Method #5]

Hereinafter, a description will be given of a method of determining how long information on all or some RB sets of serving cell (index) #n, which is indicated to be available by DCI format 2_0 received in slot #t, is valid when DCI format 2_0 is monitored on serving cell (index) #m (where m and n may be the same or different). Here, for serving cell (index) #n, an RB set indicator field (and/or a search space set switching field) is configured, but an SFI field and a channel occupancy duration field are not configured. In the present disclosure, a CAP-BW may have the same meaning as an RB set. The RB set may be configured on a carrier by RRC signaling, and if not configured, the RB set may be determined as a predefined value depending on the frequency domain of the carrier.

Specifically, it may be regulated that the information is valid for a predetermined or predefined time duration (e.g., X slots (where X is 1 or 2), the periodicity of a search space set associated with DCI format 2_0, a duration of P symbols for which search space group switching is performed) from a reference time point in slot #t in which DCI format 2_0 is received (e.g., the ending boundary of slot #t, the starting boundary of slot #t, the starting boundary of slot #(t+1), the boundary of a first/last symbol of received DCI format 2_0, or the boundary of a first/last symbol of a CORESET to which received DCI format 2_0 belongs).

In the NR-U system, the RB set indicator (or available RB set indicator) and the channel occupancy duration field (or COT duration indicator) are introduced in DCI format 2_0 as shown in Tables 9 to 11.

TABLE 9

| .3.1.3.1 Format 2_0 |
| --- |
| DCI format 2_0 is used for notifying the slot format, COT duration, available RB set, and search space group switching.<br>The following information is transmitted by means of the DCI format 2_0 with CRC scrambled by SFI-RNTI:<br>- Slot format indicator 1, Slot format indicator 2, ..., Slot format indicator N.<br>- If the higher layer parameter availableRB-SetPerCell-r16 is configured,<br>  - Available RB set Indicator 1, Available RB set Indicator 2, ..., Available RB set Indicator N1,<br>- If the higher layer parameter CO-DurationPerCell-r16 is configured<br>  - COT duration indicator 1, COT duration indicator 2, ..., COT duration indicator N2.<br>- If the higher layer parametersearchSpaceSwitching-r16 = "explicit" searchSpaceSwitchTrigger-r16 is configured<br>  - Monitoring group flag 1, Monitoring group flag 2, ..., Monitoring group flag [M].<br>The size of DCI format 2_0 is configurable by higher layers up to 128 bits, according to Clause 11.1.1 of [5, TS 38.213]. |

TABLE 10

| 11.1.1 UE procedure for determining slot format |
| --- |
| This clause applies for a serving cell that is included in a set of serving cells configured to a UE by slotFormatCombToAddModList and slotFormatCombToReleaseList.<br>If a UE is configured by higher layers with parameter SlotFormatIndicator, the UE is provided a SFI-RNTI by sfi-RNTI and with a payload size of DCI format 2_0 by dci-PayloadSize.<br>The UE is also provided in one or more serving cells with a configuration for a search space set s and a corresponding CORESET P for monitoring $M_{p,s}^{(LSFI)}$ PDCCH candidates for DCI format 2_0 with a CCE aggregation level of $L_{SFI}$ CCEs as described in Clause 10.1. The $M_{p,s}^{(LSFI)}$ PDCCH candidates are the first $M_{p,s}^{(LSFI)}$ PDCCH candidates for CCE aggregation level $L_{SFI}$ for search space set s in CORESET P.<br>For each serving cell in the set of serving cells, the UE can be provided:<br>- an identity of the serving cell by servingCellId<br>- a location of a SFI-index field in DCI format 2_0 by positionInDCI<br>- a set of slot format combinations by slotFormatCombinations, where each slot format combination in the set of slot format combinations includes<br>  - one or more slot formats indicated by a respective slotFormats for the slot format combination, and<br>  - a mapping for the slot format combination provided by slotFormats to a corresponding SFI-index field value in DCI format 2_0 provided by slotFormatCombinationId |

TABLE 10-continued

11.1.1 UE procedure for determining slot format

- for unpaired spectrum operation, a reference SCS configuration $\mu_{SFI}$ by subcarrierSpacing and, when a supplementary UL carrier is configured for the serving cell, a reference SCS configuration $\mu_{SFI,SUL}$ by subcarrierSpacing2 for the supplementary UL carrier

TABLE 11

- for paired spectrum operation, a reference SCS configuration $\mu_{SFI, DL}$ for a DL BWP by subcarrierSpacing and a reference SCS configuration $\mu_{SFI, UL}$ for an UL BWP by subcarrierSpacing2
- a location of a RB set indicator field in DCI format 2_0 that is a bitmap having a one-to-one mapping
  with the RB sets [6, TS 38.214] of the serving cell, where a value of '0' indicates that an RB set is available for receptions and a value of '1' indicates that an RB set is not available for receptions, by availableRB-SetPerCell-r16. The RB set indicator field includes $N_{RB,sets}$ bits where $N_{RB,sets}$ is the number of RB sets in the serving cell. An RB set remains available or unavailable until the end of the indicated channel occupancy duration
- a location of a channel occupancy duration field in DCI format 2_0, by CO-DurationPerCell-r16, that indicates a remaining channel occupancy duration for the serving cell starting from a slot where the UE detects the DCI format 2_0 by providing a value from CO-DurationList-r16. The channel occupancy duration field includes $\max\{\lceil\log_2(\text{COdurationListSize})\rceil,1\}$ bits, where COdurationListSize is the number of values provided by CO-DurationList-r16. If CO-DurationPerCell-r16 is not provided, the remaining channel occupancy duration for the serving cell is a number of slots, starting from a slot where the UE detects the DCI format 2_0, that the SFI-index field value provides corresponding slot formats
- a location of a search space set group switching field in DCI format 2_0, by SearchSpaceSwitchTrigger-r16, that indicates a group from two groups of search space sets for PDCCH monitoring for scheduling on the serving cell as described in Clause 10.4.

Each of the three fields may be configured independently. Herein, a method for determining the validity of an RB set according to whether the three fields are configured is proposed. When the validity of RB set(s) indicated to be available is determined as in Tables 10 and 11, if the channel occupancy duration field is configured, the RB set(s) may be determined valid for a duration indicated by the channel occupancy duration field. If the channel occupancy duration field is not configured, the RB set(s) may be determined valid for a duration corresponding to an indicated SFI index (for example, if the indicated SFI index, SFI index #y contains SFI information on y1 slots, the corresponding duration is the y1 slots). However, a method for determining the validity of RB set(s) when the RB set indicator is configured but both the channel occupancy duration field and the SFI field are not configured has not been defined yet.

According to the proposed method, for example, four RB sets and the RB set indicator (i.e., 4-bit bitmap) may be configured for serving cell (index) #1, but both the channel occupancy duration field and the SFI field may not be configured. In this case, information on serving cell (index) #1 may be transmitted in DCI format 2_0 associated with a specific search space set configured on serving cell (index) #1. The UE may attempt to receive DCI format 2_0 on a monitoring occasion designated for the corresponding search space set and receive DCI format 2_0 in slot #n. If the RB set indicator indicates '1100' (that is, the first and second RB sets in serving cell (index) #1 are valid), the UE may determine that information on the availability of the RB sets is valid for predetermined/predefined Z slots/symbols (the periodicity configured for a search space set associated with corresponding DCI format 2_0; the value of P when search space group switching is configured as shown in Table 12; or the minimum/maximum of the periodicity configured for the search space set associated with corresponding DCI format 2_0 and the value of P) from slot #n (the last symbol of DCI format 2_0 received in slot #n, the starting/ending boundary of slot #n, or the starting/ending boundary of slot #(n+1)). If the timeline after applying the configured/defined Z slots/symbols is not aligned with the slot boundary, the UE may determine that the RB set information is valid to the nearest slot boundary after applying the configured/defined Z slots/symbols. If the RB set information is valid, it may mean that the UE needs to receive a DL signal such as a PDCCH and/or a CSI-RS that is confined in the first and second RB sets in serving cell (index) #1. Alternatively, it may mean that when the UE transmits a UL signal scheduled or configured within a valid period (allocated to the frequency domain of the RB set indicated to be available) on the available RB sets (e.g., the first and second RB sets in serving cell (index) #1), the UE may perform the Type 2 CAP.

Whether the method is applied may be configured by additional higher layer signaling (e.g., RRC signaling).

TABLE 12

10.4 Search space set switching

A UE can be provided a group index for a respective search space set by searchSpaceGroupIdList-r16 for PDCCH monitoring on a serving cell. If the UE is not provided searchSpaceGroupIdList-r16 for a search space set, the following procedures are not applicable for PDCCH monitoring according to the search space set.
If a UE is provided searchSpaceSwitchingGroupList-r16, indicating one or more groups of serving cells, the following procedures apply to all serving cells within each group; otherwise, the following procedures apply only to a serving cell for which the UE is provided searchSpaceGroupIdList-r16.

TABLE 12-continued 10.4 Search space set switching

A UE can be provided, by searchSpaceSwitchingTimer-r16, a timer value. The UE decrements the timer value by one after each slot in the active DL BWP of the serving cell where the UE monitors PDCCH for detection of DCI
format 2_0.
If a UE is provided by SearchSpaceSwitchTrigger-r16 a location of a search space set switching field for a serving cell in a DCI format 2_0, as described in Clause 11.1.1, and detects the DCI format 2_0 in a slot
- if the UE is not monitoring PDCCH according to search space sets with group index 0, the UE starts monitoring PDCCH according to search space sets with group index 0, and stops monitoring PDCCH according to search space sets with group index 1, on the serving cell at a first slot that is at least P symbols after the last symbol of the PDCCH with the DCI format 2_0, if a value of the search space set switching field is 0
- if the UE is not monitoring PDCCH according to search space sets with group index 1, the UE monitors PDCCH according to search space sets with group index 1, and stops monitoring PDCCH according to search space sets with group index 0, on the serving cell at a first slot that is at least P symbols after the last symbol of the PDCCH with the DCI format 2_0, and the UE sets the timer value to the value provided by searchSpaceSwitchingTimer-r16, if a value of the search space set switching field is 1
- if the UE monitors PDCCH on a serving cell according to search space sets with group index 1, the UE starts monitoring PDCCH on the serving cell according to search space sets with group index 0, and stops monitoring PDCCH according to search space sets with group index 1, on the serving cell at the beginning of the first slot that is at least P symbols after a slot where the timer expires or after a last symbol of a remaining channel occupancy duration for the serving cell that is indicated by DCI format 2_0
If a UE is not provided SearchSpaceSwitchTrigger-r16 for a serving cell,
- if the UE detects a DCI format by monitoring PDCCH according to a search space set with group index 0, the UE starts monitoring PDCCH according to search space sets with group index 1, and stops monitoring PDCCH according to search space sets with group index 0, on the serving cell at a first slot that is at least P symbols after the last symbol of the PDCCH with the DCI format, the UE sets the timer value to the value provided by searchSpaceSwitchingTimer-r16 if the UE detects a DCI format by monitoring PDCCH in any search space set
- if the UE monitors PDCCH on a serving cell according to search space sets with group index 1, the UE starts monitoring PDCCH on the serving cell according to search space sets with group index 0, and stops monitoring PDCCH according to search space sets with group index 1, on the serving cell at the beginning of the first slot that is at least P symbols after a slot where the timer expires or, if the UE is provided a search space set to monitor PDCCH for detecting a DCI format 2_0, after a last symbol of a remaining channel occupancy duration for the serving cell that is indicated by DCI format 2_0

[Method #6]

Hereinafter, it will be described which RB set(s) belonging to serving cell (index) #n the UE is capable of recognizing as available RB set(s) based on DCI format 2_0 received in slot #t when the UE monitors DCI format 2_0 on serving cell (index) #m (where m and n may be the same or different). Here, for serving cell (index) #n, the RB set indicator (or availableRB-SetPerCell-r16) is not configured, but at least one of the SFI field and the channel occupancy duration field is configured.

Specifically, Opt 1) it may be preconfigured/predefined that specific RB set(s) (index(s)) are available. Alternatively, Opt 2) when the number of RB sets belonging to serving cell (index) #n (or active BWP in the cell) is 1 or when multiple RB sets are configured, the above-described configuration may be allowed (i.e., the RB set indicator field or availableRB-SetPerCell-r16 may not be configured) only if the number of RBs corresponding to a frequency-domain guard band between the corresponding RB sets is 0. When the UE determines the validity of RB set(s) determined to be available according to Opt 1 or Opt 2, the UE may determine that the RB set(s) are valid for a duration indicated by the channel occupancy duration field if the channel occupancy duration field is configured. If the channel occupancy duration field is not configured, the UE may determine that the RB set(s) are valid for a duration corresponding to an indicated SFI index (see Table 10).

In Opt 1, a specific RB set (index) may be predefined as a k-th (e.g., k=1) RB set in serving cell (index) #n, and specific RB set(s) (index(s)) may be configured by higher layer signaling such as RRC signaling. In particular, Opt 1 may be (limitedly) applied when serving cell (index) #n corresponding to RB set information and serving cell (index) #m in which DCI format 2_0 is transmitted have different cell indices.

In Opt 2), when the number of RB sets belonging to serving cell (index) #n (or active BWP within the cell) is 1, or when the number of RBs corresponding to the frequency-domain guard band between the corresponding RB sets is 0 even if multiple RB sets are configured, the corresponding configuration may be allowed (i.e., the RB set indicator field or availableRB-SetPerCell-r16 may not be configured). Alternatively, only when Mode 1 described above is configured, the corresponding configuration may be allowed (i.e., the RB set indicator field or availableRB-SetPerCell-r16 may not be configured).

In the proposed methods, if Mode 1 is configured, it may mean that the number of RBs corresponding to a frequency-domain guard band between corresponding RB sets is set to 0 even though a plurality of RB sets are configured for a specific serving cell. Alternatively, if Mode 1 is configured, it may mean that RRC signaling corresponding to a specific state that there is no intra-carrier guard band is configured for a corresponding serving cell. In particular, Opt 2) may be (limitedly) applied when serving cell (index) #n corresponding to RB set information and serving cell (index) #m in which DCI format 2_0 is transmitted have the same cell index. That is, the UE may recognize that RB set(s) in serving cell (index) #n are available only by finding DCI format 2_0 in the corresponding serving cell.

In Opt 1 or Opt 2, the unavailability of a specific RB set may need to be signaled. For example, if the value corresponding to the channel occupancy duration field is less than or equal to a specific value (e.g., the channel occupancy duration is zero symbols), or if the value of slotFormatCombinationId corresponding to the SFI index is not configured, it may mean that all RB set(s) belonging to corresponding serving cell index #n are unavailable. If all RB set(s) belonging to corresponding serving cell index #n are unavailable, it may mean that the UE does not need to receive a DL signal such as a PDCCH and/or a CSI-RS in serving cell index #n. Alternatively, if all RB set(s) belonging to corresponding serving cell index #n are unavailable, it may mean that the UE is incapable of performing the Type 2 CAP when the UE transmits a UL signal scheduled or configured within a duration where corresponding RB set information is valid (allocated to the frequency domain in a specific RB set indicated to be available).

[Method #7]

Hereinafter, it will be described which RB set(s) belonging to serving cell (index) #n the UE is capable of recognizing as available RB set(s) based on DCI format 2_0 received in slot #t when the UE monitors DCI format 2_0 on serving cell (index) #m (where m and n may be the same or different). Here, for serving cell (index) #n, all of the RB set indicator field, SFI field, and channel occupancy duration field are not configured. In addition, there is proposed a method of determining how long information on all or some RB sets of serving cell (index) #n, which is indicated to be available by DCI format 2_0 received in slot #t, is valid.

Specifically, which RB set(s) belonging to serving cell (index) #n the UE is capable of recognizing as available RB set(s) based on DCI format 2_0 received in slot #t may be determined by [Method #6].

In addition, how long information on all or some RB sets of serving cell (index) #n that is indicated to be available by DCI format 2_0 (which is determined by [Method #6]) may be determined by [Method #5].

[Method #8]

Hereinafter, a description will be given of a method of configuring an RB set for a DL/UL carrier (or BWP) when Mode 1 is configured (as described above) and the bandwidth corresponding to one carrier (or BWP) includes a plurality of CAP-BWs.

Opt 1: One RB set is configured for a DL carrier (or BWP), and one RB set is configured for a UL carrier (or BWP)

Opt 2: One RB set is configured for a DL carrier (or BWP), and as many RB sets as the number of CAP-BWs are configured for a UL carrier (or BWP)

Opt 3: One RB set is configured for a DL carrier (or BWP), and only one RB set is configured for each channel/signal for a UL carrier (or BWP) (e.g., for a PUSCH, an SRS, etc.). Alternatively, as many RB sets as the number of CAP-BWs are configured (e.g., for a PUCCH, a PRACH, etc.).

In the proposed methods, a CAP-BW means a unit for performing the CAP on an unlicensed band (unlicensed spectrum or shared spectrum), which may have a bandwidth less than or equal to one carrier. The CAP-BW may be defined in regulations for coexistence with other radio access technologies (RATs) (e.g., Wi-Fi). In general, the CAP-BW may have a bandwidth of 20 MHz. For example, when Mode 1 is configured and the bandwidth corresponding to one carrier (or BWP) is 40 MHz (i.e., when two CAP-BWs are included), one RB set may be configured for each DL/UL carrier (or BWP) in the case of Opt 1. In the case of Opt 2, one RB set may be configured for a DL carrier (or BWP) and two RB sets may be configured for a UL carrier (or BWP). In the case of Opt 3, one RB set may be configured for a DL carrier (or BWP). In addition, for a UL carrier (or BWP), one RB set may be configured for PUSCH allocation, and two RB sets may be configured for PUCCH allocation.

Opt 1 to Opt 3 proposed above may be applied in different ways depending to which cell the options are applied.

Alt 1: Opt 1 (Opt 2 or Opt 3) is applied to any serving cell.

Alt 2: Opt 2 is applied to a PCell (PSCell or PUCCH-SCell), and Opt 1 is applied to an SCell (SCell in which no PUCCH is configured)

Alt 3: Opt 3 is applied to a PCell (PSCell or PUCCH-SCell), and Opt 1 is applied to an SCell (SCell in which no PUCCH is configured)

For reference, the terms related to cells used herein are defined as follows.

Primary Cell (PCell): For a UE configured with carrier aggregation (CA), a cell operating on a primary frequency, in which the UE either performs an initial connection establishment procedure or initiates a connection re-establishment procedure. For dual connectivity (DC) operation, a master cell group (MCG) cell, operating on the primary frequency, in which the UE either performs the initial connection establishment procedure or initiates the connection re-establishment procedure.

Secondary Cell (SCell): For a UE configured with CA, a cell providing additional radio resources on top of Special Cell.

Primary SCG Cell (PSCell): For DC operation, a SCG cell in which the UE performs random access when performing the Reconfiguration with Sync procedure.

Special Cell (SpCell): For DC operation, the term Special Cell refers to the PCell of the MCG or the PSCell of the SCG, otherwise (i.e., non-DC operation) the term Special Cell refers to the PCell.

Serving Cell (ServCell): For a UE in RRC_CONNECTED not configured with CA/DC there is only one serving cell comprising of the primary cell. For a UE in RRC_CONNECTED configured with CA/DC the term 'serving cells' is used to denote a set of cells comprising of the Special Cell(s) and all secondary cells.

PUCCH-SCell: For a UE configured with CA, a secondary cell providing PUCCH transmission in addition to PCell.

In particular, if a PUCCH (and/or PRACH) is configured to be transmitted over a plurality of CAP-BWs, channel transmission may not be attempted even if one CAP-BW is busy. Therefore, to increase the transmission probability of a corresponding channel, the channel transmission may be confined to one CAP-BW. Accordingly, when PUCCH resources are configured as shown in Table 13, a specific RB set index may be allocated. In addition, if as many RB sets as the number of CAP-BWs are configured for a UL carrier (or BWP) composed of a plurality of CAP-BWs as in Alt 2 or Alt 3, it has the advantage of maintaining a configuration that confines each PUCCH (and/or PRACH) to an RB set corresponding to one CAP-BW. In the case of the PUCCH, this may be applied only when interlace-based transmission is configured by an RRC parameter such as useInterlacePUCCH-PUSCH-r16.

TABLE 13

A PUCCH resource includes the following parameters:
- a PUCCH resource index provided by pucch-ResourceId
- an index of the first PRB prior to frequency hopping or for no frequency hopping by startingPRB, if a UE is not provided useInterlacePUCCH-Dedicated-r16

TABLE 13-continued

- an index of the first PRB after frequency hopping by secondHopPRB, if a UE is not provided useInterlacePUCCH-Dedicated -r16
- an indication for intra-slot frequency hopping by intraSlotFrequencyHopping, if a UE is not provided useInterlacePUCCH-Dedicated -r16
- an index of a first interlace by interlace0, if a UE is provided useInterlacePUCCH-Dedicated-r16
- if provided, an index of a second interlace by interlace1, if a UE is provided useInterlacePUCCH-Dedicated-r16
- an index of an RB set by rb-SetIndex, if a UE is provided useInterlacePUCCH-Dedicated-r16
- a configuration for a PUCCH format, from PUCCH format 0 through PUCCH format 4, provided by format The UE expects that either none or both of useInterlacePUCCH-Common-r16 and useInterlacePUCCH-Dedicated-r16 are provided.
If a UE is provided useInterlacePUCCH-Dedicated-r16, the UE determines available RBs for PUCCH transmissions as the intersection of RBs corresponding to an interlace index provided by interlace0 and, if provided, interlace1, and RBs of an RB set provided by rb-SetIndex. The intersection results in $M_{interlace,0}^{PUCCH}$ RBs in
the first interlace and the UE expects that $M_{interlace,0}^{PUCCH}$ is either 10 or 11. If interlace1 is provided, the intersection results in $M_{interlace,1}^{PUCCH}$ RBs in the second interlace and the UE expects that $M_{interlace,1}^{PUCCH}$ is either 10 or 11.

Similarly, if Alt 2 (or Alt 3) is applied to a PUSCH, resources may be allocated for each RB set index (as shown in Tables 15 and 16 below). In particular, in the case of the PUSCH, this may be applied only when interlace-based transmission is configured by the RRC parameter such as useInterlacePUCCH-PUSCH-r16. Alternatively, if Alt 2 (or Alt 3) is applied to the PUSCH, the UE may expect that even though a plurality of RB sets are configured, actual PUSCH resource allocation corresponds to all RB sets in a corresponding UL BWP (for example, only a value corresponding to a resource indication value (RIV) for allocating all RB set indices in Tables 15 and 16 is allocated).

In the proposed methods, if Mode 1 is configured, it may mean that no intra-cell guard band is allocated for one serving cell (carrier or BWP) (as shown in Table 14 below). That is, the configurations of intraCellGuardBandDL-r16 and intraCellGuardBandUL-r16 may indicate to the UE that no intra-cell guard band is configured, which may mean Opt A or Opt B below.

Opt A: It may mean that even if a plurality of RB sets are configured for a corresponding serving cell (carrier or BWP), the number of RBs corresponding to a frequency-domain guard band between the corresponding RB sets is set to 0.

Opt B: It may mean that RRC signaling corresponding to a specific state that there is no intra-carrier guard band is configured for a corresponding serving cell (carrier or BWP).

Additionally, when a plurality of RB sets are configured as in Opt 2 and/or Opt 3, it is necessary to clearly define the boundary between the RB sets.

When the configuration of a guard band includes the starting (common) RB index and size of the guard band as in Opt A, if the size is set to 0, the UE may determine the boundaries of RB sets from each starting (common) RB index. For example, when a UL BWP with a bandwidth of 40 MHz is configured and the UL BWP consists of a total of 106 PRBs, if the starting (common) RB index of a guard band is the 53rd index and if the size is 0, the UE may recognize that first to 52nd RBs in the UL BWP belong to RB set 0 and 53rd to 106th RBs belong to RB set 1.

Alternatively, when RRC signaling corresponding to a specific state that there is no intra-cell guard band is configured as in Opt B, the UE may determine the boundaries of RB sets by dividing a corresponding UL carrier (or BWP) into equal (or almost equal) parts by the number of CAP-BWs. For example, when a UL BWP with a bandwidth of 40 MHz is configured and the UL BWP consists of a total of 106 PRBs, the UL BWP includes two CAP-BWs. Accordingly, the UE may divide 106 PRBs into two sets such that first to 53rd RBs in the UL BWP belong to RB set 0 and 54th to 106th RBs belong to RB set 1. In general, when a UL carrier (or BWP) composed of K RBs includes N CAP-BWs, the first RB index (where indexing starts from 0) of an n-th (where n=1, 2, ..., N) RB set may be obtained from ceiling $\{K*(n-1)/N\}$ or floor $\{K*(n-1)/N\}$. In this case, ceiling $\{x\}$ may mean the smallest natural number greater than or equal to x, and floor $\{x\}$ may mean the largest natural number smaller than or equal to x.

Alternatively, when a plurality of RB sets are capable of being configured as in Opt 2 and/or Opt 3, it may be configured that for a DL carrier (or BWP), no intra-cell guard band is allocated as in Opt B, or it may be configured that for a UL carrier (or BWP), no intra-cell guard band is allocated as in Opt A.

In addition, if one RB set is configured for a DL carrier (or BWP) in Opt 1 to Opt 3, it may mean that the RB set indicator field corresponding to the corresponding DL carrier (or BWP) is one bit.

TABLE 14

7 UE procedures for transmitting and receiving on a carrier with intra-cell guard bands For operation with shared spectrum channel access, when the UE is configured with any of intraCellGuardBandUL-r16 for UL carrier and intraCellGuardBandDL-r16 for DL carrier, the UE is provided with $N_{RB-set}$ − 1 intra-cell guard bands on a carrier, each defined by start and end CRB (alternatively, each may be configured by the starting CRB index and size), $GB_s^{start,\mu}$ and $GB_s^{end,\mu}$, respectively. The intra-cell guard bands separate $N_{RB-set}$ RB-sets, each defined by start and end CRB, $RB_s^{start,\mu}$ and $RB_s^{end,\mu}$, respectively. UE determines $RB_0^{start,\mu} = N_{grid}^{start,\mu}$, $RB_{N_{RB-set}-1}^{end,\mu} = N_{grid}^{start,\mu} + N_{grid}^{size,\mu} - 1$, and the remaining start and end CRBs as
$RB_s^{end,\mu} = GB_s^{start,\mu} - 1$ and $RB_{s+1}^{start,\mu} = GB_s^{end,\mu} + 1$. When the UE is not configured with intraCellGuardBandUL-r16, the UE determines intra-cell guard band and corresponding RB-set according to the [default intra-cell GB pattern from 38.101 corresponding to μ and carrier size $N_{grid}^{size,\mu}$]. When the UE us not configured with intraCellGuardBandDL-r16, the UE determines intra-cell guard band and corresponding RB-set TABLE 14-continued 7 UE procedures for transmitting and receiving on a carrier with intra-cell guard bands according to the [default intra-cell GB pattern from 38.101 corresponding to µ and carrier size $N_{grid}^{size,\mu}$].
For a carrier with intra-carrier guard bands, the UE does not expect to receive a BWP configuration by BWP-Downlink or BWP-Uplink partially overlapping with a RB-set. RB-sets within BWP form a set $S_{RB\text{-}sets}$ of cardinality $N_{RB\text{-}set}^{BWP}$.
[The configuration of intraCellGuardBandDL-r16 and intraCellGuardBandUL-r16 can indicate to the UE that no intra-cell guard-bands are configured.]

TABLE 15

6.1.2.2.3 Uplink resource allocation type 2

In uplink resource allocation of type 2, the resource block assignment information defined in [5, TS 38.212] indicates to a UE a set of up to M interlace indices, and for DCI 0_1 a set of up to $N_{RB\text{-}set}^{BWP}$ contiguous RB sets, where M and interlace indexing are defined in Clause 4.4.4.6 in [4, TS 38.211]. The UE shall determine the resource allocation in frequency domain as an intersection of the resource blocks of the indicated interlaces and the indicated set of RB sets and intra-cell guard bands defined in Clause 7 between the indicated RB sets, if any.
For µ = 0, the X MSBs of the resource block assignment information indicates to a UE a set of allocated interlace indices $m_0 + l$, where the indication consists of a resource indication value (RIV). For $0 \leq RIV < M(M + 1)/2$, $l = 0, 1, \ldots L - 1$ the resource indication value corresponds to the starting interlace index $m_0$ and the number of contiguous interlace indices $L(L \geq 1)$. The resource indication value is defined by:
  if $(L - 1) \leq \lfloor M/2 \rfloor$ then
    $RIV = M(L - 1) + m_0$
  else
    $RIV = M(M - L + 1) + (M - 1 - m_0)$
For $IV \geq M(M + 1)/2$, the resource indication value corresponds to the starting interlace index $m_0$ and the set of values l according to Table 6.1.2.2.3-1.

Table 6.1.2.2.3-1: $m_0$ and l for $RIV \geq M(M + 1)/2$.

| RIV − M(M + 1)/2 | $m_0$ | l |
|---|---|---|
| 0 | 0 | {0, 5} |
| 1 | 0 | {0, 1, 5, 6} |
| 2 | 1 | {0, 5} |
| 3 | 1 | {0, 1, 2, 3, 5, 6, 7, 8} |
| 4 | 2 | {0, 5} |
| 5 | 2 | {0, 1, 2, 5, 6, 7} |
| 6 | 3 | {0, 5} |
| 7 | 4 | {0, 5} |

TABLE 16

For µ = 1, the X MSBs of the resource block assignment information comprise a bitmap indicating the interlaces that are allocated to the scheduled UE. The bitmap is of size M bits with one bitmap bit per interlace such that each interlace is addressable, where M and interlace indexing is defined in Clause 4.4.4.6 in [4, TS 38.211]. The order of interlace bitmap is such that interlace 0 to interlace M − 1 are mapped from MSB to LSB of the bitmap. An interlace is allocated to the UE if the corresponding bit value in the bitmap is 1; otherwise the interlace is not allocated to the UE.
For both µ = 0 and µ = 1, the $$Y = \left\lceil \log_2 \frac{N_{RB-set}^{BWP}(N_{RB-set}^{BWP} + 1)}{2} \right\rceil$$

LSBs of the resource block assignment information indicate to a UE a set of contiguously allocated RB sets for PUSCH scheduled by DCI 0_1 and Type 1 and Type 2 configured grant. The resource allocation field consists of a resource indication value ($RIV_{RBset}$). For $0 \leq RIV_{RBset} < N_{RB-set}^{BWP}(N_{RB-set}^{BWP} + 1)/2, l = 0, 1, \ldots L_{RBset} - 1$ the resource indication value corresponds to the starting RB set ($RBset_{START}$) and the number of contiguous RB sets $L_{RBset}$ ($L_{RBset} \geq 1$).

The resource indication value is defined by;
  if $(L_{RBset} - 1) \leq \lfloor N_{RB-set}^{BWP}/2 \rfloor$ then
    $RIV_{RBset} = N_{RB-set}^{BWP}(L_{RBset} - 1) + RBset_{START}$
  else
    $RIV_{RBset} = N_{RB-set}^{BWP}(N_{RB-set}^{BWP} - L_{RBset} + 1) + (N_{RB-set}^{BWP} - 1 - RBset_{START})$
If transform precoding is enabled according to the procedure in Clause 6.1.3, then the UE transmits PUSCH on the lowest-indexed $M_{RB}^{PUSCH}$ PRBs indicated by the frequency domain resource assignment information.
$M_{RB}^{PUSCH}$ is the largest integer not greater than the number of RBs indicated by the frequency domain resource assignment information that fulfils the conditions in [4, TS 38.211 Clause 6.3.1.4].

[Method #9]

Hereinafter, a description will be given of a signaling method that allocates no intra-cell guard band for one serving cell (carrier or BWP), and a CAP method for the corresponding serving cell (carrier or BWP) will be described.

TABLE 17

7 UE procedures for transmitting and receiving on a carrier with intra-cell guard bands For operation with shared spectrum channel access, when the UE is configured with any of intraCellGuardBandUL-r16 for UL carrier and intraCellGuardBandDL-r16 for DL carrier, the UE is provided with $N_{RB\text{-}set,x} - 1$ intra-cell guard bands on a carrier, each defined by start CRB and size in number of CRBs, $GB_{s,x}^{start,\mu}$ and $GB_{s,x}^{size,\mu}$, provided by higher layer parameters startCRB-r16 and nrofCRBs-r16, respectively. The subscript x is set to DL and UL for the downlink and uplink, respectively. Where there is no risk of confusion, the subscript x can be dropped. The intra-cell guard bands separate $N_{RB\text{-}set,x}$ RB sets, each defined by start and end CRB, $RB_{s,x}^{start,\mu}$ and $RB_{s,x}^{end,\mu}$, respectively. UE determines $RB_{0,x}^{start,\mu} = N_{grid,x}^{start,\mu}$, $RB_{N_{RB\text{-}set}-1,x}^{end,\mu} = N_{grid,x}^{start,\mu} + N_{grid,x}^{size,\mu} - 1$, and the remaining start and end CRBs as $RB_{s,x}^{end,\mu} = GB_{s,x}^{start,\mu} - 1$ and
$RB_{s+1,x}^{start,\mu} = GB_{s,x}^{start,\mu} + GB_{s,x}^{size,\mu}$. The RB set s consists of $RB_{s,x}^{size,\mu}$ resource blocks where $RB_{s,x}^{size,\mu} = RB_{s,x}^{end,\mu} - RB_{s,x}^{start,\mu} + 1$. When the UE is not configured with intraCellGuardBandUL-r16, the UE determines intra-cell guard band and corresponding RB set according to the [default intra-cell GB pattern from [8, TS 38.101-1] corresponding to µ and carrier size $N_{grid,x}^{size,\mu}$]. When the UE is not configured with intraCellGuardBandDL-r16, the UE determines intra-cell guard band and corresponding RB set according to the [default intra-cell GB pattern from [8, TS 38.101-1] corresponding to µ and carrier size $N_{grid,x}^{size,\mu}$].
For a carrier with intra-cell guard band(s), the UE expects $N_{BWP,i}^{start,\mu} = RB_{s0,x}^{start,\mu}$, and $N_{BWP,i}^{size,\mu} = RB_{s1,x}^{end,\mu} - RB_{s0,x}^{start,\mu} + 1$ where $0 \leq s0 \leq s1 \leq N_{RB\text{-}set} - 1$ for a BWP i configured by BWP-Downlink or BWP-Uplink. Within the BWP i, RB sets are numbered in increasing order from 0 to $N_{RB\text{-}set,x}^{BWP} - 1$ where $N_{RB\text{-}set,x}^{BWP}$ is the number of RB sets contained in the BWP i and RB set 0 within the BWP i corresponds to RB set s0 in the carrier and RB set $N_{RB\text{-}set,x}^{BWP} - 1$ within the BWP
i corresponds to RB set s1 in the carrier.
[The configuration of intraCellGuardBandDL-r16 and intraCellGuardBandUL-r16 can indicate to the UE that no intra-cell guard-bands are configured.]

When a guard band (GB) is configured for a DL carrier or a UL carrier as shown in Table 17, k entries each consisting of {starting common RB (CRB) index, GB size} may be signaled from higher layers. The UE may derive the starting and ending CRB indices corresponding to (k+1) RB sets from a combination of the k entries and the starting and ending CRB indices of the corresponding DL carrier or UL carrier.

Figure 15:
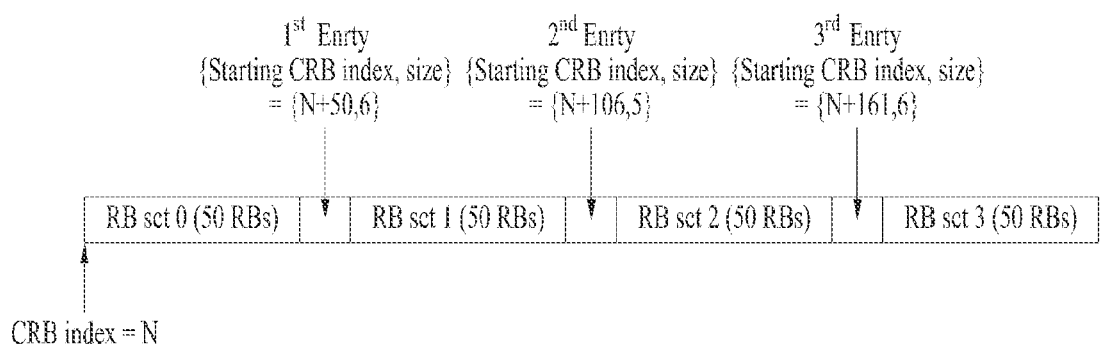

FIG. 15 illustrates exemplary GB configuration related information transmitted through RRC signaling. Referring to FIG. 15, GB configuration related information may include three entries for an 80 MHz carrier consisting of a total of 217 RBs (with an SCS of 30 kHz), and the UE may receive the GB configuration related information through RRC signaling.

Assuming that Table 17 is applied to FIG. 15, when the first CRB index of a carrier is N, the following may be derived from GB configuration related information received through RRC signaling: RB set 0 includes CRB indices N to (N+49), RB set 1 includes CRB indices (N+56) to (N+105), RB set 2 includes CRB indices (N+111) to (N+160), and RB set 3 includes CRB indices (N+167) to (N+216). In this case, if the size of a specific GB in the carrier is set to 0, the GB between RB sets may be set to be 0 RBs. To this end, the following options may be applied.

Opt 1: If the size of at least one GB between RB sets in a DL carrier or UL carrier is set to 0, the UE may expect that the GB size between all RB sets is set to 0.

Opt 2: If the size of at least one GB between RB sets in a DL BWP or UL BWP is set to 0, the UE may expect that the GB size between all RB sets is set to 0. In addition, if the size of even one GB between the RB sets in the DL BWP or UL BWP is set to be greater than 0, the UE may expect that the GB size between all RB sets is set to be greater than 0.

Opt 3: It may be allowed that among GB sizes between RB sets in a DL BWP or UL BWP, some are set to 0 and others are set to a value greater than 0.

Figure 16:
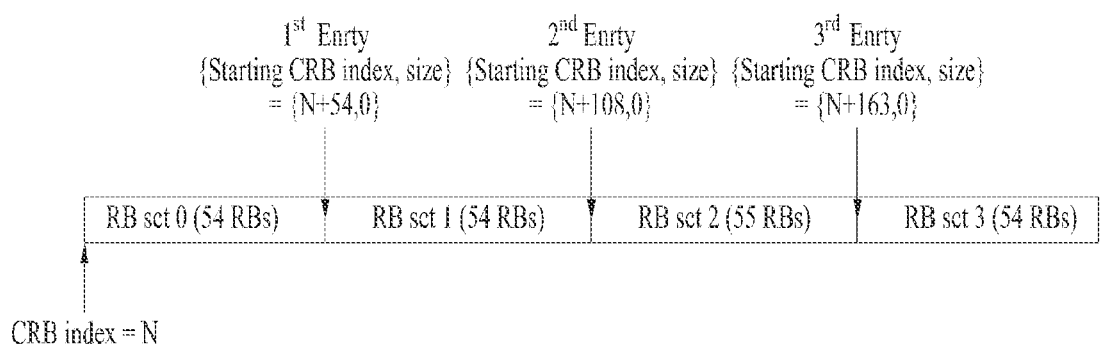

Referring to FIG. 16, if the GB size for at least one entry for a DL carrier or UL carrier is indicated as 0 in Opt 1, the UE may expect that the GB size for all entries corresponding to the DL carrier or UL carrier is 0. In this case, the BWP configuration may be configured to accurately include one or more RB sets as shown in Table 17, or restrictions may be applied to the BWP configuration so that only a BWP with the same band as the carrier is always configured.

For example, referring to FIG. 16, when a band consisting of RB sets 0/1/2/3 is operating as a UL active BWP, and when the UE performs UL transmission in some of the RB sets, the UL transmission may be allowed only if the CAP is successful for all RB sets. In other words, when the UE performs UL transmission in some of the corresponding RB sets, if the CAP fails for at least one RB set among all RB sets, the UL transmission may not be allowed. For example, when PUSCH transmission in slot #m is scheduled for RB set 0 and RB set 1, only if the CAP is successful for all RB sets 0/1/2/3, the PUSCH transmission scheduled in slot #m may be allowed.

Figure 17:
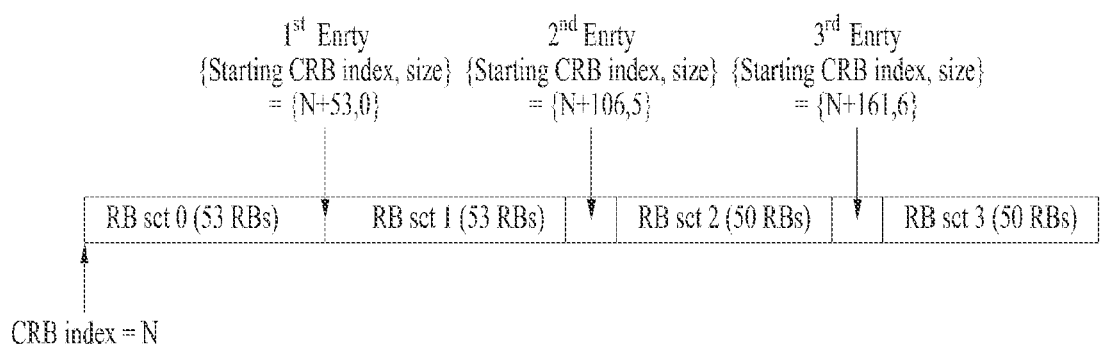

Referring to FIG. 17, it may be allowed that the GB size for some entries for a DL carrier or UL carrier is set to 0 and the GB size of some other entries is set to a value greater than 0 in Opt 2. However, when a BWP is configured for the corresponding DL carrier or UL carrier, the UE may expect that the GB size for all entries for the corresponding DL BWP or UL BWP is 0 or the GB size for all entries is greater than 0. For example, referring to FIG. 17, if a specific DL BWP or UL BWP includes either RB set 0 or RB set 1, the UE may expect that both RB set 0 and RB set 1 are configured to be included in the corresponding BWP. That is, a configuration in which all RB sets 0/1 are included in the BWP may be allowed, and a configuration in which at least one of RB set 2 and RB set 3 is included in the BWP may be allowed. On the other hand, a BWP configuration including only RB set 0 or a BWP configuration including RB sets 0/1 and RB set 2 (or RB set 3) together may not be allowed. For example, referring to FIG. 17, the UE may not expect a BWP configuration consisting of only RB sets 1/2/3.

When a band consisting of RB sets 0/1 is operating as a UL active BWP, and when the UE performs UL transmission in some of the RB sets, the UL transmission may be allowed only if the CAP is successful for all RB sets. In other words, when the UE performs UL transmission in some of the corresponding RB sets, if the UE fails the CAP for at least one RB set among all RB sets, the UL transmission may not be allowed. For example, when PUSCH transmission in slot #m is scheduled for RB set 0, only if the CAP is successful for all RB sets 0/1, the PUSCH transmission scheduled in slot #m may be allowed.

Referring to FIG. 17, a band of 80 MHz may be operating as a UL active BWP in Opt 3. In this case, GB RRC signaling may indicate that the GB size for the first entry is 0 and the GB size for the remaining entries is greater than 0. When the UE performs UL transmission in some of the both RB sets located at both ends of the GB set to 0, the UL transmission may be allowed only if the CAP is successful for the both RB sets. In other words, when the UE performs UL transmission in some of the both RB sets of the GB set to 0, if the CAP fails for at least one RB set of the both RB sets, the UL transmission may not be allowed. As an example, when PUSCH transmission in slot #m is scheduled for RB set 0, only if the CAP is successful for all RB sets 0/1, the PUSCH transmission scheduled in slot #m may be allowed. As another example, when PUSCH transmission in slot #m is scheduled for RB sets 1/2/3, only if the CAP is successful for all RB sets 0/1/2/3, the PUSCH transmission scheduled in slot #m may be allowed. As a further example, when PUSCH transmission in slot #m is scheduled for RB set 3, only if the CAP is successful for RB set 3, the PUSCH transmission scheduled in slot #m may be allowed.

In addition, when Opts 1/2/3 are applied, the number of RBs corresponding to an interlace index configured as a PUCCH resource in any RB set may be 12 (or more). However, the interlace-based PUCCH resource defined in the NR-U system may include only 11 RBs or 10 RBs. Therefore, a rule for determining resource(s) used for actual PUCCH transmission among the 12 (or more) RBs may be required. Specifically, for interlace-based PUCCH formats 0/1/2, if the number of RBs corresponding to an interlace index in an indicated RB set is 12 or more, a PUCCH resource may consist of 11 RBs having the lowest (or highest) PRB indices. In addition, for interlace-based PUCCH format 3, if the number of RBs corresponding to an interlace index in an indicated RB set is 12 or more, a PUCCH resource may consist of 10 RBs with the lowest (or highest) PRB indices.

Alternatively, when Opts 1/2/3 are applied, restrictions may be applied to signaling of the starting CRB index (and GB size) for each RB set such that the number of RBs corresponding to an interlace index configured as a PUCCH resource in any RB set does not exceed 12 (or more). In other words, when the UE derives RB set resources based on GB-related RRC signaling, the UE may expect that a PUCCH resource corresponding to any RB set does not include more than 12 RBs.

[Method #10]

When monitoring of DCI format 2_0 is configured, the following four fields may be configured for NR-U cells (for each cell).

Slot format indicator (SFI) field
Channel occupancy duration field
RB set indicator field
Search space set switching field When monitoring of DCI format 2_0 including the channel occupancy duration field is configured without the SFI field, the following operations: DL reception and UL transmission within the remaining COT duration indicated by the channel occupancy duration field may be unclear. In the existing NR operation, for reception of a DL signal/channel (e.g., SPS PDSCH, periodic CSI-RS, semi-persistent CSI-RS, etc.) configured by higher layer signaling (e.g., RRC signaling), if DCI format 2_0 is configured, the DL signal/channel reception is allowed only when DL is indicated by corresponding DCI format 2_0. However, when monitoring of DCI format 2_0 including the channel occupancy duration field is configured without the SFI field, whether reception of a DL signal/channel configured by higher layer signaling is allowed may be unclear.

As one method, whether reception of DL signals/channels configured by higher layer signaling and transmission of UL signals/channels configured by higher layer signaling are allowed within the remaining COT duration indicated by DCI format 2_0 may be determined in the same way as when DCI format 2_0 is not configured. That is, if a UL signal/channel is indicated by a PDCCH or UL is not configured by RRC signaling for all or some symbols of DL signals/channels configured to be received by higher layer signaling, the UE may receive the corresponding DL signals/channels within the remaining COT duration. In addition, if a DL signal/channel is indicated by a PDCCH or DL is not configured by RRC signaling for all or some symbols of UL signals/channels configured to be transmitted by higher layer signaling, the UE may transmit the corresponding UL signals/channels within the remaining COT duration. However, it may be difficult for the BS to always guarantee the resources of the corresponding DL signals/channels or UL signals/channels within the COT duration. In addition, the BS may need to transmit a PDCCH for scheduling related resources to cancel transmission and reception of the corresponding signals/channels.

To solve the above problem, whether DL signals/channels configured to be received by higher layer signaling are received within the remaining COT duration may be explicitly signaled in DCI format 2_0. Specifically, the explicit signaling may be provided by an additional 1-bit field of DCI format 2_0. For example, if the additional 1-bit field value is '1' (or '0'), the UE may receive DL signals/channels configured to be received by higher layer signaling within the remaining COT duration indicated by the channel occupancy duration field. On the other hand, if the additional 1-bit field value is '0' (or '1'), the UE may not receive DL signals/channels configured to be received by higher layer signaling within the remaining COT duration indicated by the channel occupancy duration field.

In addition, whether UL signals/channels (e.g., configured grant PUSCH, periodic SRS, semi-persistent SRS, etc.) configured to be transmitted by higher layer signaling are transmitted within the remaining COT duration may be explicitly signaled in DCI format 2_0. For example, when the additional 1-bit field value is '1' (or '0'), the UE may transmit UL signals/channels configured to be transmitted by higher layer signaling within the remaining COT duration indicated by the channel occupancy duration field (if the CAP is successful). On the other hand, when the additional 1-bit field value is '0' (or '1'), the UE may not transmit UL signals/channels configured to be transmitted by higher layer signaling within the remaining COT duration indicated by the channel occupancy duration field (or the UE may not perform the corresponding CAP).

Alternatively, whether DL signals/channels configured to be received by higher layer signaling and UL signals/channels configured to be transmitted by higher layer signaling are transmitted/received within the remaining COT duration may be signaled explicitly and simultaneously by the additional 1-bit field of DCI format 2_0. Specifically, if the additional 1-bit field value is '1' (or '0'), the UE may transmit/receive DL and UL signals/channels configured by higher layer signaling within the remaining COT duration indicated by the channel occupancy duration field. On the other hand, if the additional 1-bit field value is '0' (or '1'), the UE may not transmit/receive DL and UL signals/channels configured by higher layer signaling within the remaining COT duration indicated by the channel occupancy duration field.

In the present disclosure, when it is said that DL or UL signals/channels configured to be transmitted and received by higher layer signaling are included in the remaining COT duration, it may mean that when the corresponding DL or UL signals/channels are configured with a set of symbols or slots, the corresponding symbol or slot set is included within the remaining COT duration.

[Method #11]

When monitoring of DCI format 2_0 is configured, the following four fields may be configured for NR-U cells (for each cell).

SFI field
Channel occupancy duration field
RB set indicator field
Search space set switching field When monitoring of DCI format 2_0 including the RB set indicator field and/or the search set spatial set switching field is configured without the SFI field and the channel occupancy duration field, it may be difficult to determine the remaining COT duration, and the following operations: DL reception and UL transmission within the remaining COT duration may be unclear. In this case, the remaining COT duration may be determined according to [Method #5] proposed above. Alternatively, when frame based equipment (FBE) is configured (that is, when the higher layer (e.g., RRC) parameter ChannelAccessMode-r16 is semi-statically configured), the remaining COT duration may be defined by the maximum COT, $T_y=0.95T_x$. In this case, $T_x$ denotes a period (in units of msec), and the period is configured by a higher layer parameter, which may be set to one of {1, 2, 2.5, 4, 5, 10} msec. That is, the maximum COT may be from the starting time of every period to $T_y$. Specifically, the remaining COT duration may be defined from a slot in which DCI format 2_0 is found to $T_y$.

As one method, whether reception and transmission of DL signals/channels configured to be received by higher layer signaling and UL signals/channels configured to be transmitted by higher layer signaling are allowed within the remaining COT duration, which is determined/defined as above, may be determined in the same way as when DCI format 2_0 is not configured in conventional NR. That is, if a UL signal/channel is indicated by a PDCCH or UL is not configured by RRC signaling for all or some symbols of DL signals/channels configured to be received by higher layer signaling, the UE may receive the corresponding DL signals/channels within the remaining COT duration. In addition, if a DL signal/channel is indicated by a PDCCH or DL is not configured by RRC signaling for all or some symbols of UL signals/channels configured to be transmitted by higher layer signaling, the UE may transmit the corresponding UL signals/channels within the remaining COT duration. However, it may be difficult for the BS to always guarantee the resources of the corresponding DL signals/channels or UL signals/channels within the COT duration. In addition, the BS may need to transmit a PDCCH for scheduling related resources to cancel transmission and reception of the corresponding signals/channels.

To solve the above problem, whether DL signals/channels configured to be received by higher layer signaling (e.g., RRC signaling) are received within the remaining COT duration may be explicitly signaled in DCI format 2_0. Specifically, the explicit signaling may be provided by the additional 1-bit field of DCI format 2_0. For example, if the additional 1-bit field value is '1' (or '0'), the UE may receive DL signals/channels configured to be received by higher layer signaling within the remaining COT duration determined/defined as above. On the other hand, if the additional 1-bit field value is '0' (or '1'), the UE may not receive DL signals/channels configured to be received by higher layer signaling within the remaining COT duration determined/defined as above.

In addition, whether UL signals/channels (e.g., configured grant PUSCH, periodic SRS, semi-persistent SRS, etc.) configured to be transmitted by higher layer signaling (e.g., RRC signaling) are transmitted within the remaining COT duration may be explicitly signaled in DCI format 2_0. Specifically, the explicit signaling may be provided by the additional 1-bit field of DCI format 2_0. For example, when the additional 1-bit field value is '1' (or '0'), the UE may transmit UL signals/channels configured to be transmitted by higher layer signaling within the remaining COT duration determined/defined as above (if the CAP is successful). On the other hand, when the additional 1-bit field value is '0' (or '1'), the UE may not transmit UL signals/channels configured to be transmitted by higher layer signaling within the remaining COT duration determined/defined as above (or the UE may not perform the corresponding CAP).

Alternatively, whether DL signals/channels configured to be received by higher layer signaling and UL signals/channels configured to be transmitted by higher layer signaling are transmitted/received within the remaining COT duration may be signaled explicitly and simultaneously by the additional 1-bit field of DCI format 2_0. Specifically, if the additional 1-bit field value is '1' (or '0'), the UE may transmit/receive DL and UL signals/channels configured by higher layer signaling within the remaining COT duration determined/defined as above. On the other hand, if the additional 1-bit field value is '0' (or '1'), the UE may not transmit/receive DL and UL signals/channels configured by higher layer signaling within the remaining COT duration determined/defined as above.

[Method #12]

When monitoring of DCI format 2_0 is configured, the following four fields may be configured for NR-U cells (for each cell).

SFI field
Channel occupancy duration field
RB set indicator field
Search space set switching field When the UE performs channel measurement, the UE may perform the channel measurement by performing averaging for a plurality of CSI-RSs. Specifically, when a plurality of CSI-RSs are received from the BS, the UE may measure a channel based on the average value of the plurality of CSI-RSs. For example, the UE may measure a channel based on the average value of received power for a plurality of CSI-RSs, but the present disclosure is not limited thereto. Alternatively, the UE may measure the amount of interference based on the average value of the amount of power received in a plurality of CSI-RS resources, but the present disclosure is not limited thereto. For example, the UE may measure the interference amount or interference strength based on the average received power in a plurality of CSI-RS resources received for interference measurement. However, the transmission power for each carrier/BWP/RB set may vary depending on whether the BS succeeds in the CAP for each carrier/BWP/RB set, and it may be difficult to accurately measure a channel if the channel is measured based on the average value of CSI-RSs transmitted with different transmission power. For example, when the maximum output power in a 5 GHz band is limited to 23 dBm by regulations, if the BS performs transmission in a 40 MHz band, the output power for each 20 MHz band may be 20 dBm. If the BS performs transmission in a 20 MHz band, the output power for the 20 MHz band may be 23 dBm. In this case, if a channel is measured based on the average value of a CSI-RS transmitted with the 20 dBm power and a CSI-RS transmitted with the 23 dBm power, it may be difficult to accurately measure the channel. Therefore, the UE needs to measure a channel based on CSI-RSs transmitted with the same transmission power to accurately measure the channel. However, since it may be difficult for the UE to know the occupied bandwidth and output power of the BS, the UE may perform averaging only for a plurality of CSI-RSs belonging to one DL transmission burst (or DL burst) in which the same transmission power is maintained. In other words, since it is difficult to expect that the same transmission power will be maintained between different DL transmission bursts, averaging may not be allowed between CSI-RSs belonging to different DL transmission bursts when channel measurement (or CSI measurement) is performed. However, when the SFI field and the channel occupancy duration field are not configured (or when monitoring of DCI format 2_0 is not configured), it may be difficult for the UE to identify different DL transmission bursts in a corresponding cell. Accordingly, the present disclosure proposes methods for solving the above-described problem. In the proposed methods, the channel occupancy duration field may be referred to as a COT indicator field, or the channel occupancy duration field may be referred to as a COT duration field in some embodiment. In addition, each of a plurality of CSI-RSs used for channel measurement may be a periodic CSI-RS or a semi-persistent CSI-RS.

Specifically, according to the proposed methods, when channel measurement (and/or interference measurement) is performed, averaging may not be allowed between CSI-RSs that are determined not to be included in the same DL transmission burst (or determined not to be in a duration where the same power is maintained). That is, when the UE performs channel measurement and/or interference measurement, averaging may not be allowed between CSI-RSs determined to be included in different DL transmission bursts.

In an embodiment, the UE may expect that timeRestrictionForChannelMeasurements (or timeRestrictionForInterferenceMeasurements) is always configured for a corresponding cell. That is, when the SFI field and the channel occupancy duration field are not configured (or when monitoring of DCI format 2_0 is not configured), it may be difficult for the UE to determine the presence of the same DL transmission burst because the UE is incapable of receiving information on the channel occupancy duration. Accordingly, the UE may perform channel measurement (and/or interference measurement) only within a specific slot by assuming that the power of the BS may vary for each slot.

TABLE 18

| 5.2.2.1 Channel quality indicator (CQI) |
| --- |
| The CQI indices and their interpretations are given in Table 5.2.2.1-2 or Table 5.2.2.1-4 for reporting CQI based on QPSK, 16QAM and 64QAM. The CQI indices and their interpretations are given in Table 5.2.2.1-3 for reporting CQI based on QPSK, 16QAM, 64QAM and 256QAM.<br>Based on an unrestricted observation interval in time unless specified otherwise in this Clause, and an unrestricted observation interval in frequency, the UE shall derive for each CQI value reported in uplink slot n the highest CQI index which satisfies the following condition:<br>   - A single PDSCH transport block with a combination of modulation scheme, target code rate and transport block size corresponding to the CQI index, and occupying a group of downlink physical resource blocks termed the CSI reference resource, could be received with a transport block error probability not exceeding:<br>     - 0.1, if the higher layer parameter cqi-Table in CSI-ReportConfig configures 'table1' (corresponding to Table 5.2.2.1-2), or 'table2' (corresponding to Table 5.2.2.1-3), or<br>     - 0.00001, if the higher layer parameter cqi-Table in CSI-ReportConfig configures 'table3' (corresponding to Table 5.2.2.1-4).<br>If a UE is not configured with higher layer parameter timeRestrictionForChannelMeasurements, the UE shall derive the channel measurements for computing CSI value reported in uplink slot n based on only the NZP CSI-RS, no later than the CSI reference resource, (defined in TS 38.211[4]) associated with the CSI resource setting.<br>If a UE is configured with higher layer parameter timeRestrictionForChannelMeasurements in CSI-ReportConfig, the UE shall derive the channel measurements for computing CSI reported in uplink slot n based on only the most recent, no later than the CSI reference resource, occasion of NZP CSI-RS (defined in [4, TS 38.211]) associated with the CSI resource setting.<br>If a UE is not configured with higher layer parameter timeRestrictionForInterferenceMeasurements, the UE shall derive the interference measurements for computing CSI value reported in uplink slot n based on only the CSI-IM and/or NZP CSI-RS for interference measurement no later than the CSI reference resource associated with the CSI resource setting.<br>If a UE is configured with higher layer parameter timeRestrictionForInterferenceMeasurements in CSI-ReportConfig, the UE shall derive the interference measurements for computing the CSI value reported in uplink slot n based on the most recent, no later than the CSI reference resource, occasion of CSI-IM and/or NZP CSI-RS for interference measurement (defined in [4, TS 38.211]) associated with the CSI resource setting. |

In another embodiment, when monitoring of DCI format 2_0 is configured, but when the SFI field and the channel occupancy duration field are not configured, the UE may determine that the remaining COT duration determined by the method proposed above is the same DL transmission burst (or determine that the same power is maintained for the remaining COT duration).

In another embodiment, when the SFI field and the channel occupancy duration field are not configured, if a specific RRC parameter (e.g., CSI-RS-ValidationWith-DCI-r16) is configured as shown in Table 19, the UE may determine (or recognize) that only periodic or semi-persistent CSI-RSs that fully overlap with a scheduled PDSCH and/or triggered aperiodic CSI-RSs are valid. The UE may determine that periodic or semi-persistent CSI-RSs that do not fully overlap with the scheduled PDSCH and/or triggered aperiodic CSI-RSs are invalid and may not receive the corresponding periodic or semi-persistent CSI-RSs. Accordingly, the UE may not perform averaging for the periodic or semi-persistent CSI-RSs that do not fully overlap with the scheduled PDSCH and/or triggered aperiodic CSI-RSs during channel measurement. In this case, only when the scheduled PDSCH and/or triggered aperiodic CSI-RSs are continuous in the time domain without a gap, the UE may recognize the corresponding continuous time resource duration as the same DL transmission burst (i.e., a duration where the same power is maintained). That is, when the UE performs channel measurement, if the scheduled PDSCH and/or triggered aperiodic CSI-RSs are continuous in the time domain without gaps, the UE may determine that the continuous time duration including the scheduled PDSCH and/or triggered aperiodic CSI-RSs is the same DL transmission burst and then perform averaging for a plurality of CSI-RSs belonging to the same DL transmission burst. For example, when the UE receives a scheduled PDSCH and triggered aperiodic CSI-RSs and when the PDSCH and aperiodic CSI-RSs are continuous in the time domain without gaps, the UE may determine that the continuous time duration including the PDSCH and aperiodic CSI-RSs is the same DL transmission burst.

above. If the UE does not receive the information on the channel occupancy duration from the BS, it may be difficult for the UE to determine the presence of the same DL transmission burst. According to the proposed methods, the UE may determine the presence of the same (or one) DL transmission burst based on at least one of a PDSCH and an aperiodic CSI-RS, and the UE may obtain CSI based on a plurality of CSI-RSs belonging to the same DL transmission burst. In this case, the PDSCH may mean a PDSCH scheduled by a PDCCH, and the aperiodic CSI-RS may mean an aperiodic CSI-RS triggered by the PDCCH. In addition, each of the plurality of CSI-RSs used for channel measurement may include a periodic CSI-RS or a semi-persistent CSI-RS. Specifically, the UE may obtain the CSI based on a plurality of CSI-RSs that fully overlap with at least one of the PDSCH and aperiodic CSI-RS in the time domain. In this case, a duration corresponding to the PDSCH and aperiodic CSI-RS in the time domain may be a continuous time duration with no gaps in the time domain. When the duration corresponding to the PDSCH and aperiodic CSI-RS is a continuous duration in the time domain, the UE may determine the duration as one DL transmission burst. The UE may determine a plurality of CSI-RSs fully overlapping with the PDSCH and aperiodic CSI-RS continuous in the time domain as CSI-RSs belonging to one DL transmission burst. When the UE receives both the PDSCH and aperiodic CSI-RS, the expression of "the duration corresponding to the PDSCH and aperiodic CSI-RS is a continuous time duration in the time domain and fully overlaps with at least

TABLE 19

For operation with shared spectrum channel access, if a UE is provided CSI-RS-Validation With-DCI-r16, is not provided CO-DurationPerCell-r16, and is not provided SlotFormatIndicator, and if the UE is configured by higher layers to receive a CSI-RS in a set of symbols of a slot, the UE cancels the CSI-RS reception in the set of symbols of the slot if the UE does not detect a DCI format indicating an aperiodic CSI-RS reception or scheduling a PDSCH reception in the set of symbols of the slot.

Figure 18:
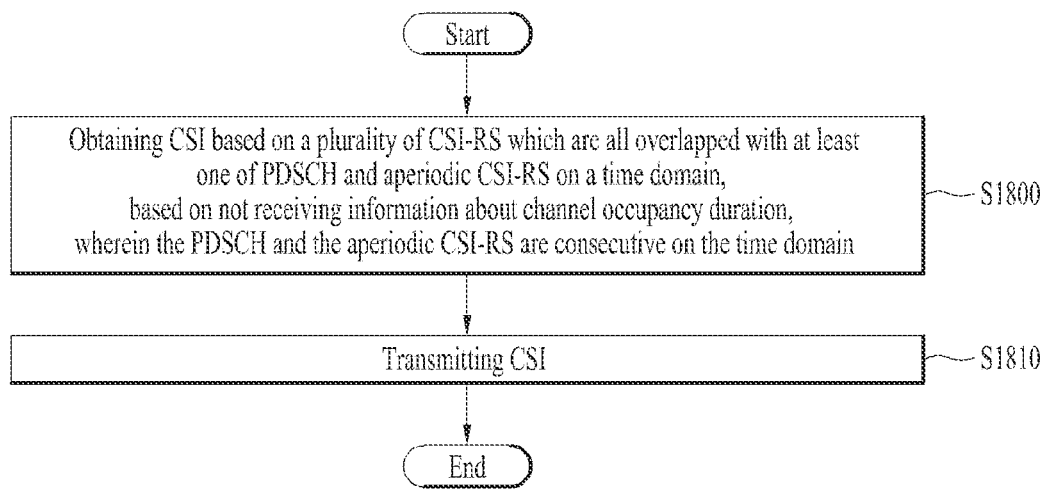

FIG. 18 is a flowchart illustrating operations of a UE according to a proposed embodiment.

Referring to FIG. 18, based on a failure to obtain information on a channel occupancy duration from a BS, the UE may obtain CSI based on a plurality of CSI-RSs fully overlapping with at least one of a PDSCH resource and an aperiodic CSI-RS resource (S1800). In this case, the failure to obtain the information on the channel occupancy duration from the BS may mean that the UE receives group common DCI (e.g., DCI format 2_0) in which the SFI field and the channel occupancy duration field are not configured or does not monitor the group common DCI. For example, the UE may obtain the information on the channel occupancy duration based on at least one of the SFI field and the channel occupancy duration field, which may be included in DCI format 2_0. Whether each field included in DCI format 2_0 is configured or not may be flexibly determined. Accordingly, the SFI field and the channel occupancy duration field may not be configured in DCI format 2_0. When the UE receives DCI format 2_0 that does not include the SFI field and the channel occupancy duration field, the UE may not obtain the information on the channel occupancy duration from DCI format 2_0. Alternatively, in some embodiments, the UE may be configured not to monitor DCI format 2_0. If the UE is configured not to monitor DCI format 2_0, the UE may not receive the information on the channel occupancy duration from the BS. In this case, the UE may need to perform channel measurement based only on CSI-RSs belonging to the same DL transmission burst as described one of the PDSCH and aperiodic CSI-RS in the time domain" may mean that the PDSCH and aperiodic CSI-RS are continuous in the time domain, and a plurality of CSI-RS resources are all included in the continuous time duration corresponding to the PDSCH and aperiodic CSI-RS. When the UE receives only the PDSCH, the UE may obtain the CSI based on a plurality of CSI-RSs fully overlapping with the PDSCH in the time domain. When the UE receives only the aperiodic CSI-RS, the UE may obtain the CSI based on a plurality of CSI-RSs fully overlapping with the aperiodic CSI-RS in the time domain.

In other words, if CSI-RSs do not satisfy the above conditions, the UE may not determine that the corresponding CSI-RSs belong to one DL transmission burst and exclude the CSI-RSs from channel measurement. Specifically, the UE may determine that CSI-RS that do not fully overlap with a PDSCH and an aperiodic CSI-RS continuous in the time domain are not included in the same DL transmission burst and the UE may determine the corresponding CSI-RSs as invalid CSI-RSs when measuring a channel. Accordingly, the CSI-RSs that do not overlap with the PDSCH and aperiodic CSI-RSs continuous in the time domain may be excluded from calculating the average value of CSI-RSs for channel measurement.

The UE may acquire CSI based on the average value of a plurality of CSI-RSs. For example, the UE may obtain the CSI based on the average value of received power of the plurality of CSI-RSs, but the present disclosure is not limited thereto.

The UE may receive information indicating to configure the plurality of CSI-RSs based on at least one of the PDSCH and the aperiodic CSI-RS through higher layer signaling. In this case, the higher layer signaling may mean RRC signaling, which be indicated through the parameter CSI-RS-ValidationWith-DCI-r16 as described above. Accordingly, when the parameter CSI-RS-ValidationWith-DCI-r16 is configured, the UE may determine the plurality of CSI-RSs for performing channel measurement based on at least one of the PDSCH and aperiodic CSI-RS. The UE may perform the channel measurement based on the determined plurality of CSI-RSs and then obtain CSI.

The UE may transmit the obtained CSI to the BS (S1810).

[Method #13]

Hereinafter, a description will be given of a method of receiving a periodic or semi-persistent CSI-RS (hereinafter referred to as a P/SP CSI-RS for convenience) during an SCell activation period and measuring/reporting CSI.

As shown in Table 20, the SCell activation period mentioned herein may mean a period between minimum delay requirements for SCell activation defined in Tables 21 to 24 after reception of an activation command in slot n and transmission of a related HARQ-ACK in slot (n+k).

TABLE 20

4.3 Timing for secondary cell activation/deactivation

With reference to slots for PUCCH transmissions, when a UE receives in a PDSCH an activation command [11, TS 38.321] for a secondary cell ending in slot n, the UE applies the corresponding actions in [11, TS 38.321] no later than the minimum requirement defined in [10, TS 38.133] and no earlier than slot n + k , except for the following:
- the actions related to CSI reporting on a serving cell that is active in slot n + k
- the actions related to the sCellDeactivationTimer associated with the secondary cell [11, TS 38.321] that the UE applies in slot n + k
- the actions related to CSI reporting on a serving cell which is not active in slot n + k that the UE applies in the earliest slot after n + k in which the serving cell is active.

The value of k is $k_1 + 3 \cdot N_{slot}^{subframe,\mu} + 1$ where $k_1$ is a number of slots for a PUCCH transmission with HARQ-ACK information for the PDSCH reception and is indicated by the PDSCH-to-HARQ_feedback timing indicator field in the DCI format scheduling the PDSCH reception as described in Clause 9.2.3 and $N_{slot}^{subframe,\mu}$ is a number of slots per subframe for the SCS configuration $\mu$ of the PUCCH transmission.

With reference to slots for PUCCH transmissions, if a UE receives a deactivation command [11, TS 38.321] for a secondary cell ending in slot n , the UE applies the corresponding actions in [11, TS 38.321] no later than the minimum requirement defined in [10, TS 38.133], except for the actions related to CSI reporting on an activated serving cell which the UE applies in slot n + k .

TABLE 21

8.3A.2 SCell Activation Delay Requirement for Deactivated SCell

The requirements in this clause shall apply for the UE configured with one downlink SCell operating with CCA in EN-DC or in standalone NR carrier aggregation and when one SCell operating with CCA is being activated. The delay within which the UE shall be able to activate the deactivated SCell depends upon the specified conditions.

Upon receiving SCell activation command in slot n, the UE shall be capable to transmit valid CSI report and apply actions related to the activation command for the SCell being activated no later than in slot n + $(T_{HARQ} + T_{activation\_time\_withCCA} + T_{CSI\_reporting\_withCCA})$/NR_slot_length, where:
- $T_{HARQ}$ (in ms) is the timing between DL data transmission and acknowledgement as specified in TS 38.213 [3]. In the event of UE not being able to transmit the acknowledgment due to UL CCA failures: $T_{HARQ}$ is extended to also include the time to all next HARQ feedback transmission and retransmission opportunities, until the time of its successful transmission, as specified in TS 38.213 [3]; no extension of $T_{HARQ}$ due to UL LBT failures is allowed for Type 2C UL channel access procedure as defined in TS 37.213 [57].
- $T_{activation\_time\_withCCA}$ is the SCell activation delay in millisecond.
    - If the SCell is known, $T_{activation\_time\_withCCA}$ is:
        - $T_{FirstSSB} + L_1 * T_{rs} + 5ms$, if the SCell measurement cycle is equal to or smaller than 160ms.
        - $T_{FirstSSB\_MAX} + L_{2,1} * T_{SMTC\_MAX} + (1 + L_{2,2}) * T_{rs} + 5ms$, if the SCell measurement cycle is larger than 160ms.
    - If the SCell is unknown, provided that the side condition $\hat{E}s/Iot \geq -2$ dB is fulfilled and the SCell can be successfully detected in one attempt, $T_{activation\_time\_withCCA}$ is:
        - $T_{FirstSSB\_MAX} + (1 + L_{3,1}) * T_{SMTC\_MAX} + (2 + L_{3,2}) * T_{rs} + 5ms$.
    Where,
    $T_{SMTC\_MAX}$:
    - In case of intra-band SCell activation, $T_{SMTC\_MAX}$ is the longest SMTC periodicity between active serving cells and SCell being activated provided the cell specific reference signals from the active serving cells and the SCells being activated or released are available in the same slot;
    - In case of inter-band SCell activation, $T_{SMTC\_MAX}$ is the SMTC periodicity of SCell being activated;
    - $T_{SMTC\_MAX}$ is bounded to a minimum value of 10ms.

TABLE 22

$T_{rs}$ is the SMTC periodicity of the SCell being activated if the UE has been provided with an SMTC configuration for the SCell in SCell addition message, otherwise $T_{rs}$ is the SMTC configured in the measObjectNR having the same SSB frequency and subcarrier spacing. If the UE is not provided SMTC configuration or measurement object on this frequency, the requirement which involves $T_{rs}$ is applied with $T_{rs}$ = 5ms assuming the SSB transmission periodicity is 5ms. There are no requirements if the SSB transmission periodicity is not 5ms
$T_{FirstSSB}$: is the time to the end of the first complete configured SSB burst indicated by the SMTC after slot n + $(T_{HARQ}+3ms)$/NR_slot_length
$T_{FirstSSB\_MAX}$: is the time to the end of first complete configured SSB burst indicated by the SMTC after slot n + $(T_{HARQ}+3ms)$/NR_slot_length when all active serving cells and SCells being activated or released have configured SSB bursts in the same slot for intra-band scenario. In case of inter-band SCell activation, $T_{FirstSSB\_MAX}$ is the time to the end of the first complete configured SSB burst of the SCell being activated.
$L_1$ ($L_1 \leq L_{1,max}$) is the number of configured SMTC occasions not available at the UE. $L_{1,max}$ = 2 if $T_{rs} \leq 40$ ms; otherwise $L_{1,max}$ = 1.
$L_{2,1}$ ($L_{2,1} \leq L_{2,1,max}$) and $L_{3,1}$ ($L_{3,1} \leq L_{3,1,max}$) are the number of configured SMTC occasions not available at the UE
   in the SCell being activated, for inter-band scenario, or
   in any of the SCells already activated or being activated provided their cell specific reference signals are configured in the same slot, for intra-band scenario
and $L_{2,1,max}$ = 2 if $T_{SMTC\_MAX} \leq 40$ ms; otherwise $L_{2,1,max}$ = 1. $L_{3,1,max}$ = 2 if $T_{SMTC\_MAX} \leq 40$ ms; otherwise $L_{3,1,max}$ = 1.

TABLE 23

$L_{2,2}$ ($L_{2,2} \leq L_{2,2,max}$) and $L_{3,2}$ ($L_{3,2} \leq L_{3,2,max}$) are the number of configured SMTC occasions not available at the UE in the SCell being activated. $L_{2,2,max}$ = 2 if $T_{rs} \leq 40$ ms; otherwise $L_{2,2,max}$ = 1. $L_{3,2,max}$ = 2 if $T_{rs} \leq 40$ ms; otherwise $L_{3,2,max}$ = 1.
$T_{CSI\_reporting\_withCCA}$ is the delay (in ms) including uncertainty in acquiring the first available downlink CSI reference resource, UE processing time for CSI reporting and uncertainty in acquiring the first available CSI reporting resources as specified in TS 38.331 [2] and additional delay in reception of CSI-RS due to unavailability of reference signal CCA and additional delay in transmission of CSI reporting due to CCA failure in UL. $T_{CSI\_reporting\_withCCA} = T_{CSI\_reporting} + L_4 * T_{CSI-RS} + T_{CSI\_ReportingDelay}$, where
$T_{CSI\_reporting}$ is defined in clause 8.3.2
$T_{CSI-RS}$ is the periodicity of the configured CSI-RS
$T_{CSI\_ReportingDelay}$ is the additional delay in transmission of CSI reporting due to CCA failure in UL. If there are no uplink resources for reporting the valid CSI, then the UE shall use the next available opportunities for reporting the corresponding valid CSI as specified in TS 38.213 [3].
$L_4$ ($L_4 \leq L_{4,max}$) is the number of occasions the CSI-RS is not available. $L_{4,max}$ = 2 if $T_{CSI-RS} \leq 40$ms and $L_{4,max}$ = 1 otherwise.
If the unavailability of any of the corresponding reference signal exceeds $L_{1,max}$, or $L_{2,1,max}$, or $L_{2,2,max}$, or $L_{3,1,max}$, or $L_{3,2,max}$ or $L_{4,max}$, UE shall abandon the SCell activation procedure.
SCell operating with CCA is known if it has been meeting the following conditions:
  - During the period equal to max(5 measCycleSCell, 5 DRX cycles) before the reception of the SCell activation command:
    - the UE has sent a valid measurement report for the SCell being activated and
    - the SSB measured remains detectable according to the cell identification conditions specified in clause 9.2A and 9.3A.
  - the SSB measured during the period equal to max(5 measCycleSCell, 5 DRX cycles) also remains detectable during the SCell activation delay according to the cell identification conditions specified in clause 9.2A and 9.3A.
Otherwise SCell operating with CCA is unknown.

TABLE 24

If the UE has been provided with higher layer in TS 38.331 [2] signaling of smtc2 prior to the activation command, $T_{SMTC\_Scell}$ follows smtc1 or smtc2 according to the physical cell ID of the target cell being activated. $T_{SMTC\_MAX}$ follows smtc1 or smtc2 according to the physical cell IDs of the target cells being activated and the active serving cells.
In addition to CSI reporting defined above, UE shall also apply other actions related to the activation command specified in TS 38.331 [2] for a SCell at the first opportunities for the corresponding actions once the SCell is activated.
The starting point of an interruption window on SpCell or any activated SCell as specified in clause 8.2, shall not occur before slot $$n + 1 + \frac{T_{HARQ}}{NR\ slot\ length}$$

and not occur after slot $$n + 1 + \frac{T_{HARQ} + 3 + T_X}{NR\ slot\ length},$$

where Tx is:
$T_{FirstSSB} + (L_1) * T_{rs}$, for known SCell activation when SCell measurement cycle is equal to, or smaller than, 160 ms;
$T_{FirstSSB\_MAX} + L_{2,1} * T_{SMTC\_MAX}$ for known SCell activation when SCell measurement cycle is greater than 160 ms;
$T_{FirstSSB\_MAX} + L_{3,1} * T_{SMTC\_MAX}$ for unknown SCell activation
For intra-band CA, while the SCell being activated is known or unknown with measurement cycle greater than 160 ms, up to 1 + L interruption windows are allowed during SCell activation, where L = $L_{2,1}$ for known SCell and L = $L_{3,1}$ for unknown SCell. For a single interruption (L = 0), interruption window length at SCell activation does not depend on DL CCA failures.

TABLE 24-continued

Editor's Note: Interruption windows for inter-band CA is FFS.
The length of the interruption window may be different for
different victim cells, and depends on the applicable scenario and
on the frequency band relation between the aggressor cell and the
victim cell. For a single interruption (L = 0), the interruption window
length at SCell activation does not depend on DL CCA failures.
Starting from the slot specified in clause 4.3 of TS 38.213 [3]
(timing for secondary Cell activation/deactivation) and until the UE
has completed the SCell activation, the UE shall report out of range
if the UE has available uplink resources to report CQI for the SCell.
Starting from the slot specified in clause 4.3 of TS 38.213 [3] (timing
for secondary Cell activation/deactivation) and until the UE has
completed a first L1-RSRP measurement, the UE shall report lowest
valid L1 SS-RSRP range if the UE has available uplink resources
to report L1-RSRP for the SCell.
Editor's Note: Applicability of SCell activation requirements for the
case when sCellDeactivationTimer is not configured is FFS.
Editor's Note: UE behavior with respect to a configured
sCellDeactivationTimer in SCell activation is FFS.

Specifically, the UE receives a P/SP CSI-RS at a time point other than the SCell activation period in the following case. For convenience, a serving cell where SCell activation is indicated is named cell #1.

Case 1: When the SFI field for cell #1 or the channel occupancy duration or CO-duration field for cell #1 is configured in DCI format 2_0→Since the COT duration is determined as shown in Table 18, the UE may receive only a P/SP CSI-RS within the determined COT duration and may not receive a P/SP-CSI-RS outside the COT duration.

Case 2: When both the SFI field for cell #1 and the channel occupancy duration or CO-duration field for cell #1 are not configured in DCI format 2_0, but when CSI-RS-ValidationWith-DCI-r16 (for cell #1) is configured→The UE may receive only a P/SP CSI-RS in a region overlapping a PDSCH or aperiodic CSI-RS indicated by UE-specific DCI as shown in Table 19, but the UE may not receive a P/SP CSI-RS in other regions.

Case 3: When both the SFI field for cell #1 and the channel occupancy duration or CO-duration field for cell #1 are not configured in DCI format 2_0, and when CSI-RS-ValidationWith-DCI-r16 (for cell #1) is not configured→The UE may receive a configured P/SP CSI-RS on the assumption that the P/SP CSI-RS is always transmitted.

For Case 1 and/or Case 2, the UE may receive information on whether to receive a P/SP CSI-RS in specific DCI before receiving the P/SPCSI-RS and determine whether to receive the P/SP CSI-RS based on the received information, unlike conventional P/SP CSI-RS reception (in licensed bands). However, since there is no requirement that the UE needs to monitor a PDCCH during the SCell activation period, the UE may be configured not to perform PDCCH monitoring during the SCell activation period in some embodiments.

Alt 1: As one method, the UE may be requested to perform the above-described operation, which is performed at a time other than the SCell activation period, even during the SCell activation period. However, when the UE is required to perform the operation, which is performed at a time other than the SCell activation period, during the SCell activation period, PDCCH reception may be required before P/SP CSI-RS reception, and as a result, the SCell activation delay requirement may increase.

Alt 2: As another method, P/SP CSI-RS reception may be allowed without PDCCH reception (or without PDCCH information) during the SCell activation period (even in Case 1 and/or Case 2). In this case, in consideration of a CAP failure of the BS, the UE may be required to perform blind detection (BD) for a P/SP CSI-RS. Alternatively, the UE may receive the P/SP CSI-RS without BD by assuming that the P/SP CSI-RS is always transmitted and perform CSI reporting.

In particular, a different method may be applied depending on whether information on the COT duration of cell #1 and/or a PDSCH (and/or aperiodic CSI-RS) indication for cell #1 is provided in cell #2 other than cell #1. The reason for this is that after completion of tracking, automatic gain control (AGC), application of a transmission configuration indicator (TCI) configured in a CORESET, etc. for PDCCH DM-RS reception while SCell activation is performed in cell #1, a considerable amount of time may be required to stably receive a PDCCH at a block error rate (BLER) below a predetermined threshold (e.g., 1%). However, if the above information is provided in cell #2 that is currently activated, an additional time for stable PDCCH reception may not be required. Thus, a P/SP CSI-RS may be received based on PDCCH information.

Specifically, for Case 1 (that is, when the SFI field or channel occupancy duration field for cell #1 is configured in DCI format 2_0), if the SFI field and/or channel occupancy duration field for cell #1 is configured in DCI format 2_0 transmitted on cell #2 (that is, if a CORESET TCI for receiving DCI format 2_0 on cell #1 is aligned, or if a CORESET TCI for receiving DCI format 2_0 indicating SFI/channel occupancy information related to cell #1 is aligned), the UE operation performed at a time other than the SCell activation period may be equally maintained even during the SCell activation period. On the other hand, if the SFI field and/or channel occupancy duration field for cell #1 is not configured in DCI format 2_0 transmitted in another serving cell other than cell #1 (that is, if a CORESET TCI for receiving DCI format 2_0 on cell #1 is not aligned, or if a CORESET TCI for receiving DCI format 2_0 indicating SFI/channel occupancy duration information related to cell #1 is not aligned), Opt 1) the UE may operate as in Alt 2, or Opt 2) the UE may be relaxed such that the UE does not need to perform CSI reporting or comply with the requirements for CSI values for a specific period of time (e.g., X ms, where X may be predefined and reported as UE capability) after the end of the SCell activation period. Alternatively, if the UE intends to report CSI, the UE may be allowed to report an out-of-range value. In this case, the SFI/channel occupancy duration information may be indicated by the SFI field/channel occupancy duration field of DCI format 2_0.

In addition, for Case 2 (that is, when neither the SFI field for cell #1 nor the channel occupancy duration field for cell #1 is configured in DCI format 2_0, but when CSI-RS-ValidationWith-DCI-r16 (for cell #1) is configured), if a PDSCH on cell #1 is capable of being scheduled by any DCI format (e.g., DCI format 1_1/1_2/0_1/0_2) transmitted on cell #2 (that is, if cross-carrier scheduling is configured), or if an aperiodic CSI-RS on cell #1 is capable of being triggered (that is, if a CORESET TCI for receiving DCI on cell #1 is aligned, or if a CORESET TCI for receiving DCI indicating scheduling information related to cell #1 is aligned), the UE operation performed at a time other than the SCell activation period may be equally maintained even during the SCell activation period. On the other hand, if a PDSCH and/or aperiodic CSI-RS to be transmitted in cell #1 is incapable of being indicated by any DCI format (e.g., DCI format 1_1/1_2/0_1/0_2) transmitted in another serving cell other than cell #1 (that is, if a CORESET TCI for receiving DCI on cell #1 is not aligned, or if a CORESET TCI for receiving DCI indicating scheduling information related to cell #1 is not aligned), Opt 1) the UE may operate as in Alt 2, or Opt 2) the UE may be relaxed such that the UE does not need to perform CSI reporting or comply with the requirements for CSI values for a specific period of time (e.g., X ms, where X may be predefined and reported as UE capability) after the end of the SCell activation period. Alternatively, if the UE intends to report CSI, the UE may be allowed to report an out-of-range value.

2) Transmitter (Entity B (e.g., BS)):

[Method #1A] Allocating SFI Field for Each CAP-BW in CO-DCI

For example, in the CA situation of FIG. 9, N1 may be allocated for CAP-BW#1-1, N2 may be allocated for CAP-BW#1-2, N3 may be allocated for CAP-BW#2-1, and N4 may be allocated for CAP-BW#3-1, as shown in FIG. 10. Thereby, the SFI may be indicated for each CAP-BW in the CO-DCI.

[Method #1A-1] Configuring an SFI Field for Each CAP-BW in the CO-DCI, Wherein Specific CAP-BWs May Share the Same Offset Value In FIG. 10, the entirety or part of N1/N2/N3/N4 may be set to the same value. For example, CAP-BW#1-1/#1-2 belong to the same carrier. Accordingly, on the assumption that the BS indicates the same D/U direction for CAP-BW#1-1/#1-2, DCI overhead may be reduced by indicating the D/U direction of CAP-BW#1-1/#1-2 through the same field in the CO-DCI. That is, the D/U direction (e.g., SFI field) may be configured for each carrier. However, since the ON/OFF state of CAP-BW#1-1/#1-2 may also be shared, the ON/OFF state may not be indicated for each of the CAP-BWs. Such signaling configuration may implicitly indicate that the BS attempts to perform transmission only when the CAP is successful for both CAP-BW#1-1 and CAP-BW#1-2, which belong to CC#1, and otherwise, it does not transmit the DL burst. In addition, setting the offsets corresponding to CAP-BW#1-1/#1-2 belonging to the same carrier to the same value may mean that RBs corresponding to a guard band present between CAP-BW#1-1/#1-2 are available (e.g., mapped/transmitted) (for, for example, PDCCH, PDSCH and/or CSI-RS transmission) (or may be interpreted as meaning that the guard band is not configured).

Alternatively, a transmission mode related to a transmission method for each CAP-BW of the BS may be separately configured. For example, it may be separately signaled whether the mode is a mode (hereinafter, mode1) in which transmission is performed (in all CAP-BWs) only when the CAP is successful for all CAP-BWs belonging to the carrier/active BWP, or a mode (hereinafter, mode2) in which transmission is attempted for some CAP-BWs when the CAP is successful for the some CAP-BWs among the CAP-BWs belonging to the carrier/active BWP. When mode1 is configured, the BS may assume that the SFI field is shared (i.e., the same offset value is set or an offset value is set for each cell) for all the CAP-BWs belonging to the carrier/active BWP. When mode2 is configured, the BS may assume that the SFI field is configured for each CAP-BW belonging to the carrier/active BWP (i.e., a separate offset value is set, or an offset value is set for each CAP-BW).

In [Method #1A] and [Method #1-1A], through a specific state of the SFI field, it may be indicated that the CAP-BW(s) is OFF (that is, the BS does not attempt transmission due to CAP failure). As an example, when the SFI field is configured in 3 bits and is set to '000', it may indicate that the CAP-BW(s) corresponding to the SFI field is in an OFF state. As another example, when SlotFormatCombination is not linked to a specific state (e.g., SFI-index) of the SFI field, the state may be utilized to indicate the OFF state of the CAP-BW(s). The SFI field size may be determined by the set maximum number of SFI-indexes. When the SFI field size is 3 bits, SlotFormatCombination may not be configured for some of the 8 SFI-indexes. In this case, when the value of an SFI-index for which SlotFormatCombination is not configured is signaled, the BS may inform that the corresponding CAP-BW(s) is in an OFF state.

When the CAP-BW(s) is in the OFF state, the UL slot/symbol information about the CAP-BW in the ON state belonging to the same carrier/BWP or the same band as the CAP-BW(s) may be passed on to the CAP-BW(s) in the OFF state. As an example, CAP-BW#1-1 may be signaled in the OFF state, but CAP-BW#1-2 may be signaled in the ON state (when separate SFI fields are configured for CAP-BW#1-1 and CAP-BW#1-2). In this case, for example, if all symbols of slot #k/k+1 are signaled as UL for CAP-BW#1-2 through CO-DCI, the BS may inform that CAP-BW#1-1 is also UL for slot #k/k+1. This is because it may be considered impossible to perform reception in an adjacent band while performing transmission in the adjacent band, on the assumption that a BS operating in the unlicensed band generally operates through one radio frequency (RF) module. Accordingly, the BS may inform that, during slot #k/k+1, PDCCH monitoring is not performed in either CAP-BW#1-1 or CAP-BW#1-2 and configured UL transmission (e.g., periodic/semi-persistent PUCCH/SRS, configured grant PUSCH, etc.) is allowed.

In addition, through the specific state of the SFI field, it may be indicated that the corresponding CAP-BW(s) (in the slot in which the CO-DCI is detected) belongs to the first slot of transmission (e.g., DL burst) or to the first k slot(s) in the time duration occupied by the BS. As an example, when the SFI field is configured in 3 bits and is set to '111', it may indicate that the CAP-BW(s) corresponding to the SFI field (in the slot in which the CO-DCI is detected) belongs to the first slot (or the first k slots) of the DL burst. As another example, when SlotFormatCombination is not linked to a specific state (e.g., SFI-index) of the SFI field, the state may be utilized. The SFI field size may be determined by the set maximum number of SFI-indexes. When the SFI field size is 3 bits, SlotFormatCombination may not be configured for some of the 8 SFI-indexes. In this case, when the value of SFI-index for which SlotFormatCombination is not configured is signaled, the BS may inform that the CAP-BW(s) belongs to the first slot (or the first k slots) of the DL burst (in the slot in which the CO-DCI is detected). In this case, the BS may inform that DL is configured (for all cells configured in the unlicensed band or a part thereof) in the first slot (or the first k slots) of the DL burst. That is, in the slot(s) in which the CAP-BW(s) is recognized as belonging to the first slot (or the first k slots) of the DL burst, all symbols may be assumed to be DL. Accordingly, the BS may perform PDCCH transmission on the assumption that all symbols in the slot(s) are DL in the CAP-BW(s). In this method, in order to update the slot format of the CAP-BW(s), the BS may transmit DCI format 2_0 again within the same DL burst. For example, upon receiving SFI=111, the UE may recognize only that the CAP-BW(s) is the start of the DL burst, and identify the slot format (e.g., D/U/F) in the DL burst/COT based on the updated SFI information, while monitoring the PDCCH as in the case where the CAP-BW(s) is outside the DL burst.

In addition, the DL burst or the channel occupancy of the BS may be divided into two time durations (for all cells configured in the unlicensed band or a part thereof), and a search space set (or PDCCH) may be independently configured for each of the durations. For example, duration 1 may be defined as a duration within the first k slots in the DL burst or the channel occupancy of the BS (for all cells configured in the unlicensed band or a part thereof), and duration 2 may be defined as a duration after the first k slots in the DL burst or the channel occupancy of the BS (for all cells configured in the unlicensed band or a part thereof). Here, k may be predefined as an integer greater than or equal to 1 or may be set by separate RRC signaling. Specifically, when it is signaled/recognized that the CAP-BW(s) belongs to the first slot (or the first k slots) of the DL burst (in the slot in which the CO-DCI is detected), the BS may transmit a PDCCH through a specific first search space set for the corresponding duration (e.g., duration 1) (for all cells configured in the unlicensed band or a part thereof), or may transmit a specific first PDCCH for the corresponding duration (e.g., duration 1). On the other hand, when it is signaled/recognized that the CAP-BW(s) is in the ON state (in the slot in which the CO-DCI is detected), but does not belong to the first slot (or the first k slots) of the DL burst, the BS may transmit a PDCCH through a specific second search space set for the corresponding duration (e.g., duration 2) (for all cells configured in the unlicensed band or a part thereof), or may transmit a specific second PDCCH for the corresponding duration (e.g., duration 2). Here, the specific first and second search space sets may be different from each other. For example, the specific first and second search space sets may have different PDCCH monitoring periodicities. Also, the specific first and second PDCCHs may be different from each other. For example, DCI formats transmitted on the specific first and second PDCCHs may be different from each other. For example, the DCI format transmitted on the specific first PDCCH may include a group common DCI format (e.g., DCI format 2_0). Also, the DCI format transmitted on the specific second PDCCH may include a DCI format for data scheduling (e.g., DCI format 0_X/1_X) and a group common DCI format (e.g., DCI format 2_0).

[Method #2A] Allocating the SFI Field for Each CAP-BW in the CO-DCI and Configuring a Bitmap for Indicating the ON/OFF State of Each CAP-BW Through a Separate Field In the CA situation as shown in FIG. 9, N1 may be allocated to CAP-BW#1-1, N2 may be allocated to CAP-BW#1-2, N3 may be allocated to CAP-BW#2-1, and N4 may be allocated to CAP-BW#3-1, as shown in FIG. 11. Thereby, the ON/OFF state and SFI may be indicated for each CAP-BW in the CO-DCI. While the SFI field and the field indicating ON/OFF are illustrated in FIG. 11 as being consecutively positioned, a bit indicating the ON/OFF state may be added after the SFI field, or a bitmap or bit-field indicating ON/OFF may be configured through a separate offset value for each CAP-BW.

[Method #2A-1] Configuring an SFI Field for Each CAP-BW in the CO-DCI and Configuring a Bitmap for Indicating the ON/OFF State of Each CAP-BW Through a Separate Field, Wherein Specific CAP-BWs May Share a SFI Field and/or a Bit-Field Value Indicating the ON/OFF State In FIG. 11, the entirety or part of N1/N2/N3/N4 may be set to the same value. For example, CAP-BW#1-1/#1-2 belong to the same carrier. Accordingly, on the assumption that the BS indicates the same D/U direction for CAP-BW#1-1/#1-2, DCI overhead may be reduced by indicating the D/U direction of CAP-BW#1-1/#1-2 through the same field in the CO-DCI. That is, the D/U direction (e.g., SFI field) may be configured for each carrier. However, since the ON/OFF state of CAP-BW#1-1/#1-2 is also shared, the ON/OFF state may not be indicated for each of the CAP-BWs. Such signaling configuration may implicitly indicate that the BS attempts to perform transmission only when the CAP is successful for both CAP-BW#1-1 and CAP-BW#1-2, which belong to CC#1, and otherwise, it does not transmit the DL burst. In addition, setting the offsets corresponding to CAP-BW#1-1/#1-2 belonging to the same carrier to the same value may mean that RBs corresponding to a guard band present between CAP-BW#1-1/#1-2 are available (e.g., mapped/transmitted) (for, for example, PDCCH, PDSCH and/or CSI-RS transmission) (or may be interpreted as meaning that the guard band is not configured).

Alternatively, a transmission mode related to a transmission method for each CAP-BW of the BS may be separately configured. For example, it may be separately signaled whether the mode is a mode (hereinafter, mode1) in which transmission is performed (in all CAP-BWs) only when the CAP is successful for all CAP-BWs belonging to the carrier/active BWP, or a mode (hereinafter, mode2) in which transmission is attempted for some CAP-BWs when the CAP is successful for the some CAP-BWs among the CAP-BWs belonging to the carrier/active BWP. When mode1 is configured, the BS may assume that the SFI field and the bitmap field are shared (e.g., only 1 bit is configured for the bitmap field corresponding to the cell, and only one SFI field is configured) for all the CAP-BWs belonging to the carrier/active BWP. When mode2 is configured, the BS may assume that a bit field in the bitmap is configured for each CAP-BW belonging to the carrier/active BWP (that is, a bitmap field and an offset value for the SFI field are configured for each CAP-BW).

As another example, as shown in FIG. 12, an offset value of N1 may be set in common for the SFI fields for CAP-BW#1-1/1-2/2-1/3-1. In addition, in the bitmap indicating the ON/OFF state, offset values of N2/N3/N4/N5 may be set for each CAP-BW, or all or some of N2/N3/N4/N5 may be set to the same value. If N2 and N3 are set to the same value, the ON/OFF state for CAP-BW#1-1/#1-2 may also be shared, and thus the ON/OFF state may not be indicated for each of the CAP-BWs. Such signaling configuration may implicitly indicate that the BS attempts to perform transmission only when the CAP is successful for both CAP-BW#1-1 and CAP-BW#1-2, which belong to CC#1, and otherwise, it does not transmit the DL burst. In addition, setting the offsets corresponding to CAP-BW#1-1/#1-2 belonging to the same carrier to the same value may mean that RBs corresponding to a guard band present between CAP-BW#1-1/#1-2 are available (e.g., mapped/transmitted) (for, for example, PDCCH, PDSCH and/or CSI-RS transmission) (or may be interpreted as meaning that the guard band is not configured).

As another example, as shown in FIG. 13, for each CC (or BWP), a common offset N1 (with respect to the SFI field position) may be set, and a bitmap indicating the ON/OFF state may be signaled through a k-bit bitmap after the offset value (or before the offset value, after the end of the field size configured after N1, after the field size configured after N1). Here, k may be equal to the number of CAP-BWs corresponding to the CC (or BWP), and may be less than or equal to the number of CAP-BWs corresponding to the CC (or BWP). When k is less than the CAP-BWs, the value of k may be signaled separately. In addition, when k is less than the CAP-BWs, the relationship between each bit of the k-bit bitmap and the corresponding CAP-BW(s) may be preconfigured by the BS. When k=1, the ON/OFF state for CAP-BW#1-1/#1-2 may also be shared, and thus the ON/OFF state may not be indicated for each CAP-BW. Such signaling configuration may implicitly indicate that the BS attempts to perform transmission only when the CAP is successful for both CAP-BW#1-1 and CAP-BW#1-2, which belong to CC#1, and otherwise, it does not transmit the DL burst. In addition, setting the bit values corresponding to the ON/OFF states of CAP-BW#1-1-/#1-2 belonging to the same carrier to the same position may mean that RBs corresponding to a guard band present between CAP-BW#1-1/#1-2 are available (e.g., mapped/transmitted) (for, for example, PDCCH, PDSCH and/or CSI-RS transmission) (or may be interpreted as meaning that the guard band is not configured).

Alternatively, a transmission mode related to a transmission method for each CAP-BW of the BS may be separately configured. For example, it may be separately signaled whether the mode is a mode (hereinafter, mode1) in which transmission is performed (in all CAP-BWs) only when the CAP is successful for all CAP-BWs belonging to the carrier/active BWP, or a mode (hereinafter, mode2) in which transmission is attempted for some CAP-BWs when the CAP is successful for the some CAP-BWs among the CAP-BWs belonging to the carrier/active BWP. When mode1 is configured, the BS may assume that the bitmap field indicating the ON/OFF state is shared for all CAP-BWs belonging to the carrier/active BWP (that is, only 1 bit is configured for the bitmap field corresponding to the cell). Alternatively, if a bit field in the bitmap is configured for each CAP-BW belonging to the carrier/active BWP when mode1 is configured, the UE may assume that only '1' or '0' is signaled in the bitmap. When mode2 is configured, the BS may assume that a bit field in the bitmap is configured for each CAP-BW belonging to the carrier/active BWP (that is, an offset value for the bitmap field is set for each CAP-BW).

In [Method #2A] and [Method #2-1A], the BS may inform that the corresponding CAP-BW is OFF if 1-bit information corresponding to each CAP-BW(s) is '0' (or '1'), and that the corresponding CAP-BW is ON if the information is '1' (or '0'). When the CAP-BW(s) is in the OFF state, the UL slot/symbol information about the CAP-BW in the ON state belonging to the same carrier/BWP or the same band as the CAP-BW(s) may be passed on to the CAP-BW(s) in the OFF state. As an example, CAP-BW#1-1 may be signaled in the OFF state, but CAP-BW#1-2 may be signaled in the ON state (when ON/OFF information about CAP-BW#1-1 and ON/OFF information about CAP-BW#1-2 are signaled through separate bit-fields and the SFI field is signaled in common). In this case, for example, if all symbols of slot #k/k+1 are signaled as UL for CAP-BW#1-2 through CO-DCI, the BS may inform that CAP-BW#1-1 is also UL for slot #k/k+1. This is because it may be considered impossible to perform reception in an adjacent band while performing transmission in the adjacent band, on the assumption that a BS operating in the unlicensed band generally operates through one RF module. Accordingly, the BS may inform that, during slot #k/k+1, PDCCH monitoring is not performed in either CAP-BW#1-1 or CAP-BW#1-2, and that configured UL transmission (e.g., periodic/semi-persistent PUCCH/SRS, configured grant PUSCH, etc.) is allowed.

Alternatively, even if the CAP-BW(s) is signaled in the OFF state, the BS may recognize that the UL information on the SFI signaling corresponding to the CAP-BW is valid. As an example, when CAP-BW#1-1 is signaled in the OFF state, and all symbols of slot #k/k+1 are signaled as DL and all symbols of slot #k+2/k+3 are signaled as UL for CAT-BW#1-1, the BS may inform that slot #k+2/k+3 is UL, ignoring SFI signaling in slot #k/k+1. In this case, the BS may inform that PDCCH monitoring is not performed in CAP-BW#1-1 during slot #k/k+1/k+2/k+3, and that configured UL transmission (e.g., periodic/semi-persistent PUCCH/SRS, configured grant PUSCH, etc.) is allowed during slot #k+2/k+3.

Alternatively, through a specific state of the SFI field and/or the bitmap field, it may be indicated that the CAP-BW(s) (in the slot in which the CO-DCI is detected) belongs to the first slot of transmission (e.g., DL burst) or belongs to the first k slot(s) in a time duration occupied by the BS. Here, the value of k may be predefined as an integer greater than or equal to 1 or may be set by separate RRC signaling. As a method, when all bits in the bitmap that correspond to all CAP-BW(s) corresponding to a cell in which the CO-DCI is transmitted signal OFF, it may be indicated that the CAP-BW(s) (in the slot in which the CO-DCI is detected) belongs to the first slot (or the first k slots) of the DL burst. It is contradictory that all CAP-BW(s) corresponding to the cell are OFF when the CO-DCI is transmitted from the cell. Accordingly, this transmission may be used for the above-described signaling. That is, through the CO-DCI transmission, it may be indirectly indicated that the CAP-BW is ON. In addition, through the CAP-BW ON/OFF information, it may be indicated that the CAP-BW belongs to the first slot (or the first k slots) of the DL burst. For example, when the CO-DCI is transmitted on CC#1, if all the ON/OFF information in the bitmap corresponding to CAP-BW#1-1 and CAP-BW#1-2 is OFF, it may be indicated that CAP-BW#1-1 and CAP-BW#1-2 (in the slot in which the CO-DCI is detected) belong to the first slot (or the first k slots) of the DL burst.

In addition, the CO-DCI may be transmitted on CC#A, and all the ON/OFF information corresponding to CC#A/B may be included in the CO-DCI (i.e., cross-carrier indication). In this case, since the CAP-BW ON/OFF information for CC#B is transmitted on the other CC (e.g., CC#A), it may be ambiguous whether there is actual transmission by the BS on CC#B. Therefore, if all the CAP-BW(s) for CC#A are OFF, the UE may assume that the DL burst has started even on CC#B (even if transmission is actually performed only on CC#A). On the other hand, if some or all of the CAP-BW(s) for CC#A are later updated to ON, information on CC#B may be recognized as a real OFF only when all the CAP-BW ON/OFF information for CC#B is OFF. For example, CO-DCI may be transmitted on CC#1, and all ON/OFF information corresponding to CC#1/2/3 may be included in the CO-DCI. In this case, the BS transmitting CO-DCI in which all ON/OFF information on the bitmap corresponding to CAP-BW#1-1/CAP-BW #1-2/CAP-BW#2-1/CAP-BW#3-1 is OFF may inform the UE that CC#2 and CC#3 as well as CC#1 (in the slot in which the CO-DCI is detected) belong to the first slot (or the first k slots) of the DL burst. Also, CO-DCI may be transmitted on CC#2, and all ON/OFF information corresponding to CC#1/2/3 may be included in the CO-DCI. In this case, the BS transmitting, on CC#2, the CO-DCI including bitmap information corresponding to CAP-BW#1-1=OFF, CAP-BW#1-2=OFF, CAP-BW#2-1=ON, and CAP-BW#3-1=OFF may inform the UE that any of CAP-BW#1-1 and CAP-BW#1-2 belonging to CC#1 does not belong to the first slot (or the first k slots) of the DL burst because CC#2 does not belong to the first slot (or the first k slots) of the DL burst (in the slot in which the CO-DCI is detected). Accordingly, the UE may recognize that actual DL reception is not available in CAP-BW#1-1 and CAP-BW#1-2.

As an example, when the SFI field is configured in 3 bits and is set to '111', it may indicate that the CAP-BW corresponding to the SFI field (in the slot in which the CO-DCI is detected) belongs to the first slot (or the first k slots) of the DL burst. As another example, when SlotFormatCombination is not linked to a specific state (e.g., SFI-index) of the SFI field, the state may be utilized. The SFI field size may be determined by the set maximum number of SFI-indexes. When the SFI field size is 3 bits, SlotFormatCombination may not be configured for some of the 8 SFI-indexes. In this case, when the value of SFI-index for which SlotFormatCombination is not configured is signaled, the BS may inform that the CAP-BW(s) belongs to the first slot (or the first k slots) of the DL burst (in the slot in which the CO-DCI is detected). Then, the UE may assume DL (for all cells configured in the unlicensed band or a part thereof) during the first slot (or the first k slots) of the DL burst. That is, in the slot(s) in which the CAP-BW(s) is recognized as belonging to the first slot (or the first k slots) of the DL burst, all symbols may be assumed to be DL. Accordingly, the UE may perform PDCCH monitoring on the assumption that all symbols in the slot(s) are DL in the CAP-BW(s). In this method, in order to update the slot format of the CAP-BW(s), the BS may transmit DCI format 2_0 again within the same DL burst. For example, upon receiving SFI=111, the UE may recognize only that the CAP-BW(s) is the start of the DL burst, and identify the slot format (e.g., D/U/F) in the DL burst/COT based on the updated SFI information, while monitoring the PDCCH as in the case where the CAP-BW(s) is outside the DL burst.

In addition, the DL burst or the channel occupancy of the BS may be divided into two time durations (for all cells configured in the unlicensed band or a part thereof), and a search space set (or PDCCH) may be independently configured for each of the durations. For example, duration 1 may be defined as a duration within the first k slots in the DL burst or the channel occupancy of the BS (for all cells configured in the unlicensed band or a part thereof), and duration 2 may be defined as a duration after the first k slots in the DL burst or the channel occupancy of the BS (for all cells configured in the unlicensed band or a part thereof). Here, k may be predefined as an integer greater than or equal to 1 or may be set by separate RRC signaling. Specifically, when it is signaled/recognized that the CAP-BW(s) belongs to the first slot (or the first k slots) of the DL burst (in the slot in which the CO-DCI is detected), the BS may transmit a PDCCH through a specific first search space set for the corresponding duration (e.g., duration 1) (for all cells configured in the unlicensed band or a part thereof), or may transmit a specific first PDCCH for the corresponding duration (e.g., duration 1). Alternatively, since it is uncertain whether CSI-RS is transmitted in the CAP-BW for the corresponding duration (e.g., duration 1), the BS may not expect, from the UE, a report on CSI measurement (or RRM/RLM measurement) through the CSI-RS that is configured to be transmitted for the corresponding duration (e.g., duration 1). On the other hand, when it is signaled/recognized that the CAP-BW(s) is in the ON state (in the slot in which the CO-DCI is detected), but does not belong to the first slot (or the first k slots) of the DL burst, the BS may transmit a PDCCH belonging to a specific second search space set for the corresponding duration (e.g., duration 2) (for all cells configured in the unlicensed band or a part thereof), or may transmit a specific second PDCCH for the corresponding duration (e.g., duration 2). Alternatively, the BS may not expect, from the UE, a report on CSI measurement (or RRM/RLM measurement) through a CSI-RS that is configured to be transmitted for the corresponding duration (e.g., duration 2). Here, the specific first and second search space sets may be different from each other. For example, the specific first and second search space sets may have different PDCCH monitoring periodicities. Also, the specific first and second PDCCHs may be different from each other. DCI formats transmitted on the specific first and second PDCCHs may be different from each other.

[Method #3A] Method for Configuring Time Domain DL/UL Direction

The maximum channel occupancy time (MCOT) may be determined according to a priority class corresponding to the CAP performed by the BS (see Table 7), and the BS may set a time less than or equal to the MCOT as a COT duration thereof. In this case, the BS may inform the UE of the COT than or equal to the MCOT as a COT duration. Accordingly, the UE may perform PDCCH monitoring configured outside the COT duration. For example, outside the COT duration, it is not known when the BS will transmit the PDCCH. Accordingly, monitoring may be performed very frequently, but may be performed at a much slower tempo in the COT duration. Such monitoring may be beneficial in terms of power consumption of the UE. In addition, the UE may distinguish between UL in the COT duration or UL outside the COT duration. In the case of UL in the COT duration, it may be determined whether the channel is idle/busy only for a predetermined time period. When the channel is idle, UL transmission may be allowed without random backoff. Alternatively, UL transmission may be allowed after a predetermined time without determining whether the channel is idle/busy. On the other hand, in the case of UL outside the COT duration, UL transmission may be allowed only when a random backoff-based CAP is performed.

[Method #3A-1] Explicitly Signaling COT Duration in CO-DCI

In the CO-DCI, the COT start slot index, and/or the COT last slot index, and/or the COT duration from a specific slot may be signaled through a separate field. The field may be configured for each CAP-BW, for each carrier/active BWP, or for a group of CAP-BWs, a group of carriers/active BWPs, or an unlicensed band in common.

There may be a difference between a duration in which SFI information is applied and the COT duration. For example, while the period for monitoring the CO-DCI is set to 4 slots, the COT information in the CO-DCI may indicate that the COT duration is 1 slot. In this case, the SFI information should include information about at least 4 slots, and how the UE should interpret the SFI information indicated for the remaining 3 slots may be a challenge.

For example, when the SFI information of the SFI field corresponds to k slots and the time at which CO-DCI is received is slot #n, DL/UL information corresponding to slot #n to slot #n+k−1 may be signaled through the SFI information. In this case, the last slot index indicated by the field indicating the COT duration may be after slot #n+k−1. In this case, the SFI information may be applied for the DL/UL information corresponding to slot #n to slot #n+k−1, but an assumption may be required for DL/UL information after slot #n+k−1. Hereinafter, a method assumed by the UE is discussed.

Opt 1) By applying the wrap-around scheme, a rule may be set such that SFI information corresponding to slot #n+k corresponds to slot #n, and SFI information corresponding to slot #n+k+1 corresponds to slot #n+1.

Opt 2) A rule may be set such that SFI in slot #n+k−1 (or corresponding to the last symbol of slot #n+k−1) is repeated after slot #n+k−1.

Opt 3) A rule may be set such that specific SFI (e.g., all DL or all UL) is repeated after slot #n+k−1.

Opt 4) A rule may be set such that the UE does not expect the aforementioned case. Alternatively, the UE may expect to receive DL/UL information in the corresponding duration through reception of additional CO-DCI, and may apply one of Opt1 to Opt3 if it fails to receive the information.

[Method #3A-2] Implicitly Signaling the COT Duration Through a Combination of Specific SFIs in the CO-DCI SFI information for slot #k may be duplicated/transmitted in slot #n and slot #m. Here, when SFI information corresponding to slot #k signaled in slot #n is A, and SFI information corresponding to slot #k signaled in slot #m is B, slot #k may be defined as the last slot of the COT occupied by the BS. As an example, A may be all DL and B may be all UL.

SFI information after the last slot index of the COT recognized through [Method #3-1] and/or [Method #3-2] may be present. As an example, the SFI information for CAP-BW#1-1 of CO-DCI received in slot #n may span up to slot #n+k, but the last slot index of the COT indicated by the CO-DCI may be slot #n+k−2. In this regard, a method for processing the SFI information for slot #n+k−1 and slot #n+k is proposed.

Op tA) SFI information for slot #n+k−1 and slot #n+k may be ignored. For example, even when the UE receives the SFI information for slot #n+k−1 and slot #n+k, it may operate as if it did not receive the SFI information for slot #n+k−1 and slot #n+k. Accordingly, communication may be performed based on the SFI information only within the COT duration.

Opt B) Only UL information in the SFI information for slots #n+k−1 and #n+k may be considered valid. Accordingly, the UE may not perform PDCCH monitoring for the corresponding UL duration, and may recognize the duration as a UL duration outside the COT duration. That is, during slot #n+k−1 and slot #n+k, the UE may not perform PDCCH monitoring, and may recognize the UL duration of slots #n+k−1 and #n+k as a UL duration outside the COT duration.

OptC) The UE may not expect such a case to occur.

[Method #4A]

In transmitting CO-DCI, a group of carrier/active BWPs and/or CAP-BWs may be configured. A rule may be set such that all the SFI information and ON/OFF information about the carrier/active BWPs and/or CAP-BWs belonging to the configured group are included in the CO-DCI, and the CO-DCI is transmitted over all the carriers/active BWPs and/or CAP-BWs belonging to the configured group.

[Method #5A]

Hereinafter, a description will be given of a method of determining how long information on all or some RB sets of serving cell (index) #n, which is indicated to be available by DCI format 2_0 received in slot #t, is valid when DCI format 2_0 is monitored on serving cell (index) #m (where m and n may be the same or different). Here, for serving cell (index) #n, the RB set indicator field (and/or search space set switching field) is configured, but the SFI field and channel occupancy duration field are not configured. In the present disclosure, a CAP-BW may have the same meaning as an RB set. The RB set may be configured on a carrier by RRC signaling, and if not configured, the RB set may be determined as a predefined value depending on the frequency domain of the carrier.

Specifically, the BS may be allowed to transmit DCI format 2_0 only when the information is valid for a predetermined or predefined time duration (e.g., X slots (where X is 1 or 2), the periodicity of a search space set associated with DCI format 2_0, a duration of P symbols for which search space group switching is performed) from a reference time point in slot #t in which DCI format 2_0 is received (e.g., the ending boundary of slot #t, the starting boundary of slot #t, the starting boundary of slot #(t+1), the boundary of a first/last symbol of received DCI format 2_0, or the boundary of a first/last symbol of a CORESET to which received DCI format 2_0 belongs).

In the NR-U system, the RB set indicator (or available RB set indicator) and the channel occupancy duration field (or COT duration indicator) are introduced in DCI format 2_0 as shown in Tables 9 to 11 above. Each of the three fields may be configured independently. Herein, a method for determining the validity of an RB set according to whether the three fields are configured is proposed. When the validity of RB set(s) indicated to be available is determined as in Tables 10 and 11, if the channel occupancy duration field is configured, the RB set(s) may be determined valid for a duration indicated by the channel occupancy duration field. If the channel occupancy duration field is not configured, the RB set(s) may be determined valid for a duration corresponding to an indicated SFI index (for example, if the indicated SFI index, SFI index #y contains SFI information on y1 slots, the corresponding duration is the y1 slots). However, a method for determining the validity of RB set(s) when the RB set indicator is configured but neither the channel occupancy duration field nor the SFI field is configured has not been defined yet.

According to the proposed method, for example, four RB sets and the RB set indicator (i.e., 4-bit bitmap) may be configured for serving cell (index) #1, but both the channel occupancy duration field and the SFI field may not be configured. In this case, information on serving cell (index) #1 may be transmitted in DCI format 2_0 associated with a specific search space set configured on serving cell (index) #1. The BS may transmit DCI format 2_0 on a monitoring occasion designated for the corresponding search space set. When the RB set indicator indicates '1100' (that is, the first and second RB sets in serving cell (index) #1 are valid), the BS may be allowed to transmit DCI format 2_0 only if information on the availability of the RB sets is valid for predetermined/predefined Z slots/symbols (the periodicity configured for a search space set associated with corresponding DCI format 2_0; the value of P when search space group switching is configured as shown in Table 12; or the minimum/maximum of the periodicity configured for the search space set associated with corresponding DCI format 2_0 and the value of P) from slot #n (the last symbol of DCI format 2_0 received in slot #n, the starting/ending boundary of slot #n, or the starting/ending boundary of slot #(n+1)). If the timeline after applying the configured/defined Z slots/symbols is not aligned with the slot boundary, the UE may determine that the RB set information is valid to the nearest slot boundary after applying the configured/defined Z slots/symbols. If the RB set information is valid, it may mean that the UE needs to receive a DL signal such as a PDCCH and/or a CSI-RS that is confined in the first and second RB sets in serving cell (index) #1. Alternatively, it may mean that when the UE transmits a UL signal scheduled or configured within a valid period (allocated to the frequency domain of the RB set indicated to be available) on the available RB sets (e.g., the first and second RB sets in serving cell (index) #1), the UE may perform the Type 2 CAP.

Whether the method is applied may be configured by additional higher layer signaling (e.g., RRC signaling).

[Method #6A]

Hereinafter, it will be described which RB set(s) belonging to serving cell (index) #n the UE is capable of recognizing as available RB set(s) based on DCI format 2_0 received in slot #t when the UE monitors DCI format 2_0 on serving cell (index) #m (where m and n may be the same or different). Here, for serving cell (index) #n, the RB set indicator field (or availableRB-SetPerCell-r16) is not configured, but at least one of the SFI field and the channel occupancy duration field is configured.

Specifically, Opt 1) it may be preconfigured/predefined that specific RB set(s) (index(s)) are available. Alternatively, Opt 2) when the number of RB sets belonging to serving cell (index) #n (or active BWP in the cell) is 1 or when multiple RB sets are configured, the above-described configuration may be allowed (i.e., the RB set indicator field or availableRB-SetPerCell-r16 may not be configured) only if the number of RBs corresponding to a frequency-domain guard band between the corresponding RB sets is 0. When the UE determines the validity of RB set(s) determined to be available according to Opt 1 or Opt 2, the UE may determine that the RB set(s) are valid for a duration indicated by the channel occupancy duration field if the channel occupancy duration field is configured. If the channel occupancy duration field is not configured, the UE may determine that the RB set(s) are valid for a duration corresponding to an indicated SFI index (see Tables 10 and 11).

In Opt 1, a specific RB set (index) may be predefined as a k-th (e.g., k=1) RB set in serving cell (index) #n, and specific RB set(s) (index(s)) may be configured by higher layer signaling such as RRC signaling. Only when the specific RB set(s) in serving cell (index) #n are available (or when the CAP is successful for the corresponding RB set(s)), the BS may be allowed to transmit DCI format 2_0 including information indicating that the RB set(s) in the corresponding serving cell are available. In particular, Opt 1 may be (limitedly) applied when serving cell (index) #n corresponding to RB set information and serving cell (index) #m in which DCI format 2_0 is transmitted have different cell indices.

In Opt 2), when the number of RB sets belonging to serving cell (index) #n (or active BWP within the cell) is 1, or when the number of RBs corresponding to the frequency-domain guard band between the corresponding RB sets is 0 even if multiple RB sets are configured, the corresponding configuration may be allowed (i.e., the RB set indicator field or availableRB-SetPerCell-r16 may not be configured). Alternatively, only when Mode 1 described above is configured, the corresponding configuration may be allowed (i.e., the RB set indicator field or availableRB-SetPerCell-r16 may not be configured).

In the proposed methods, if Mode 1 is configured, it may mean that the number of RBs corresponding to a frequency-domain guard band between corresponding RB sets is set to 0 even though a plurality of RB sets are configured for a specific serving cell. Alternatively, if Mode 1 is configured, it may mean that RRC signaling corresponding to a specific state that there is no intra-carrier guard band is configured for a corresponding serving cell. In particular, Opt 2) may be (limitedly) applied when serving cell (index) #n corresponding to RB set information and serving cell (index) #m in which DCI format 2_0 is transmitted have the same cell index. That is, when RB set(s) in serving cell (index) #n are available, the BS may notify the availability by transmitting corresponding DCI format 2_0.

In Opt 1 or Opt 2, the unavailability of a specific RB set may need to be signaled. For example, if the value corresponding to the channel occupancy duration field is less than or equal to a specific value (e.g., the channel occupancy duration is zero symbols), or if the value of slotFormatCombinationId corresponding to the SFI index is not configured, it may mean that all RB set(s) belonging to corresponding serving cell index #n are unavailable. If all RB set(s) belonging to corresponding serving cell index #n are unavailable, it may mean that the UE does not need to receive a DL signal such as a PDCCH and/or a CSI-RS in serving cell index #n. Alternatively, if all RB set(s) belonging to corresponding serving cell index #n are unavailable, it may mean that the UE is incapable of performing the Type 2 CAP when the UE transmits a UL signal scheduled or configured within a duration where corresponding RB set information is valid (allocated to the frequency domain in a specific RB set indicated to be available).

[Method #7A]

Hereinafter, it will be described which RB set(s) belonging to serving cell (index) #n the UE is capable of recognizing as available RB set(s) based on DCI format 2_0 received in slot #t when the UE monitors DCI format 2_0 on serving cell (index) #m (where m and n may be the same or different). Here, for serving cell (index) #n, all of the RB set indicator field, SFI field, and channel occupancy duration field are not configured. In addition, there is proposed a method of determining how long information on all or some RB sets of serving cell (index) #n, which is indicated to be available by DCI format 2_0 received in slot #t, is valid.

Specifically, which RB set(s) belonging to serving cell (index) #n the UE is capable of recognizing as available RB set(s) based on DCI format 2_0 received in slot #t may be determined by [Method #6A].

In addition, how long information on all or some RB sets of serving cell (index) #n that is indicated to be available by DCI format 2_0 (which is determined by [Method #6A]) may be determined by [Method #5A].

[Method #8A]

Hereinafter, a description will be given of a method of configuring an RB set for a DL/UL carrier (or BWP) when Mode 1 is configured (as described above) and the bandwidth corresponding to one carrier (or BWP) includes a plurality of CAP-BWs.

Opt 1: One RB set is configured for a DL carrier (or BWP), and one RB set is configured for a UL carrier (or BWP)

Opt 2: One RB set is configured for a DL carrier (or BWP), and as many RB sets as the number of CAP-BWs are configured for a UL carrier (or BWP)

Opt 3: One RB set is configured for a DL carrier (or BWP), and only one RB set is configured for each channel/signal for a UL carrier (or BWP) (e.g., for a PUSCH, an SRS, etc.). Alternatively, as many RB sets as the number of CAP-BWs are configured (e.g., for a PUCCH, a PRACH, etc.).

In the proposed methods, a CAP-BW means a unit for performing the CAP on an unlicensed band (unlicensed spectrum or shared spectrum), which may have a bandwidth less than or equal to one carrier. The CAP-BW may be defined in regulations for coexistence with other RATs (e.g., Wi-Fi). In general, the CAP-BW may have a bandwidth of 20 MHz. For example, when Mode 1 is configured and the bandwidth corresponding to one carrier (or BWP) is 40 MHz (i.e., when two CAP-BWs are included), one RB set may be configured for each DL/UL carrier (or BWP) in the case of Opt 1. In the case of Opt 2, one RB set may be configured for a DL carrier (or BWP) and two RB sets may be configured for a UL carrier (or BWP). In the case of Opt 3, one RB set may be configured for a DL carrier (or BWP). In addition, for a UL carrier (or BWP), one RB set may be configured for PUSCH allocation, and two RB sets may be configured for PUCCH allocation.

Opt 1 to Opt 3 proposed above may be applied in different ways depending to which cell the options are applied.

Alt 1: Opt 1 (Opt 2 or Opt 3) is applied to any serving cell.

Alt 2: Opt 2 is applied to a PCell (PSCell or PUCCH-SCell), and Opt 1 is applied to an SCell (SCell in which no PUCCH is configured)

Alt 3: Opt 3 is applied to a PCell (PSCell or PUCCH-SCell), and Opt 1 is applied to an SCell (SCell in which no PUCCH is configured)

In particular, if a PUCCH (and/or PRACH) is configured to be transmitted over a plurality of CAP-BWs, channel transmission may not be attempted even if one CAP-BW is busy. Therefore, to increase the transmission probability of a corresponding channel, the channel transmission may be limited to one CAP-BW. Accordingly, when PUCCH resources are configured as shown in Table 13, a specific RB set index may be allocated. In addition, if as many RB sets as the number of CAP-BWs are configured for a UL carrier (or BWP) composed of a plurality of CAP-BWs as in Alt 2 or Alt 3, it has the advantage of maintaining a configuration that confines each PUCCH (and/or PRACH) to an RB set corresponding to one CAP-BW. In the case of the PUCCH, this may be applied only when interlace-based transmission is configured by an RRC parameter such as useInterlace-PUCCH-PUSCH-r16.

Similarly, if Alt 2 (or Alt 3) is applied to a PUSCH, resources may be allocated for each RB set index (as shown in Tables 15 and 16 below). In particular, in the case of the PUSCH, this may be applied only when interlace-based transmission is configured by the RRC parameter such as useInterlacePUCCH-PUSCH-r16. Alternatively, if Alt 2 (or Alt 3) is applied to the PUSCH, the UE may expect that even though a plurality of RB sets are configured, actual PUSCH resource allocation corresponds to all RB sets in a corresponding UL BWP (for example, only a value corresponding to an RIV for allocating all RB set indices in Tables 15 and 16 is allocated).

In the proposed methods, if Mode 1 is configured, it may mean that no intra-cell guard band is allocated for one serving cell (carrier or BWP) (as shown in Table 14 above). That is, the configurations of intraCellGuardBandDL-r16 and intraCellGuardBandUL-r16 may indicate to the UE that no intra-cell guard band is configured, which may mean Opt A or Opt B below.

Opt A: It may mean that even if a plurality of RB sets are configured for a corresponding serving cell (carrier or BWP), the number of RBs corresponding to a frequency-domain guard band between the corresponding RB sets is set to 0.

Opt B: It may mean that RRC signaling corresponding to a specific state that there is no intra-carrier guard band is configured for a corresponding serving cell (carrier or BWP).

Additionally, when a plurality of RB sets are configured as in Opt 2 and/or Opt 3, it is necessary to clearly define the boundary between the RB sets.

When the configuration of a guard band includes the starting (common) RB index and size of the guard band as in Opt A, if the size is set to 0, the UE may determine the boundaries of RB sets from each starting (common) RB index. For example, when a UL BWP with a bandwidth of 40 MHz is configured and the UL BWP consists of a total of 106 PRBs, if the starting (common) RB index of a guard band is the 53rd index and if the size is 0, the UE may recognize that first to 52nd RBs in the UL BWP belong to RB set 0 and 53rd to 106th RBs belong to RB set 1.

Alternatively, when RRC signaling corresponding to a specific state that there is no intra-cell guard band is configured as in Opt B, the UE may determine the boundaries of RB sets by dividing a corresponding UL carrier (or BWP) into equal (or almost equal) parts by the number of CAP-BWs. For example, when a UL BWP with a bandwidth of 40 MHz is configured and the UL BWP consists of a total of 106 PRBs, the UL BWP includes two CAP-BWs. Accordingly, the UE may divide 106 PRBs into two sets such that first to 53rd RBs in the UL BWP belong to RB set 0 and 54th to 106th RBs belong to RB set 1. In general, when a UL carrier (or BWP) composed of K RBs includes N CAP-BWs, the first RB index (where indexing starts from 0) of an n-th (where n=1, 2, . . . , N) RB set may be obtained from ceiling $\{(*(n-1)/N\}$ or floor $\{K*(n-1)/N\}$. In this case, ceiling $\{x\}$ may mean the smallest natural number greater than or equal to x, and floor $\{x\}$ may mean the largest natural number smaller than or equal to x.

Alternatively, when a plurality of RB sets are capable of being configured as in Opt 2 and/or Opt 3, it may be configured that for a DL carrier (or BWP), no intra-cell guard band is allocated as in Opt B, or it may be configured that for a UL carrier (or BWP), no intra-cell guard band is allocated as in Opt A.

In addition, if one RB set is configured for a DL carrier (or BWP) in Opt 1 to Opt 3, it may mean that the RB set indicator field corresponding to the corresponding DL carrier (or BWP) is one bit.

[Method #9A]

Hereinafter, a description will be given of a signaling method that allocates no intra-cell guard band for one serving cell (carrier or BWP), and a CAP method for the corresponding serving cell (carrier or BWP) will be described.

When a GB is configured for a DL carrier or a UL carrier as shown in Table 17, k entries each consisting of {starting common RB (CRB) index, GB size} may be signaled from higher layers. The UE may derive the starting and ending CRB indices corresponding to (k+1) RB sets from a combination of the k entries and the starting and ending CRB indices of the corresponding DL carrier or UL carrier.

For example, referring to FIG. 15, GB configuration related information may include three entries for an 80 MHz carrier consisting of a total of 217 RBs (with an SCS of 30 kHz), and the UE may receive the GB configuration related information through RRC signaling.

Assuming that Table 17 is applied to FIG. 15, when the first CRB index of a carrier is N, the following may be derived from GB configuration related information received through RRC signaling: RB set 0 includes CRB indices N to (N+49), RB set 1 includes CRB indices (N+56) to (N+105), RB set 2 includes CRB indices (N+111) to (N+160), and RB set 3 includes CRB indices (N+167) to (N+216). In this case, if the size of a specific GB in the carrier is set to 0, the GB between RB sets may be set to be 0 RBs. To this end, the following options may be applied.

Opt 1: If the size of at least one GB between RB sets in a DL carrier or UL carrier is set to 0, only signaling that the GB size between all RB sets is set to 0 may be allowed.

Opt 2: If the size of at least one GB between RB sets in a DL BWP or UL BWP is set to 0, only signaling that the GB size between all RB sets is set to 0 may be allowed. In addition, if the size of even one GB between the RB sets in the DL BWP or UL BWP is set to be greater than 0, only signaling that the GB size between all RB sets is set to be greater than 0 may be allowed.

Opt 3: It may be allowed that among GB sizes between RB sets in a DL BWP or UL BWP, some are set to 0 and others are set to a value greater than 0.

Referring to FIG. 16, if the GB size for at least one entry for a DL carrier or UL carrier is indicated as 0 in Opt 1, signaling may be restricted such that the GB size for all entries corresponding to the DL carrier or UL carrier is set to 0. In this case, the BWP configuration may be configured to accurately include one or more RB sets as shown in Table 17, or restrictions may be applied to the BWP configuration so that only a BWP with the same band as the carrier is always configured.

For example, referring to FIG. 16, when a band consisting of RB sets 0/1/2/3 is operating as a UL active BWP, and when the UE performs UL transmission in some of the RB sets, the UL transmission may be allowed only if the CAP is successful for all RB sets. In other words, when the UE performs UL transmission in some of the corresponding RB sets, if the CAP fails for at least one RB set among all RB sets, the UL transmission may not be allowed. For example, when PUSCH transmission in slot #m is scheduled for RB set 0 and RB set 1, only if the CAP is successful for all RB sets 0/1/2/3, the PUSCH transmission scheduled in slot #m may be allowed.

Referring to FIG. 17, it may be allowed that the GB size for some entries for a DL carrier or UL carrier is set to 0 and the GB size of some other entries is set to a value greater than 0 in Opt 2. However, when a BWP is configured for the corresponding DL carrier or UL carrier, signaling may be restricted such that the GB size for all entries for the corresponding DL BWP or UL BWP is 0 or the GB size for all entries is greater than 0. For example, referring to FIG. 17, if a specific DL BWP or UL BWP includes either RB set 0 or RB set 1, only signaling that both RB set 0 and RB set 1 are configured to be included in the corresponding BWP may be allowed. That is, a configuration in which all RB sets 0/1 are included in the BWP may be allowed, and a configuration in which at least one of RB set 2 and RB set 3 is included in the BWP may be allowed. On the other hand, a configuration in which only RB set 0 is included in the BWP or a configuration in which RB sets 0/1 and RB set 2 (or RB set 3) are included together in the BWP may not be allowed. For example, referring to FIG. 17, a BWP configuration consisting of only RB sets 1/2/3 may not be allowed.

When a band consisting of RB sets 0/1 is operating as a DL active BWP, and when the BS performs DL transmission in some of the RB sets, the DL transmission may be allowed only if the CAP is successful for all RB sets. In other words, when the BS performs DL transmission in some of the corresponding RB sets, if the BS fails the CAP for at least one RB set among all RB sets, the DL transmission may not be allowed. For example, when PDSCH transmission in slot #m is scheduled for RB set 0, only if the CAP is successful for all RB sets 0/1, the PDSCH transmission scheduled in slot #m may be allowed.

Referring to FIG. 17, a band of 80 MHz may be operating as a DL active BWP in Opt 3. In this case, GB RRC signaling may indicate that the GB size for the first entry is 0 and the GB size for the remaining entries is greater than 0. When the BS performs DL transmission in some of the both RB sets located at both ends of the GB set to 0, the DL transmission may be allowed only if the CAP is successful for the both RB sets. In other words, when the BS performs DL transmission in some of the both RB sets of the GB set to 0, if the CAP fails for at least one RB set of the both RB sets, the DL transmission may not be allowed. As an example, when PDSCH transmission in slot #m is scheduled for RB set 0, only if the CAP is successful for all RB sets 0/1, the PDSCH transmission scheduled in slot #m may be allowed. As another example, when PDSCH transmission in slot #m is scheduled for RB sets 1/2/3, only if the CAP is successful for all RB sets 0/1/2/3, the PDSCH transmission scheduled in slot #m may be allowed. As a further example, when PDSCH transmission in slot #m is scheduled for RB set 3, only if the CAP is successful for RB set 3, the PDSCH transmission scheduled in slot #m may be allowed.

In addition, when Opts 1/2/3 are applied, the number of RBs corresponding to an interlace index configured as a PUCCH resource in any RB set may be 12 (or more). However, the interlace-based PUCCH resource defined in the NR-U system may include only 11 RBs or 10 RBs. Therefore, a rule for determining resource(s) used for actual PUCCH transmission among the 12 (or more) RBs may be required. Specifically, for interlace-based PUCCH formats 0/1/2, if the number of RBs corresponding to an interlace index in an indicated RB set is 12 or more, a PUCCH resource may consist of 11 RBs having the lowest (or highest) PRB indices. In addition, for interlace-based PUCCH format 3, if the number of RBs corresponding to an interlace index in an indicated RB set is 12 or more, a PUCCH resource may consist of 10 RBs with the lowest (or highest) PRB indices.

Alternatively, when Opts 1/2/3 are applied, restrictions may be applied to signaling of the starting CRB index (and GB size) for each RB set such that the number of RBs corresponding to an interlace index configured as a PUCCH resource in any RB set does not exceed 12 (or more). In other words, when the UE derives RB set resources based on GB-related RRC signaling, the UE may expect that a PUCCH resource corresponding to any RB set does not include more than 12 RBs.

When Opts 1/2/3 are applied, a GB corresponding to the boundary of one (DL or UL) BWP may not be allowed to have a size of 0. In other words, in the example of FIG. 17, if a BWP consists of RB sets 1/2/3, a BWP configuration consisting of only RB sets 1/2/3 may not be allowed because the size of a GB between RB set 0 and RB set 1, which is one of the boundaries of the BWP, is set to 0. As another example, in the example of FIG. 17, if a BWP consists of RB sets 1/2, a BWP configuration consisting of only RB sets 1/2 may not be allowed because the size of a GB between RB set 0 and RB set 1, which is one of the boundaries of the BWP, is set to 0. As a further example, in the example of FIG. 17, if a BWP consists of RB sets 0/1, a BWP configuration consisting of only RB sets 0/1 may not be allowed because the size of a GB between RB set 1 and RB set 2, which is one of the boundaries of the BWP, is set to be greater than 0.

[Method #10A]

When monitoring of DCI format 2_0 is configured, the following four fields may be configured for NR-U cells (for each cell).

SFI field
Channel occupancy duration field
RB set indicator field
Search space set switching field When monitoring of DCI format 2_0 including the channel occupancy duration field is configured without the SFI field, the following operations: DL reception and UL transmission within the remaining COT duration indicated by the channel occupancy duration field may be unclear. In the existing NR operation, for reception of a DL signal/channel (e.g., SPS PDSCH, periodic CSI-RS, semi-persistent CSI-RS, etc.) configured by higher layer signaling (e.g., RRC signaling), if DCI format 2_0 is configured, the DL signal/channel reception is allowed only when DL is indicated by corresponding DCI format 2_0. However, when monitoring of DCI format 2_0 including the channel occupancy duration field is configured without the SFI field, whether reception of a DL signal/channel configured by higher layer signaling is allowed may be unclear.

As one method, whether reception of DL signals/channels configured by higher layer signaling and transmission of UL signals/channels configured by higher layer signaling are allowed within the remaining COT duration indicated by DCI format 2_0 may be determined in the same way as when DCI format 2_0 is not configured. That is, if a UL signal/channel is indicated by a PDCCH or UL is not configured by RRC signaling for all or some symbols of DL signals/channels configured to be received by higher layer signaling, the BS may expect that the UE will receive the corresponding DL signals/channels within the remaining COT duration. In addition, if a DL signal/channel is indicated by a PDCCH or DL is not configured by RRC signaling for all or some symbols of UL signals/channels configured to be transmitted by higher layer signaling, the BS may expect that the UE will transmit the corresponding UL signals/channels within the remaining COT duration. However, it may be difficult for the BS to always guarantee the resources of the corresponding DL signals/channels or UL signals/channels within the COT duration. In addition, the BS may need to transmit a PDCCH for scheduling related resources to cancel transmission and reception of the corresponding signals/channels.

To solve the above problem, whether the UE needs to receive DL signals/channels, which are configured to be transmitted from the BS by higher layer signaling, within the remaining COT duration may be explicitly signaled by the BS in DCI format 2_0. Specifically, the BS may provide the explicit signaling through an additional 1-bit field of DCI format 2_0. For example, if the additional 1-bit field value is '1' (or '0'), the BS may expect that the UE will receive DL signals/channels configured to be received by higher layer signaling within the remaining COT duration indicated by the channel occupancy duration field. On the other hand, if the additional 1-bit field value is '0' (or '1'), the BS may expect that the UE will not receive DL signals/channels configured to be received by higher layer signaling within the remaining COT duration indicated by the channel occupancy duration field.

In addition, whether the UE needs to transmit UL signals/channels (e.g., configured grant PUSCH, periodic SRS, semi-persistent SRS, etc.) configured to be transmitted by higher layer signaling within the remaining COT duration may be explicitly signaled by the BS in DCI format 2_0. Specifically, the BS may provide the explicit signaling through the additional 1-bit field of DCI format 2_0. For example, when the additional 1-bit field value is '1' (or '0'), the BS may expect that the UE will transmit UL signals/channels configured to be transmitted by higher layer signaling within the remaining COT duration indicated by the channel occupancy duration field (if the CAP is successful). On the other hand, when the additional 1-bit field value is '0' (or '1'), the BS may expect that the UE will not transmit UL signals/channels configured to be transmitted by higher layer signaling within the remaining COT duration indicated by the channel occupancy duration field Alternatively, whether the UE needs to receive and transmit DL signals/channels configured to be received by higher layer signaling and UL signals/channels configured to be transmitted by higher layer signaling within the remaining COT duration may be signaled explicitly and simultaneously by the BS through the additional 1-bit field of DCI format 2_0. Specifically, if the additional 1-bit field value is '1' (or '0'), the BS may expect that the UE will transmit/receive DL and UL signals/channels configured by higher layer signaling within the remaining COT duration indicated by the channel occupancy duration field. On the other hand, if the additional 1-bit field value is '0' (or '1'), the BS may expect that the UE will not transmit/receive DL and UL signals/channels configured by higher layer signaling within the remaining COT duration indicated by the channel occupancy duration field.

[Method #11A]

When monitoring of DCI format 2_0 is configured, the following four fields may be configured for NR-U cells (for each cell).

SFI field

Channel occupancy duration field

RB set indicator field

Search space set switching field

When monitoring of DCI format 2_0 including the RB set indicator field and/or the search set spatial set switching field is configured without the SFI field and the channel occupancy duration field, it may be difficult to determine the remaining COT duration, and the following operations: DL reception and UL transmission within the remaining COT duration may be unclear. In this case, the remaining COT duration may be determined according to [Method #5] proposed above. Alternatively, when FBE is configured (that is, when the higher layer (e.g., RRC) parameter ChannelAccessMode-r16 is semi-statically configured), the remaining COT duration may be defined by the maximum COT, $T_y=0.95T_x$. In this case, $T_x$ denotes a period (in units of msec), and the period is configured by a higher layer parameter, which may be set to one of $\{1, 2, 2.5, 4, 5, 10\}$ msec. That is, the maximum COT may be from the starting time of every period to $T_y$. Specifically, the remaining COT duration may be defined from a slot in which DCI format 2_0 is found to $T_y$.

As one method, whether reception and transmission of DL signals/channels configured to be received by higher layer signaling and UL signals/channels configured to be transmitted by higher layer signaling are allowed within the remaining COT duration, which is determined/defined as above, may be determined in the same way as when DCI format 2_0 is not configured in conventional NR. That is, if a UL signal/channel is indicated by a PDCCH or UL is not configured by RRC signaling for all or some symbols of DL signals/channels configured to be received by higher layer signaling, the BS may expect that the UE will receive the corresponding DL signals/channels within the remaining COT duration. In addition, if a DL signal/channel is indicated by a PDCCH or DL is not configured by RRC signaling for all or some symbols of UL signals/channels configured to be transmitted by higher layer signaling, the BS may expect that the UE will transmit the corresponding UL signals/channels within the remaining COT duration. However, it may be difficult for the BS to always guarantee the resources of the corresponding DL signals/channels or UL signals/channels within the COT duration. In addition, the BS may need to transmit a PDCCH for scheduling related resources to cancel transmission and reception of the corresponding signals/channels.

To solve the above problem, whether the UE needs to receive DL signals/channels configured to be received by higher layer signaling (e.g., RRC signaling) within the remaining COT duration may be explicitly signaled by the BS in DCI format 2_0. Specifically, the BS may provide the explicit signaling through the additional 1-bit field of DCI format 2_0. For example, if the additional 1-bit field value is '1' (or '0'), the BS may expect that the UE will receive DL signals/channels configured to be received by higher layer signaling within the remaining COT duration determined/defined as above. On the other hand, if the additional 1-bit field value is '0' (or '1'), the BS may expect that the UE will not receive DL signals/channels configured to be received by higher layer signaling within the remaining COT duration determined/defined as above.

In addition, whether UL signals/channels (e.g., configured grant PUSCH, periodic SRS, semi-persistent SRS, etc.) configured to be transmitted by higher layer signaling (e.g., RRC signaling) are transmitted within the remaining COT duration may be explicitly signaled by the BS in DCI format 2_0. Specifically, the BS may provide the explicit signaling through the additional 1-bit field of DCI format 2_0. For example, when the additional 1-bit field value is '1' (or '0'), the BS may expect that the UE will transmit UL signals/channels configured to be transmitted by higher layer signaling within the remaining COT duration determined/defined as above (if the CAP is successful). On the other hand, when the additional 1-bit field value is '0' (or '1'), the BS may expect that the UE will not transmit UL signals/channels configured to be transmitted by higher layer signaling within the remaining COT duration determined/defined as above.

Alternatively, whether the UE needs to transmit/receive DL signals/channels configured to be received by higher layer signaling and UL signals/channels configured to be transmitted by higher layer signaling within the remaining COT duration may be signaled explicitly and simultaneously by the BS through the additional 1-bit field of DCI format 2_0. Specifically, if the additional 1-bit field value is '1' (or '0'), the BS may expect that the UE will transmit/receive DL and UL signals/channels configured by higher layer signaling within the remaining COT duration determined/defined as above. On the other hand, if the additional 1-bit field value is '0' (or '1'), the BS may expect that the UE will not transmit/receive DL and UL signals/channels configured by higher layer signaling within the remaining COT duration determined/defined as above.

[Method #12A]

When monitoring of DCI format 2_0 is configured, the following four fields may be configured for NR-U cells (for each cell).

SFI field
Channel occupancy duration field
RB set indicator field
Search space set switching field When the UE performs channel measurement, the UE may perform the channel measurement by performing averaging for a plurality of CSI-RSs. Specifically, when a plurality of CSI-RSs are received from the BS, the UE may measure a channel based on the average value of the plurality of CSI-RSs. However, considering that the transmission power for each carrier/BWP/RB set may vary depending on whether the BS succeeds in the CAP for each carrier/BWP/RB set, it may be difficult to accurately measure a channel if the channel is measured based on the average value of CSI-RSs transmitted with different transmission power. For example, assuming that the maximum output power in a 5 GHz band is limited to 23 dBm by regulations, if the BS performs transmission in a 40 MHz band, the output power for each 20 MHz band may be 20 dBm. If the BS performs transmission in a 20 MHz band, the output power for the 20 MHz band may be 23 dBm. In this case, if a channel is measured based on the average value of a CSI-RS transmitted with the 20 dBm power and a CSI-RS transmitted with the 23 dBm power, it may be difficult to accurately measure the channel. Therefore, the UE needs to measure a channel based on CSI-RSs transmitted with the same transmission power to accurately measure the channel. However, since it may be difficult for the UE to know the occupied bandwidth and output power of the BS, the UE may perform averaging only for a plurality of CSI-RSs belonging to one DL transmission burst (or DL burst) in which the same transmission power is maintained. In other words, since it is difficult to expect that the same transmission power will be maintained between different DL transmission bursts, averaging may not be allowed between CSI-RSs belonging to different DL transmission bursts when channel measurement (or CSI measurement) is performed. However, when the SFI field and the channel occupancy duration field are not configured (or when monitoring of DCI format 2_0 is not configured), it may be difficult for the UE to identify different DL transmission bursts in a corresponding cell. Accordingly, the present disclosure proposes methods for solving the above-described problem. In the proposed methods, the channel occupancy duration field may be referred to as a COT indicator field, or the channel occupancy duration field may be referred to as a COT duration field in some embodiment. In addition, each of a plurality of CSI-RSs used for channel measurement may be a periodic CSI-RS or a semi-persistent CSI-RS.

Specifically, according to the proposed methods, when channel measurement (and/or interference measurement) is performed, averaging may not be allowed between CSI-RSs that are determined not to be included in the same DL transmission burst (or determined not to be in a duration where the same power is maintained). That is, when the UE performs channel measurement and/or interference measurement, averaging may not be allowed between CSI-RSs determined to be included in different DL transmission bursts.

In an embodiment, the UE may expect that timeRestrictionForChannelMeasurements (or timeRestrictionForInterferenceMeasurements) is always configured for a corresponding cell. That is, when the SFI field and the channel occupancy duration field are not configured (or when monitoring of DCI format 2_0 is not configured), it may be difficult for the UE to determine the presence of the same DL transmission burst because the UE is incapable of receiving information on the channel occupancy duration. Accordingly, the UE may perform channel measurement (and/or interference measurement) only within a specific slot by assuming that the power of the BS may vary for each slot. The BS needs to maintain the same power for the same CSI-RS resource (or CSI-RS resource set) transmitted at least within the slot.

In another embodiment, when monitoring of DCI format 2_0 is configured, but when the SFI field and the channel occupancy duration field are not configured, the UE may determine that the remaining COT duration determined by the method proposed above is the same DL transmission burst (or determine that the same power is maintained for the remaining COT duration). The BS needs to maintain the same power for the same CSI-RS resource (or CSI-RS resource set) transmitted at least within the remaining COT duration.

In another embodiment, when the SFI field and the channel occupancy duration field are not configured, if a specific RRC parameter (e.g., CSI-RS-ValidationWith-DCI-r16) is configured as shown in Table 19, the UE may determine (or recognize) that only periodic or semi-persistent CSI-RSs that fully overlap with a scheduled PDSCH and/or triggered aperiodic CSI-RSs are valid. The UE may determine that periodic or semi-persistent CSI-RSs that do not fully overlap with the scheduled PDSCH and/or triggered aperiodic CSI-RSs are invalid and may not receive the corresponding periodic or semi-persistent CSI-RSs. Accordingly, the UE may not perform averaging for the periodic or semi-persistent CSI-RSs that do not fully overlap with the scheduled PDSCH and/or triggered aperiodic CSI-RSs during channel measurement. In this case, only when the scheduled PDSCH and/or triggered aperiodic CSI-RSs are continuous in the time domain without a gap, the UE may recognize the corresponding continuous time resource duration as the same DL transmission burst (i.e., a duration where the same power is maintained). That is, when the UE performs channel measurement, if the scheduled PDSCH and/or triggered aperiodic CSI-RSs are continuous in the time domain without gaps, the UE may determine that the continuous time duration including the scheduled PDSCH and/or triggered aperiodic CSI-RSs is the same DL transmission burst and then perform averaging for a plurality of CSI-RSs belonging to the same DL transmission burst. For example, when the UE receives a scheduled PDSCH and triggered aperiodic CSI-RSs, and when the PDSCH and aperiodic CSI-RSs are continuous in the time domain without gaps, the UE may determine that the continuous time duration including the PDSCH and aperiodic CSI-RSs is the same DL transmission burst. The BS needs to maintain the same power for the same CSI-RS resource (or CSI-RS resource set) transmitted at least within the corresponding continuous time duration.

[Method #13A]

Hereinafter, a description will be given of a method of receiving a P/SP CSI-RS during an SCell activation period and measuring/reporting CSI.

As shown in Table 20, the SCell activation period mentioned herein may mean a period between minimum delay requirements for SCell activation defined in Tables 21 to 24 after reception of an activation command in slot n and transmission of a related HARQ-ACK in slot (n+k).

Specifically, the UE receives a P/SP CSI-RS at a time point other than the SCell activation period in the following case. For convenience, a serving cell where SCell activation is indicated is named cell #1.

Case 1: When the SFI field for cell #1 or the channel occupancy duration or CO-duration field for cell #1 is configured in DCI format 2_0→Since the COT duration is determined as shown in Table 18, the UE may receive only a P/SP CSI-RS within the determined COT duration and may not receive a P/SP-CSI-RS outside the COT duration.

Case 2: When both the SFI field for cell #1 and the channel occupancy duration or CO-duration field for cell #1 are not configured in DCI format 2_0, but when CSI-RS-ValidationWith-DCI-r16 (for cell #1) is configured→The UE may receive only a P/SP CSI-RS in a region overlapping a PDSCH or aperiodic CSI-RS indicated by UE-specific DCI as shown in Table 19, but the UE may not receive a P/SP CSI-RS in other regions.

Case 3: When both the SFI field for cell #1 and the channel occupancy duration or CO-duration field for cell #1 are not configured in DCI format 2_0, and when CSI-RS-ValidationWith-DCI-r16 (for cell #1) is not configured→The UE may receive a configured P/SP CSI-RS on the assumption that the P/SP CSI-RS is always transmitted.

For Case 1 and/or Case 2, the UE may receive information on whether to receive a P/SP CSI-RS in specific DCI before receiving the P/SPCSI-RS and determine whether to receive the P/SP CSI-RS based on the received information, unlike conventional P/SP CSI-RS reception (in licensed bands). However, since there is no requirement that the UE needs to monitor a PDCCH during the SCell activation period, the UE may be configured not to perform PDCCH monitoring during the SCell activation period in some embodiments.

Alt 1: As one method, the UE may be requested to perform the above-described operation, which is performed at a time other than the SCell activation period, even during the SCell activation period. However, when the UE is required to perform the operation, which is performed at a time other than the SCell activation period, during the SCell activation period, PDCCH reception may be required before P/SP CSI-RS reception, and as a result, the SCell activation delay requirement may increase.

Alt 2: As another method, P/SP CSI-RS reception may be allowed without PDCCH reception (or without PDCCH information) during the SCell activation period (even in Case 1 and/or Case 2). In this case, in consideration of a CAP failure of the BS, the UE may be required to perform BD for a P/SP CSI-RS. Alternatively, the UE may receive the P/SP CSI-RS without BD by assuming that the P/SP CSI-RS is always transmitted and perform CSI reporting.

In particular, a different method may be applied depending on whether information on the COT duration of cell #1 and/or a PDSCH (and/or aperiodic CSI-RS) indication for cell #1 is provided in cell #2 other than cell #1. The reason for this is that after completion of tracking, AGC, application of a TCI configured in a CORESET, etc. for PDCCH DM-RS reception while SCell activation is performed in cell #1, a considerable amount of time may be required to stably receive a PDCCH at a BLER below a predetermined threshold (e.g., 1%). However, if the above information is provided in cell #2 that is currently activated, an additional time for stable PDCCH reception may not be required. Thus, a P/SP CSI-RS may be received based on PDCCH information.

Specifically, for Case 1 (that is, when the SFI field or channel occupancy duration field for cell #1 is configured in DCI format 2_0), if the SFI field and/or channel occupancy duration field for cell #1 is configured in DCI format 2_0 transmitted on cell #2 (that is, if a CORESET TCI for receiving DCI format 2_0 on cell #1 is aligned, or if a CORESET TCI for receiving DCI format 2_0 indicating SFI/channel occupancy information related to cell #1 is aligned), the UE operation performed at a time other than the SCell activation period may be equally maintained even during the SCell activation period. On the other hand, if the SFI field and/or channel occupancy duration field for cell #1 is not configured in DCI format 2_0 transmitted in another serving cell other than cell #1 (that is, if a CORESET TCI for receiving DCI format 2_0 on cell #1 is not aligned, or if a CORESET TCI for receiving DCI format 2_0 indicating SFI/channel occupancy duration information related to cell #1 is not aligned), Opt 1) the UE may operate as in Alt 2, or Opt 2) the UE may be relaxed such that the UE does not need to perform CSI reporting or comply with the requirements for CSI values for a specific period of time (e.g., X ms, where X may be predefined and reported as UE capability) after the end of the SCell activation period. Alternatively, if the UE intends to report CSI, the UE may be allowed to report an out-of-range value. In this case, the SFI/channel occupancy duration information may be indicated by the SFI field/channel occupancy duration field of DCI format 2_0.

In addition, for Case 2 (that is, when neither the SFI field for cell #1 nor the channel occupancy duration field for cell

1 is configured in DCI format 2_0, but when CSI-RS-ValidationWith-DCI-r16 (for cell #1) is configured), if a PDSCH on cell #1 is capable of being scheduled by any DCI format (e.g., DCI format 1_1/1_2/0_1/0_2) transmitted on cell #2 (that is, if cross-carrier scheduling is configured), or if an aperiodic CSI-RS on cell #1 is capable of being triggered (that is, if a CORESET TCI for receiving DCI on cell #1 is aligned, or if a CORESET TCI for receiving DCI indicating scheduling information related to cell #1 is aligned), the UE operation performed at a time other than the SCell activation period may be equally maintained even during the SCell activation period. On the other hand, if a PDSCH and/or aperiodic CSI-RS to be transmitted in cell #1 is incapable of being indicated by any DCI format (e.g., DCI format 1_1/1_2/0_1/0_2) transmitted in another serving cell other than cell #1 (that is, if a CORESET TCI for receiving DCI on cell #1 is not aligned, or if a CORESET TCI for receiving DCI indicating scheduling information related to cell #1 is not aligned), Opt 1) the UE may operate as in Alt 2, or Opt 2) the UE may be relaxed such that the UE does not need to perform CSI reporting or comply with the requirements for CSI values for a specific period of time (e.g., X ms, where X may be predefined and reported as UE capability) after the end of the SCell activation period. Alternatively, if the UE intends to report CSI, the UE may be allowed to report an out-of-range value.

Although the proposed methods are described based on operations in unlicensed bands, the methods may be applied to operations in licensed bands. Herein, the term unlicensed band may be interchangeably used with the term shared spectrum.

3) Receiver & Transmitter (Between Receiver and Transmitter)

Figure 19:
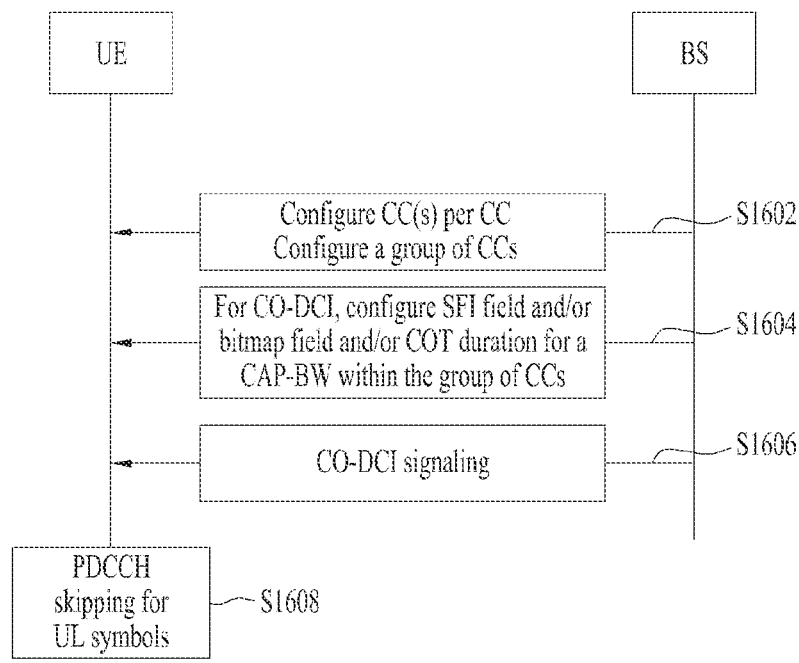

As shown in FIG. 19, first, a UE may receive configuration of CCs in an unlicensed band and a BWP for each CC from a BS (S1602). In addition, the UE may receive configuration of a CC group from the BS. Such a configuration may be established based on higher layer (e.g., RRC) signaling and/or DCI. In addition, an SFI field in the CO-DCI corresponding to the CAP-BW(s) in the CC group, and/or a bitmap field indicating the CAP-BW ON/OFF state, and/or a COT duration information field may be allocated to the UE by the BS (S1604). Here, the configuration for the allocation may be established based on higher layer (e.g., RRC) signaling and/or DCI. For example, information (e.g., offset) about the start position of the information in the CO-DCI may be shared through higher layer signaling.

Thereafter, the UE may receive the CO-DCI from the BS (S1606). Here, the CO-DCI may be transmitted in an unlicensed band or a licensed band. In this case, the UE may receive ON/OFF information, DL/UL information, and/or COT duration information about the corresponding CAP-BW(s) based on the field information configured in the CO-DCI. In this case, based on the received information, the UE may achieve a power saving effect by skipping PDCCH monitoring and/or channel measurement for the CAP-BW(s) which are in the OFF state or in the UL duration. Also, the BS may transmit a signal to the UE through the unlicensed band(s) occupied by the BS based on the CO-DCI. In response, the UE may receive the signal through the unlicensed band(s) occupied by the BS based on the CO-DCI.

The UE may perform a network access procedure to carry out the procedures and/or methods described/proposed above. For example, the UE may receive and store in the memory system information and configuration information necessary for performing the above-described/proposed procedures and/or methods while performing access to a network (e.g., BS). The configuration information necessary for the present disclosure may be received through higher layer (e.g., RRC layer, Medium Access Control (MAC) layer, etc.) signaling.

Figure 20:
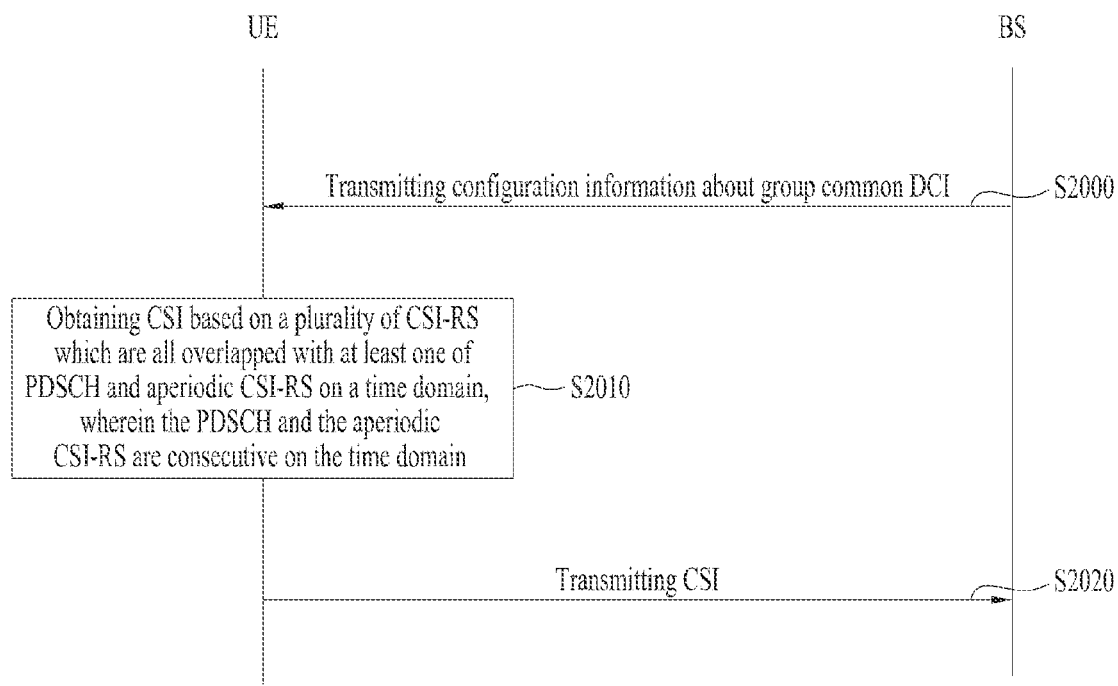

FIG. 20 is a flowchart illustrating operations between a UE and a BS according to another proposed embodiment.

Referring to FIG. 20, the BS may transmit configuration information on group common DCI to the UE (S2000). In this case, the configuration information may mean information indicating that an SFI field and a channel occupancy duration field are not configured in the group common DCI, or information for configuring the UE not to monitor the group common DCI. The group common DCI may mean DCI based on DCI format 2_0. If the SFI field and the channel occupancy duration field are not configured in DCI format 2_0, or if the UE is configured not to monitor DCI format 2_0, the UE may not receive information on a channel occupancy duration. If the UE does not receive the information on the channel occupancy duration, it may be difficult for the UE to identify DL transmission bursts. That is, if the UE does not receive the information on the channel occupancy duration directly from the BS, it may be difficult for the UE to determine the presence of the same DL transmission burst. However, when the UE performs channel measurement, the UE may perform the channel measurement based on a plurality of CSI-RSs belonging to the same DL transmission burst. Thus, for a case when the UE does not explicitly receive the information on the channel occupancy duration from the BS, there is a need for a method of enabling the UE to determine the presence of the same DL transmission burst.

In S2010, the UE may obtain CSI based on a plurality of CSI-RSs that fully overlap with at least one of a PDSCH and an aperiodic CSI-RS in the time domain. In particular, when both the PDSCH and the aperiodic CSI-RS are received, a duration corresponding to the PDSCH and the aperiodic CSI-RS may be a continuous time duration in the time domain. Specifically, when the duration corresponding to the PDSCH and the aperiodic CSI-RS is the continuous time duration in the time domain, the UE may determine the continuous time duration as the same DL transmission burst. Thus, the UE may obtain the CSI based on the plurality of CSI-RSs fully overlapping with the continuous time duration. That is, the plurality of CSI-RSs fully overlapping with the continuous time duration may mean a plurality of CSI-RSs belonging to the same DL transmission burst. Accordingly, the UE may obtain the information on the channel occupancy duration based on at least one of the PDSCH and the aperiodic CSI-RS and then perform the channel measurement based on the plurality of CSI-RSs belonging to the same DL transmission burst.

In S2020, the UE may transmit the CSI to the BS based on the channel measurement result.

More specific examples will be described below with reference to the drawings. In the following drawings/description, like reference numerals denote the same or corresponding hardware blocks, software blocks, or function blocks, unless otherwise specified.

Figure 21:
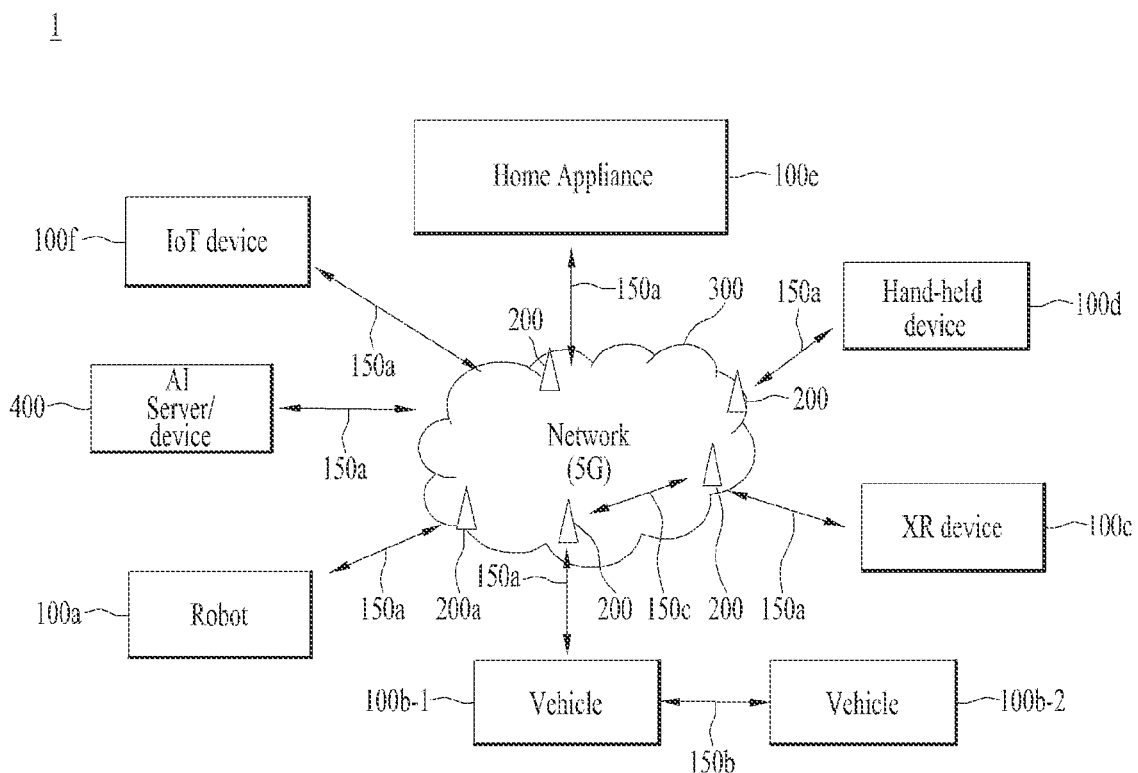
FIGS. 21 to 24 illustrate a communication system 1 and wireless devices, which are applied to the present disclosure.

FIG. 21 illustrates a communication system 1 applied to the present disclosure.

Referring to FIG. 21, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smart glasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 22:
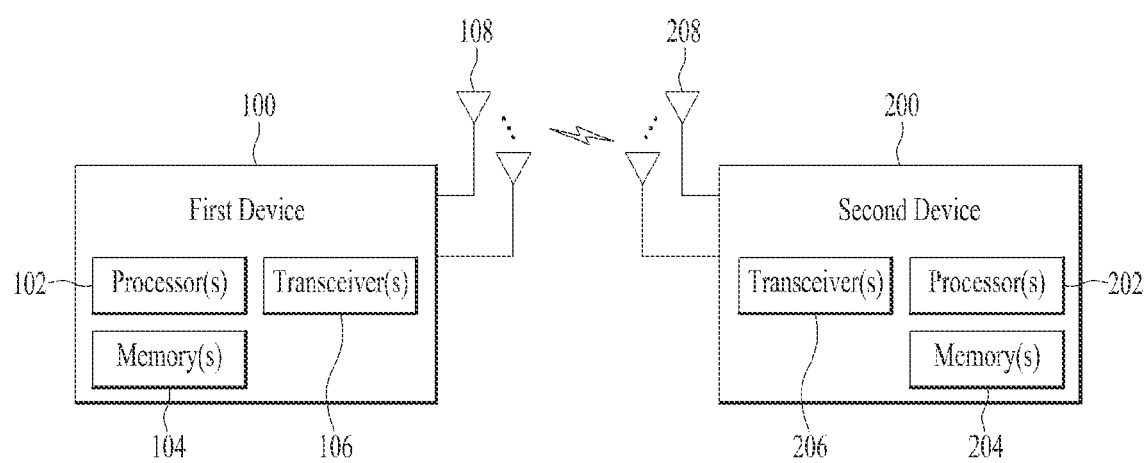

FIG. 22 illustrates wireless devices applicable to the present disclosure.

Referring to FIG. 22, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 26.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Herein, at least one memory (e.g., 104 or 204) may store instructions or programs. When executed, the instructions or programs may cause at least one processor operably coupled to the at least one memory to perform operations according to some embodiments or implementations of the present disclosure.

In the present disclosure, a computer readable (storage) medium may store at least one instruction or computer program, wherein the at least one instruction or computer program may cause, when executed by at least one processor, the at least one processor to perform operations according to some embodiments or implementations of the present disclosure.

Figure 23:
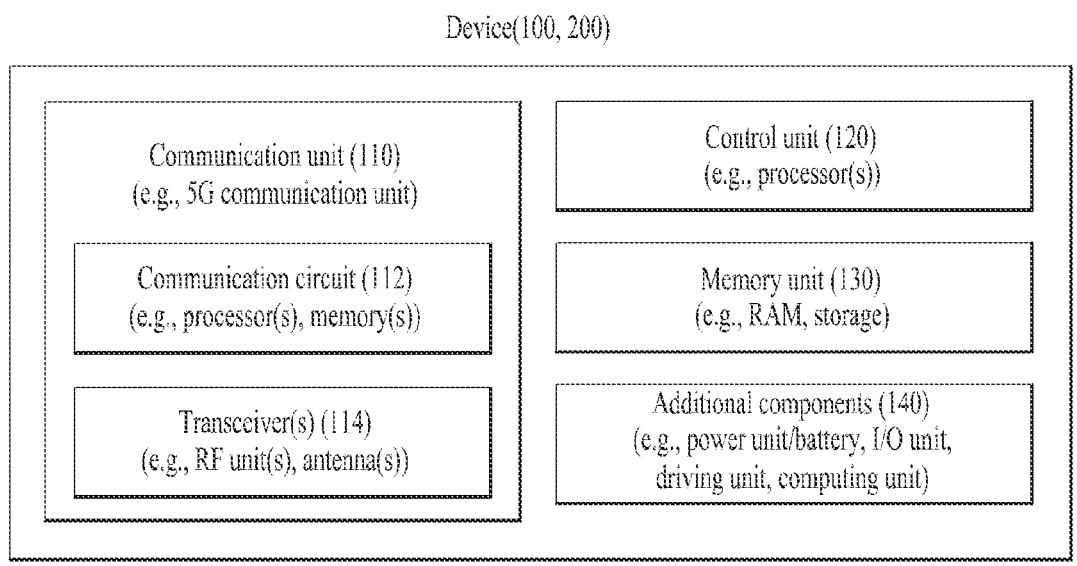

In the present disclosure, a processing device or apparatus may include at least one processor and at least one computer memory connectable to the at least one processor. The at least one computer memory may store instructions or programs. When executed, the instructions or programs may cause the at least one processor operably coupled to the at least one memory to perform operations according to some embodiments or implementations of the present disclosure. FIG. 23 illustrates another example of a wireless device applied to the present disclosure. The wireless device may be implemented in various forms according to a use case/service (refer to FIG. 21).

Referring to FIG. 23, wireless devices 100 and 200 may correspond to the wireless devices 100 and 200 of FIG. 22 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 22. For example, the transceiver(s) 114 may include the one or more transceivers 106 and 206 and/or the one or more antennas 108 and 208 of FIG. 22. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 21), the vehicles (100b-1 and 100b-2 of FIG. 21), the XR device (100c of FIG. 21), the hand-held device (100d of FIG. 21), the home appliance (100e of FIG. 21), the IoT device (100f of FIG. 21), a digital broadcasting terminal, a hologram device, a public safety device, an MTC device, a medical device, a FinTech device (or a finance device), a security device, a climate/environment device, the AI server/device (400 of FIG. 21), the BSs (200 of FIG. 21), a network node, or the like. The wireless device may be mobile or fixed according to a use case/service.

In FIG. 23, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Wireless communication technologies implemented in the wireless devices 100 and 200 of the present disclosure may include narrowband Internet of Things (NB-IoT) for low-power communication as well as LTE, NR, and 6G. For example, the NB-IoT technology may be an example of low-power wide-area network (LPWAN) technologies and implemented in standards such as LTE Cat NB1 and/or LTE Cat NB2. However, the NB-IoT technology is not limited to the above names. Additionally or alternatively, the wireless communication technologies implemented in the wireless devices 100 and 200 of the present disclosure may perform communication based on the LTE-M technology. For example, the LTE-M technology may be an example of LPWAN technologies and called by various names including enhanced machine type communication (eMTC). For example, the LTE-M technology may be implemented in at least one of the following various standards: 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, etc., but the LTE-M technology is not limited to the above names. Additionally or alternatively, the wireless communication technologies implemented in the wireless devices 100 and 200 of the present disclosure may include at least one of ZigBee, Bluetooth, and LPWAN in consideration of low-power communication, but the wireless communication technology is not limited to the above names. For example, the ZigBee technology may create a personal area network (PAN) related to small/low-power digital communication based on various standards such as IEEE 802.15.4 and so on, and the ZigBee technology may be called various names.

Figure 24:
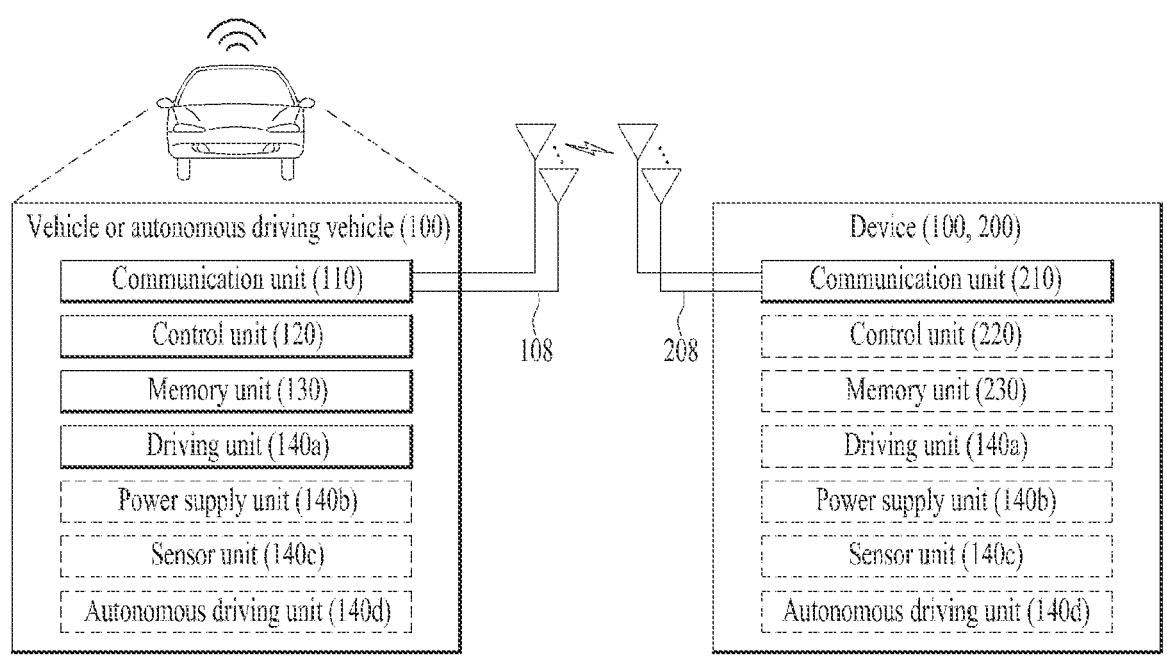

FIG. 24 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 24, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 28, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140*d* may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140*d* may generate an autonomous driving route and a driving plan from the obtained data. The control unit 120 may control the driving unit 140*a* such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140*c* may obtain information about a vehicle state and/or surrounding environment information. The autonomous driving unit 140*d* may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The embodiments of the present disclosure described above are combinations of elements and features of the present disclosure. The elements or features may be considered optional unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The present disclosure may be used for a UE, a BS, or other equipment in a wireless mobile communication system.

What is claimed is:

1. A method of transmitting channel state information (CSI) by a user equipment (UE) in a wireless communication system supporting a shared spectrum, the method comprising:
    deriving the CSI without averaging instances of periodic or semi-persistent channel state information reference signal (CSI-RS) resources for channel measurement or interference measurement,
    wherein, based on a specific radio resource control (RRC) parameter being provided and a first RRC parameter and a second RRC parameter being not provided, the instances of the CSI-RS resources occur within consecutive symbols which are not all occupied by physical downlink shared channel(s) (PDSCH(s)) and/or aperiodic CSI-RS(s); and
    transmitting the CSI,
    wherein the specific RRC parameter indicates how the UE performs periodic and semi-persistent CSI-RS reception in a slot, and the first RRC parameter is for channel occupancy durations per cell, and the second RRC parameter is for slot format indicators.

2. The method of claim 1, further comprising:
    receiving, through higher layer signaling, information indicating to configure the CSI-RSs based on the PDSCH(s) and the aperiodic CSI-RS(s).

3. The method of claim 1,
    wherein the CSI is derived based on an average value of each same instance of the instances, and
    wherein the each same instance occurs within consecutive symbols which are all occupied by the PDSCH(s) and the aperiodic CSI-RS(s).

4. A method of receiving channel state information (CSI) by a base station (BS) in a wireless communication system supporting a shared spectrum, the method comprising:
    receiving the CSI,
    wherein the CSI is derived without averaging instances of periodic or semi-persistent channel state information reference signal (CSI-RS) resources for channel measurement or interference measurement,
    wherein, based on a specific radio resource control (RRC) parameter being provided and a first RRC parameter and a second RRC parameter being not provided, the instances of the CSI-RS resources occur within consecutive symbols which are not all occupied by physical downlink shared channel(s) (PDSCH(s)) and/or an aperiodic CSI-RS(s),
    wherein the specific RRC parameter indicates how a user equipment (UE) performs periodic and semi-persistent CSI-RS reception in a slot, and the first RRC parameter is for channel occupancy durations per cell, and the second RRC parameter is for slot format indicators.

5. The method of claim 4, further comprising:
    transmitting, through higher layer signaling, information indicating to configure the CSI-RSs based on the PDSCH(s) and the aperiodic CSI-RS(s).

6. The method of claim 4,
    wherein the CSI is derived based on an average value of each same instance of the instances, and
    wherein the each same instance occurs within consecutive symbols which are all occupied by the PDSCH(s) and the aperiodic CSI-RS(s).

7. A base station (BS) configured to operate in a wireless communication system supporting a shared spectrum, the BS comprising:
    at least one radio frequency (RF) unit;
    at least one processor; and at least one computer memory operably connected to the at least one processor and configured to, when executed, cause the at least one processor to perform operations comprising:

receiving channel state information (CSI), wherein the CSI is derived without averaging instances of periodic or semi-persistent channel state information reference signal (CSI-RS) resources for channel measurement or interference measurement, wherein, based on a specific radio resource control (RRC) parameter being provided and a first RRC parameter and a second RRC parameter being not provided, the instances of the CSI-RS resources occur within consecutive symbols which are not all occupied by physical downlink shared channel(s) (PDSCH(s)) and/or an aperiodic CSI-RS(s), wherein the specific RRC parameter indicates how a user equipment (UE) performs periodic and semi-persistent CSI-RS reception in a slot, and the first RRC parameter is for channel occupancy durations per cell, and the second RRC parameter is for slot format indicators.

8. The BS of claim 7, wherein the operations further comprise:

transmitting, through higher layer signaling, information indicating to configure the CSI-RSs based on the PDSCH(s) and the aperiodic CSI-RS(s).

9. The BS of claim 7, wherein the CSI is derived based on an average value of each same instance of the instances, and wherein the each same instance occurs within consecutive symbols which are all occupied by the PDSCH(s) and the aperiodic CSI-RS(s).

\* \* \* \* \*